(12) United States Patent
Asano et al.

(10) Patent No.: US 8,009,525 B2
(45) Date of Patent: Aug. 30, 2011

(54) OPTICAL DISC SIGNAL PROCESSING DEVICE, OPTICAL DISC SIGNAL PROCESSING METHOD, OPTICAL DISC REPRODUCTION AND RECORDING DEVICE, AND OPTICAL DISC REPRODUCTION AND RECORDING METHOD

(75) Inventors: Masato Asano, Osaka (JP); Kiyoshi Masaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 55 days.

(21) Appl. No.: 12/667,771

(22) PCT Filed: Jul. 4, 2008

(86) PCT No.: PCT/JP2008/001782
§ 371 (c)(1),
(2), (4) Date: Jan. 5, 2010

(87) PCT Pub. No.: WO2009/008145
PCT Pub. Date: Jan. 15, 2009

(65) Prior Publication Data
US 2010/0195457 A1 Aug. 5, 2010

(30) Foreign Application Priority Data
Jul. 6, 2007 (JP) ................................ 2007-177878

(51) Int. Cl.
*G11B 7/00* (2006.01)
(52) U.S. Cl. ................. 369/44.32; 369/53.23; 369/53.35
(58) Field of Classification Search ............... 369/44.25, 369/44.26, 47.1, 53.23, 53.12, 53.19, 53.29, 369/53.35, 53.42, 44.28, 47.38, 47.4, 47.45, 369/44.32
See application file for complete search history.

(56) References Cited

U.S. PATENT DOCUMENTS

| 5,090,003 | A | 2/1992 | Watanabe et al. |
| 6,049,513 | A | 4/2000 | Park |
| 6,407,968 | B1 | 6/2002 | Nakata et al. |
| 6,963,520 | B1 | 11/2005 | Park et al. |
| 7,023,776 | B2 | 4/2006 | Kadlec et al. |
| 7,054,242 | B2 | 5/2006 | Turner et al. |
| 7,092,322 | B2 | 8/2006 | Kadlec et al. |
| 7,522,482 | B2 * | 4/2009 | Tateishi et al. ............. 369/44.11 |

(Continued)

FOREIGN PATENT DOCUMENTS

JP 2-46532 2/1990

(Continued)

OTHER PUBLICATIONS

International Search Report issued Aug. 19, 2008 in corresponding International Application No. PCT/JP2008/001782.

(Continued)

*Primary Examiner* — Nabil Z Hindi
(74) *Attorney, Agent, or Firm* — Wenderoth, Lind & Ponack, L.L.P.

(57) ABSTRACT

An optimum method for adjusting the physical position or angle of an optical pickup (a1) is automatically selected for each optical disc signal processing device so that a control target value after adjusted is included in a previous margin measurement result which is stored in a nonvolatile memory, thereby providing an optical disc signal processing device, an optical disc signal processing method, an optical disc reproduction and recording device, and an optical disc reproduction and recording method, which can reduce the start-up time and the recording start time, and enhance the user's convenience.

36 Claims, 37 Drawing Sheets

U.S. PATENT DOCUMENTS

| | | |
|---|---|---|
| 2002/0039335 A1 | 4/2002 | Masaki et al. |
| 2003/0161232 A1 | 8/2003 | Yoshimoto |
| 2005/0243675 A1 | 11/2005 | Masaki et al. |

FOREIGN PATENT DOCUMENTS

| | | |
|---|---|---|
| JP | 2-64920 | 3/1990 |
| JP | 6-162529 | 6/1994 |
| JP | 2002-109822 A | 4/2002 |
| JP | 2007-12127 A | 1/2007 |

OTHER PUBLICATIONS

Translation of the Written Opinion of the ISA issued Aug. 19, 2008 in corresponding International Application No. PCT/JP2008/001782.

* cited by examiner f2<f4<f1<f3, b1<b0, a0<a1

Fig.23

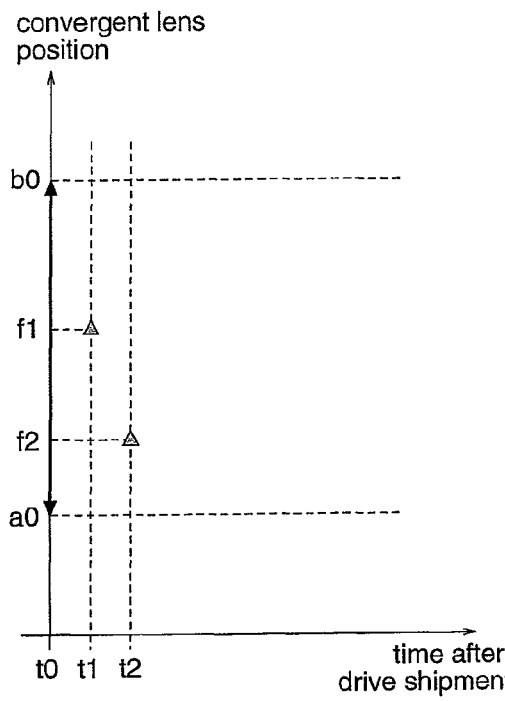

time after drive shipment=t0

| Disc 1 | time | value |
|---|---|---|
| mgn max | t0 | b0 |
| mgn min | t0 | a0 |
| adj max | | |
| adj min | | | time after drive shipment=t1

| Disc 1 | time | value |
|---|---|---|
| mgn max | t0 | b0 |
| mgn min | t0 | a0 |
| adj max | t1 | f1 |
| adj min | t1 | f1 | time after drive shipment=t2

| Disc 1 | time | value |
|---|---|---|
| mgn max | t0 | b0 |
| mgn min | t0 | a0 |
| adj max | t1 | f1 |
| adj min | t2 | f2 |

Fig.24

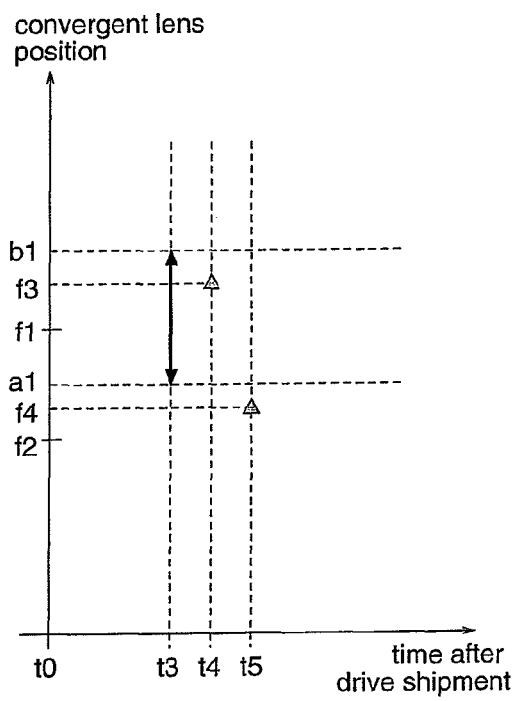

f2<f4<f1<f3, b1<b0, a0<a1 time after drive shipment=t3

| Disc 1 | time | value |
|---|---|---|
| mgn max | t3 | b1 |
| mgn min | t3 | a1 |
| adj max | t1 | f1 |
| adj min | t2 | f2 | time after drive shipment=t4

| Disc 1 | time | value |
|---|---|---|
| mgn max | t3 | b1 |
| mgn min | t3 | a1 |
| adj max | t4 | f3 |
| adj min | t2 | f2 | time after drive shipment=t5

| Disc 1 | time | value |
|---|---|---|
| mgn max | t3 | b1 |
| mgn min | t3 | a1 |
| adj max | t4 | f3 |
| adj min | t2 | f2 | time after drive shipment=t6

| Disc 1 | time | value |
|---|---|---|
| adj max | t4 | f3 |
| adj min | t2 | f2 |
| mgn max1 | t0 | b0 |
| mgn min1 | t0 | a0 |
| mgn max2 | t3 | b1 |
| mgn min2 | t3 | a1 |
| mgn max3 | t6 | b2 |
| mgn min3 | t6 | a2 | time after drive shipment=t7

| Disc 1 | time | value |
|---|---|---|
| adj max | t4 | f3 |
| adj min | t2 | f2 |
| mgn max1 | t0 | b0 |
| mgn min1 | t0 | a0 |
| mgn max2 | t3 | b1 |
| mgn min2 | t3 | a1 |
| mgn max3 | t6 | b2 |
| mgn min3 | t6 | a2 | f2<f5<f3, b2<b1<b0, a0<a1<a2 f2<f4<f1<f3, b1<b0, a0<a1 f2<f4<f1<f3, b1<b0, a0<a1 f2<f5<f3, b2<b1, a1<a2

OPTICAL DISC SIGNAL PROCESSING DEVICE, OPTICAL DISC SIGNAL PROCESSING METHOD, OPTICAL DISC REPRODUCTION AND RECORDING DEVICE, AND OPTICAL DISC REPRODUCTION AND RECORDING METHOD

TECHNICAL FIELD

The present invention relates to a method for optimizing the start-up time and the recording start time for each drive in an optical disc device, and a method for ensuring the quality when using inexpensive elements having large variations in aging degradations.

BACKGROUND ART

An example of a conventional optical disc focus control device is disclosed in Patent Document 1.

Patent Document 1 discloses a device which detects a previously-recorded signal for adjustment, and adjusts a focus control system so as to make the detected signal maximum.

FIG. 8 is a block diagram illustrating the configuration of the focus control device disclosed in Patent Document 1.

In FIG. 8, z1 denotes a light source, z2 denotes a semi-transparent mirror, z3 denotes a convergent lens, z4 denotes a recording medium on which a signal for adjustment has previously been recorded, z5 denotes a focus drive circuit, z6 denotes a divided photodetector, z7 denotes a focus error detection means, z8 denotes a reproduction signal processing means, z9 denotes a focus balance adjustment means, z10 denotes a focus balance change means, z11 denotes a focus control means, z12 denotes a focus drive means, and z13 denotes a path of laser light from the light source to the divided photodetector. An optical pickup a1 is an element comprising the light source z1, the semi-transparent mirror z2, the convergent lens z3, the focus drive circuit z5, and the divided photodetector z6.

The focus control in this device will be described. A light beam which is applied to the convergent lens z3 with its light axis being shifted is converged onto the recording medium z4, and the reflected beam is separated by the semi-transparent mirror z2 to be applied to the divided photodetector z6. Since this light beam is applied to the convergent lens z3 with its light axis being shifted, the position of the reflected beam is moved according to the vertical movement of the recording medium z4. So, the movement of the reflected beam is detected by the divided photodetector z6, and the movement amount of the reflected beam (focus error) from the position where the beam is focused on the recording medium z4 is detected by the focus error detection means z7. Next, a movement amount of the convergent lens z3 for minimizing the focus error is obtained by the focus control means z11, and a drive signal for moving the convergent lens z3 by the obtained movement amount is outputted from the focus drive means z12. The focus drive circuit z5 and the convergent lens z3 connected to the focus drive circuit z5 are driven by the drive signal so that the light beam is constantly in the predetermined converged state on the recording medium z4.

Next, the focus control system adjustment method of this device will be described. A signal having a predetermined frequency is previously recorded in a spiral on the recording medium z4. When a light beam is applied to the recording medium z4 and focus control is performed under the state where the recording medium z4 is rotated, the reproduction signal processing means z8 which receives a sum signal from the divided photodetector z6 provides a reproduction signal output z14 as shown in FIG. 2. In FIG. 2, the abscissa shows the time axis, and z14 denotes the reproduction signal output.

FIG. 3 shows a spot of the light beam on the recording medium z4. In FIG. 3, z15 denotes signal recording tracks on the recording medium, z16 denotes a non-recorded portion between the tracks, and z17 denotes a spot of the light beam on the recording medium. When an offset is given to the focus error by the focus balance change means z10, a movement amount of the convergent lens z3 corresponding to the offset is outputted from the focus control means z11, and thereby the convergent lens z3 is moved.

FIG. 4 shows the relation between the position of the convergent lens z3 and the reproduction signal z14, wherein (a) to (c) show the states where the convergent lens positions are A to C, respectively. The output power of the reproduction signal Z14 varies depending on the spot diameter of the light beam, and when the light beam is focused (when the convergent lens position is B) as shown in FIG. 4(b), i.e., when it is correctly focus-controlled, the spot diameter becomes minimum and thereby the amplitude of the reproduction signal output becomes maximum. Since data can be accurately reproduced from the recording medium z4 when the reproduction signal output is maximum, the position of the convergent lens z3 is adjusted in the optical disc device so as to make the reproduction signal output maximum before reproduction of data from the recording medium z4.

FIGS. 5 and 6 show the convergent lens position adjustment methods A and B by which the reproduction signal output is maximized. Initially, the procedure of the adjustment method A will be described with reference to FIG. 5.

In FIG. 5, the amplitude of the reproduction signal at the convergent lens position A(1) before adjusted is measured in step A1. Next, the convergent lens position is shifted to A(2), and the reproduction signal amplitude at A(2) is measured. Since the amplitude at A(2) is smaller than the amplitude at A(1), the convergent lens position is shifted to A(3) which is in the direction opposite to A(2).

Next, in step A2, after the amplitude at A(3) is measured, the convergent lens position is shifted to A(4) and the amplitude is measured. Since the amplitude at A(4) is larger than the amplitude at A(3), the process goes to step A3.

In step A3, the convergent lens position is shifted to A(5) and the amplitude is measured. Since the amplitude at A(5) is larger than the amplitude at A(4), the process goes to step A4.

In step A4, the lens position is shifted to A(6) and the amplitude is measured. Since the amplitude at A(6) is smaller than the amplitude at A(5), adjustment is ended with A(5) being the lens position after adjusted.

Next, the procedure of the adjustment method B will be described with reference to FIG. 6.

Initially, in step B1, the reproduction signal amplitude at the convergent lens position B(1) before adjusted is measured. Next, the convergent lens position is adjusted to B(2) at which the reproduction signal amplitude becomes maximum, in the same procedure as that of the adjustment method A shown in FIG. 5.

Next, in step B2, the lens position is shifted from B(2) in the direction opposite to that in step B1 to find a lens position B(3) at which the reproduction signal has an amplitude that is obtained by subtracting a threshold value from the amplitude at the lens position B(2).

In step B3, the lens position is shifted from B(2) in the same direction as that in step B1 to find a lens position B(4) at which the reproduction signal has an amplitude that is obtained by subtracting the threshold value from the amplitude at the lens position B(2).

In step B4, the adjustment is completed with the lens position B(5) intermediate between B(3) and B(4) being the lens position after adjusted.

When the adjustment method A is compared with the adjustment method B, the adjustment method A can complete adjustment in a shorter time relative to the adjustment method B, but it causes an increase in variation of the adjusted lens position when plural times of adjustments are performed.

FIG. 7 shows the relation between the reproduced signal amplitude and the convergent lens position. Assuming that the minimum value of the reproduction signal amplitude which is required to accurately reproduce the data from the recording medium z4 is z18, the convergent lens position at which the reproduction signal amplitude becomes z18 or more is in the range including z19 to z20. This range is called a margin z21. The margin z21 has the individual variability due to variations in the processes of manufacturing the convergent lens z3, the focus drive circuit z5, and the division photodetector z6. Conventionally, an adjustment method by which variation in the convergent lens position that is adjusted by a focus control device having the narrowest margin falls within the margin is used for all focus control devices.

Patent Document 1: Japanese Published Patent Application No. Hei. 2-64920

DISCLOSURE OF THE INVENTION

Problems to be Solved by the Invention

When using the same adjustment method for all the focus control devices, it is necessary to use an adjustment method having less variation in the convergent lens position after adjusted and a long adjustment time in accordance with the focus control device having the narrowest margin z21. However, since a focus control device having a wide margin z21 can accurately reproduce data from the recording medium z4 even when an adjustment method having large variation in the lens position and a short adjustment time is used, it takes excessive adjustment time, and thereby the user's convenience is deteriorated.

The present invention is made to solve the above-described conventional problems and has for its object to provide an optical disc signal processing device, an optical disc signal processing method, an optical disc reproduction and recording device, and an optical disc reproduction and recording method, which can reduce the start-up time and the recording start time.

Measures to Solve the Problems

According to Claim 1 of the present invention, there is provided an optical disc signal processing device comprising: a drive means which changes the physical position or angle of an optical pickup; an error detection means which detects the physical positional relation between the optical pickup and a recording medium from an electric signal generated by the optical pickup; a control target value change means which changes a control target value in the optical disc signal processing device; a control means which controls the drive means according to the outputs from the error detection means and the control target value change means; an adjustment reference signal generation means which generates an adjustment reference signal for adjusting the control target value; a control target value adjustment means which adjusts the control target value changed by the control target value change means, on the basis of the output from the adjustment reference signal generation means; a margin measurement means which obtains a range of the control target value from its minimum value to its maximum value, the control target value being changed by the control target value change means, within which range the optical disc signal processing device can perform normal operation; a condition setting means which sets a threshold value of the adjustment reference signal when measuring the range using the margin measurement means; a utilization rate measurement means which measures the utilization rate of the optical disc signal processing device; a nonvolatile memory which stores the range of the control target value that is obtained by the margin measurement means, together with the utilization rate outputted from the utilization rate measurement means; a comparison means which compares the range of the control target value that is stored in the nonvolatile memory, with the control target value which is adjusted by the control target value adjustment means; and an adjustment method switching means which changes the change amount of the control target value changed by the control target value change means, on the basis of the number of measurements for the adjustment reference signal that is used for adjusting the control target value by the control target value adjustment means or the output from the control target value adjustment means, and switches the control target value adjustment method on the basis of the output from the comparison means; wherein the adjustment method of the control target value adjustment means, or the number of measurements for the adjustment reference signal, or the change amount of the control target value is optimized so that the control target value adjusted by the control target value adjustment means is included in the range of the control target value which is obtained by the margin measurement means and stored in the nonvolatile memory.

According to Claim 2 of the present invention, there is provided an optical disc signal processing device comprising: a drive means which changes the physical position or angle of an optical pickup; an error detection means which detects the physical positional relation between the optical pickup and a recording medium from an electric signal generated by the optical pickup; a control target value change means which changes a control target value in the optical disc signal processing device; a control means which controls the drive means according to the outputs from the error detection means and the control target value change means; an adjustment reference signal generation means which generates an adjustment reference signal for adjusting the control target value; a control target value adjustment means which adjusts the control target value changed by the control target value change means, on the basis of the output from the adjustment reference signal generation means; a margin measurement means which obtains a range of the control target value from its minimum value to its maximum value, the control target value being changed by the control target value change means, within which range the optical disc signal processing device can perform normal operation; a condition setting means which sets a threshold value of the adjustment reference signal when measuring the range using the margin measurement means; a utilization rate measurement means which measures the utilization rate of the optical disc signal processing device; a nonvolatile memory which stores the range of the control target value that is obtained by the margin measurement means, together with the utilization rate outputted from the utilization rate measurement means; a comparison means which compares the range including the minimum value to the maximum value of the control target value which is stored in the nonvolatile memory with the control target value which is adjusted by the control target value adjustment means; a number-of-rotations selection means which selects the number of rotations of the recording medium on the basis of the output from the comparison means; a number-of-rotations acquisition means which obtains the number of rotations of the recording medium; and a rotation control means which outputs a drive signal for rotating the recording medium with the target number of rotations according to the outputs from the number-of-rotations selection means and the number-of-rotations acquisition means; wherein the range including the minimum value to the maximum value of the control target value which is obtained by the margin measurement means is stored in the nonvolatile memory together with the utilization rate which is outputted from the utilization rate measurement means and the number of rotations of the recording medium which is outputted from the number-of-rotations acquisition means, and the number-of-rotations of the recording medium is optimized by the number-of-rotations selection means so that the control target value adjusted by the control target value adjustment means is included in the range of the control target value which is obtained by the margin measurement means and stored in the nonvolatile memory.

According to Claim 3 of the present invention, there is provided an optical disc signal processing device comprising: a drive means which changes the physical position or angle of an optical pickup; an error detection means which detects the physical positional relation between the optical pickup and a recording medium from an electric signal generated by the optical pickup; a control target value change means which changes a control target value in the optical disc signal processing device; a control means which controls the drive means according to the outputs from the error detection means and the control target value change means; an adjustment reference signal generation means which generates an adjustment reference signal for adjusting the control target value; a control target value adjustment means which adjusts the control target value changed by the control target value change means, on the basis of the output from the adjustment reference signal generation means; a margin measurement means which obtains a range of the control target value from its minimum value to its maximum value, the control target value being changed by the control target value change means, within which range the optical disc signal processing device can perform normal operation; a condition setting means which sets a threshold value of the adjustment reference signal when measuring the range using the margin measurement means; a utilization rate measurement means which measures the utilization rate of the optical disc signal processing device; a nonvolatile memory which stores the range of the control target value that is obtained by the margin measurement means together with the utilization rate outputted from the utilization rate measurement means; and a maximum utilization rate estimation means which estimates a utilization rate with which the range of the control target value becomes equal to or lower than a threshold value, from the utilization rate of the optical disc signal processing device which is stored in the nonvolatile memory and the range including minimum value to the maximum value of the control target value which is obtained by the margin measurement means.

According to Claim 4 of the present invention, there is provided an optical disc signal processing device comprising: a drive means which changes the physical position or angle of an optical pickup; an error detection means which detects the physical positional relation between the optical pickup and a recording medium from an electric signal generated by the optical pickup; a control target value change means which changes a control target value in the optical disc signal processing device; a control means which controls the drive means according to the outputs from the error detection means and the control target value change means; an adjustment reference signal generation means which generates an adjustment reference signal for adjusting the control target value; a control target value adjustment means which adjusts the control target value changed by the control target value change means, on the basis of the output from the adjustment reference signal generation means; a margin measurement means which obtains a range of the control target value from its minimum value to its maximum value, the control target value being changed by the control target value change means, within which range the optical disc signal processing device can perform normal operation; a condition setting means which sets a threshold value of the adjustment reference signal when measuring the range using the margin measurement means; a utilization rate measurement means which measures the utilization rate of the optical disc signal processing device; a nonvolatile memory which stores the range of the control target value that is obtained by the margin measurement means together with the utilization rate outputted from the utilization rate measurement means; a maximum utilization rate estimation means which estimates the utilization rate with which the range of the control target value becomes equal to or lower than a threshold value, from the utilization rate of the optical disc signal processing device which is stored in the nonvolatile memory and the range of the control target value which is obtained by the margin measurement means; and a warning output means which outputs a warning message when the output result of the maximum utilization rate estimation means varies exceeding the predetermined threshold value.

According to Claim 5 of the present invention, there is provided an optical disc signal processing device comprising: a drive means which changes the physical position or angle of an optical pickup; an error detection means which detects the physical positional relation between the optical pickup and a recording medium from an electric signal generated by the optical pickup; a control target value change means which changes a control target value in the optical disc signal processing device; a control means which controls the drive means according to the outputs from the error detection means and the control target value change means; an adjustment reference signal generation means which generates an adjustment reference signal for adjusting the control target value; a control target value adjustment means which adjusts the control target value changed by the control target value change means, on the basis of the output from the adjustment reference signal generation means; a margin measurement means which obtains a range of the control target value from its minimum value to its maximum value, the control target value being changed by the control target value change means, within which range the optical disc signal processing device can perform normal operation; a condition setting means which sets a threshold value of the adjustment reference signal when measuring the range using the margin measurement means; a utilization rate measurement means which measures the utilization rate of the optical disc signal processing device; a nonvolatile memory which stores the range of the control target value that is obtained by the margin measurement means together with the utilization rate outputted from the utilization rate measurement means; a program change means which changes a program for managing the respective means; a program comparison means which compares the identification information of the program for the previous margin measurement which is stored in the nonvolatile memory with the identification information of the changed program; and a warning output means which compares, based on the output from the program comparison means, the range of the control target value with which the optical disc signal processing device can perform normal operation, which range is obtained after the program has been changed by the program change means, with the range of the control target value which is stored in the nonvolatile memory, and outputs a warning message when the range of the control target value which is obtained after the program change is reduced exceeding a threshold value as compared with the range of the control target value which is stored in the nonvolatile memory.

According to Claim 6 of the present invention, the optical disc signal processing device defined in any of Claims 1 to 5 includes, as the drive means, a focus drive means which shifts the position of the optical pickup in the direction perpendicular to the recording medium; and as the error detection means, a focus error detection means which detects a physical distance between the optical pickup and the recording medium from an electric signal generated by the optical pickup.

According to Claim 7 of the present invention, the optical disc signal processing device defined in any of Claims 1 to 5 includes, as the drive means, a tracking drive means which shifts the position of the pickup in the radial direction of the recording medium; and as the error detection means, a tracking error detection means which detects a physical distance between the optical pickup and the center of a groove existing on the recording medium or the center of a data sequence stored in the recording medium, from an electric signal generated by the optical pickup.

According to Claim 8 of the present invention, the optical disc signal processing device defined in any of Claims 1 to 5 includes, as the drive means, a tilt drive means which changes the physical angle of the optical pickup; and as the error detection means, a tilt error detection means which detects a physical angle difference between the optical pickup and the recording medium from an electric signal generated by the optical pickup.

According to Claim 9 of the present invention, in the optical disc signal processing device defined in any of Claims 1 to 8, the nonvolatile memory stores the range of the control target value from its minimum value to its maximum value, which is obtained by the margin measurement means, together with the utilization rate which is outputted by the utilization rate measurement means, and stores the control target value which is adjusted by the control target value adjustment means together with the utilization rate which is outputted by the utilization rate measurement means; and when the control target value stored in the nonvolatile memory is not included in the range of the control target value which is stored in the nonvolatile memory, the adjustment method of the control target value adjustment means, or the number of measurements for the adjustment reference signal, or the change amount of the control target value is optimized so that the control target value stored in the nonvolatile memory is included in the range of the control target value which is stored in the nonvolatile memory.

According to Claim 10 of the present invention, the optical disc signal processing device defined in any of Claims 1 to 8 further includes a temperature measurement means which measures the temperature of the optical disc signal processing device; and the nonvolatile memory stores the range of the control target value from its minimum value to its maximum value, which is obtained by the margin measurement means, together with the utilization rate outputted from the utilization rate measurement means and the temperature measured by the temperature measurement means; and the comparison means corrects the range of the control target value which is obtained by the margin measurement means and stored in the nonvolatile memory, according to the temperature stored in the nonvolatile memory, and compares the corrected range of the control target value with the control target value adjusted by the control target value adjustment means.

According to Claim 11 of the present invention, the optical disc signal processing device defined in any of Claims 1 to 8 further includes a drive software identification information acquisition means which acquires identification information of a drive software that controls the optical disc signal processing device; and the range of the control target value from its minimum value to its maximum value, which is obtained by the margin measurement means, is stored in the nonvolatile memory together with the utilization rate outputted from the utilization rate measurement means and the program identification information outputted from the drive software identification information acquisition means, and processing is carried out for each drive software identification information stored in the nonvolatile memory.

According to Claim 12 of the present invention, the optical disc signal processing device defined in any of Claims 1 to 8 further includes a recording medium identification information acquisition means which acquires information for identifying the recording medium from the output of the adjustment reference signal generation means; and the range of the control target value from its minimum value to its maximum value, which is obtained by the margin measurement means, is stored in the nonvolatile memory together with the utilization rate outputted from the utilization rate measurement means and the recording medium identification information outputted from the recording medium identification information acquisition means, and processing is carried out for each recording medium identification information stored in the nonvolatile memory.

According to Claim 13 of the present invention, the optical disc signal processing device defined in any of Claims 1 to 8 further includes a power supply identification information acquisition means which acquires information for identifying the type of a power supply used by the optical disc signal processing device; and the range of the control target value from its minimum value to its maximum value, which is obtained by the margin measurement means, is stored in the nonvolatile memory together with the utilization rate outputted from the utilization rate measurement means and the power supply identification information outputted from the power supply identification information acquisition means, and processing is carried out for each power supply identification information stored in the nonvolatile memory.

According to Claim 14 of the present invention, in the optical disc signal processing device defined in any of Claims 1 to 13, the utilization rate measured by the utilization rate measurement means is the time utilizing a timer.

According to Claim 15 of the present invention, in the optical disc signal processing device defined in any of Claims 1 to 13, the utilization rate measured by the utilization rate measurement means is obtained from a device having a time measurement function, which is connected to the optical disc signal processing device.

According to Claim 16 of the present invention, in the optical disc signal processing device defined in any of Claims 1 to 13, the utilization rate measured by the utilization rate measurement means is the number of times the optical disc signal processing device reproduces or records the recording medium.

According to Claim 17 of the present invention, in the optical disc signal processing device as defined in any of Claims 1 to 16, a nonvolatile memory of a device which is connected to the optical disc signal processing device is used instead of the nonvolatile memory.

According to Claim 18 of the present invention, there is provided an optical disc reproduction and recording apparatus comprising: an optical pickup; a rotation means for rotating the recording medium; and an optical disc signal processing device as defined in any of Claims 1 to 17.

According to Claim 19 of the present invention, there is provided an optical disc signal processing method comprising: a driving step of changing the physical position or angle of an optical pickup; an error detection step of detecting the physical positional relation between the optical pickup and a recording medium from an electric signal generated by the optical pickup; a control target value change step of changing a control target value in an optical disc signal processing device; a control step of controlling the drive step according to the outputs from the error detection step and the control target value change step; an adjustment reference signal generation step of generating an adjustment reference signal for adjusting the control target value; a control target value adjustment step of adjusting the control target value changed in the control target value change step, on the basis of the output from the adjustment reference signal generation step; a margin measurement step of obtaining a range of the control target value from its minimum value to its maximum value, the control target value being changed in the control target value change step, within which range the optical disc signal processing device can perform normal operation; a condition setting step of setting a threshold value of the adjustment reference signal when measuring the range in the margin measurement step; a utilization rate measurement step of measuring the utilization rate of the optical disc signal processing device; a storage step of storing the range of the control target value which is obtained in the margin measurement step into a nonvolatile memory together with the utilization rate outputted from the utilization rate measurement step; a comparison step of comparing the range of the control target value which is stored in the nonvolatile memory with the control target value which is adjusted by the control target value adjustment step; and an adjustment method switching step of changing the change amount of the control target value changed by the control target value change step, on the basis of the number of measurements for the adjustment reference signal that is used for adjusting the control target value by the control target value adjustment step or the output from the control target value adjustment step, and switching the control target value adjustment method on the basis of the output from the comparison step; wherein the adjustment method used in the control target value adjustment step, or the number of measurements for the adjustment reference signal, or the change amount of the control target value is optimized so that the control target value adjusted by the control target value adjustment step is included in the range of the control target value which is obtained by the margin measurement step and stored in the nonvolatile memory.

According to Claim 20 of the present invention, there is provided an optical disc signal processing method comprising: a driving step of changing the physical position or angle of an optical pickup; an error detection step of detecting the physical positional relation between the optical pickup and a recording medium from an electric signal generated by the optical pickup; a control target value change step of changing a control target value in an optical disc signal processing device; a control step of controlling the drive step according to the outputs from the error detection step and the control target value change step; an adjustment reference signal generation step of generating an adjustment reference signal for adjusting the control target value; a control target value adjustment step of adjusting the control target value changed in the control target value change step, on the basis of the output from the adjustment reference signal generation step; a margin measurement step of obtaining a range of the control target value from its minimum value to its maximum value, the control target value being changed in the control target value change step, within which range the optical disc signal processing device can perform normal operation; a condition setting step of setting a threshold value of the adjustment reference signal when measuring the range in the margin measurement step; a utilization rate measurement step of measuring the utilization rate of the optical disc signal processing device; a storage step of storing the range of the control target value which is obtained in the margin measurement step into a nonvolatile memory together with the utilization rate outputted from the utilization rate measurement step; a comparison step of comparing the range of the control target value which is stored in the nonvolatile memory with the control target value which is adjusted in the control target value adjustment step; a number-of-rotations selection step of selecting the number of rotations of the recording medium on the basis of the output from the comparison step; a number-of-rotations acquisition step of obtaining the number of rotations of the recording medium; and a rotation control step of outputting a drive signal for rotating the recording medium with the target number of rotations according to the outputs from the number-of-rotations selection step and the number-of-rotations acquisition step; wherein the range of the control target value which is obtained in the margin measurement step is stored in the nonvolatile memory together with the utilization rate which is outputted from the utilization rate measurement step and the number of rotations of the recording medium which is outputted from the number-of-rotations acquisition step, and the number-of-rotations of the recording medium is optimized in the number-of-rotations selection step so that the control target value adjusted in the control target value adjustment step is included in the range of the control target value which is obtained in the margin measurement step and stored in the nonvolatile memory.

According to Claim 21 of the present invention, there is provided an optical disc signal processing device comprising: a driving step of changing the physical position or angle of an optical pickup; an error detection step of detecting the physical positional relation between the optical pickup and a recording medium from an electric signal generated by the optical pickup; a control target value change step of changing a control target value in an optical disc signal processing device; a control step of controlling the drive step according to the outputs from the error detection step and the control target value change step; an adjustment reference signal generation step of generating an adjustment reference signal for adjusting the control target value; a control target value adjustment step of adjusting the control target value changed in the control target value change step, on the basis of the output from the adjustment reference signal generation step; a margin measurement step of obtaining a range of the control target value from its minimum value to its maximum value, the control target value being changed in the control target value change step, within which range the optical disc signal processing device can perform normal operation; a condition setting step of setting a threshold value of the adjustment reference signal when measuring the range in the margin measurement step; a utilization rate measurement step of measuring the utilization rate of the optical disc signal processing device; a storage step of storing the range of the control target value which is obtained in the margin measurement step into a nonvolatile memory together with the utilization rate outputted from the utilization rate measurement step; and a maximum utilization rate estimation step of estimating a utilization rate with which the range of the control target value becomes equal to or lower than a threshold value, from the utilization rate of the optical disc signal processing device which is stored in the nonvolatile memory and the range of the control target value which is obtained in the margin measurement step.

According to Claim 22 of the present invention, there is provided an optical disc signal processing method comprising: a driving step of changing the physical position or angle of an optical pickup; an error detection step of detecting the physical positional relation between the optical pickup and a recording medium from an electric signal generated by the optical pickup; a control target value change step of changing a control target value in an optical disc signal processing device; a control step of controlling the drive step according to the outputs from the error detection step and the control target value change step; an adjustment reference signal generation step of generating an adjustment reference signal for adjusting the control target value; a control target value adjustment step of adjusting the control target value changed in the control target value change step, on the basis of the output from the adjustment reference signal generation step; a margin measurement step of obtaining a range of the control target value from its minimum value to its maximum value, the control target value being changed in the control target value change step, within which range the optical disc signal processing device can perform normal operation; a condition setting step of setting a threshold value of the adjustment reference signal when measuring the range in the margin measurement step; a utilization rate measurement step of measuring the utilization rate of the optical disc signal processing device; a storage step of storing the range of the control target value which is obtained in the margin measurement step into a nonvolatile memory together with the utilization rate outputted from the utilization rate measurement step; a maximum utilization rate estimation step of estimating a utilization rate with which the range of the control target value becomes equal to or lower than a threshold value, from the utilization rate of the optical disc signal processing device which is stored in the nonvolatile memory, and the range of the control target value which is obtained in the margin measurement step; and a warning output step of outputting a warning message when the output result of the maximum utilization rate estimation step varies exceeding a predetermined threshold value.

According to Claim 23 of the present invention, there is provided an optical disc signal processing method comprising: a driving step of changing the physical position or angle of an optical pickup; an error detection step of detecting the physical positional relation between the optical pickup and a recording medium from an electric signal generated by the optical pickup; a control target value change step of changing a control target value in an optical disc signal processing device; a control step of controlling the drive step according to the outputs from the error detection step and the control target value change step; an adjustment reference signal generation step of generating an adjustment reference signal for adjusting the control target value; a control target value adjustment step of adjusting the control target value changed in the control target value change step, on the basis of the output from the adjustment reference signal generation step; a margin measurement step of obtaining a range of the control target value from its minimum value to its maximum value, the control target value being changed in the control target value change step, within which range the optical disc signal processing device can perform normal operation; a condition setting step of setting a threshold value of the adjustment reference signal when measuring the range in the margin measurement step; a utilization rate measurement step of measuring the utilization rate of the optical disc signal processing device; a storage step of storing the range of the control target value which is obtained in the margin measurement step into a nonvolatile memory together with the utilization rate outputted from the utilization rate measurement step; a program change step of changing a program for managing the respective steps; a program comparison step of comparing the identification information of the program for the previous margin measurement which is stored in the nonvolatile memory with the identification information of the changed program; and a warning output step of comparing, based on the output from the program comparison step, the range of the control target value with which the optical disc signal processing device can perform normal operation, which range is obtained after the program has been changed in the program change step, with the range of the control target value which is stored in the nonvolatile memory, and outputting a warning message when the range of the control target value which is obtained after the program change is reduced exceeding a threshold value as compared with the range of the control target value which is stored in the nonvolatile memory.

According to Claim 24 of the present invention, the optical disc signal processing method defined in any of Claims 19 to 23 includes, as the driving step, a focus driving step of shifting the position of the optical pickup in the direction perpendicular to the recording medium; and as the error detection step, a focus error detection step of detecting a physical distance between the optical pickup and the recording medium from an electric signal generated by the optical pickup.

According to Claim 25 of the present invention, the optical disc signal processing method defined in any of Claims 19 to 23 includes, as the drive step, a tracking drive step of shifting the position of the pickup in the radial direction of the recording medium; and as the error detection step, a tracking error detection step which detects a physical distance between the optical pickup and the center of a groove existing on the recording medium or the center of a data sequence stored in the recording medium, from an electric signal generated by the optical pickup.

According to Claim 26 of the present invention, the optical disc signal processing method defined in any of Claims 19 to 23 includes, as the driving step, a tilt driving step of changing the physical angle of the optical pickup, and as the error detection step, a tilt error detection step of detecting a physical angle difference between the optical pickup and the recording medium from an electric signal generated by the optical pickup.

According to Claim 27 of the present invention, in the optical disc signal processing method defined in any of Claims 19 to 26, the nonvolatile memory stores the range of the control target value from its minimum value to its maximum value, which is obtained in the margin measurement step, together with the utilization rate which is outputted in the utilization rate measurement step, and stores the control target value which is adjusted in the control target value adjustment step, together with the utilization rate which is outputted in the utilization rate measurement step; and when the control target value stored in the nonvolatile memory is not included in the range of the control target value which is stored in the nonvolatile memory, the adjustment method used in the control target value adjustment step, or the number of measurements for the adjustment reference signal, or the change amount of the control target value is optimized so that the control target value stored in the nonvolatile memory is included in the range of the control target value which is stored in the nonvolatile memory.

According to Claim 28 of the present invention, the optical disc signal processing method defined in any of Claims 19 to 26 further includes a temperature measurement step of measuring the temperature of the optical disc signal processing device; and the nonvolatile memory stores the range of the control target value from its minimum value to its maximum value, which is obtained in the margin measurement step, together with the utilization rate outputted from the utilization rate measurement step, and the temperature measured in the temperature measurement step; and the comparison step corrects the range of the control target value which is obtained in the margin measurement step and stored in the nonvolatile memory, according to the temperature stored in the nonvolatile memory, and compares the corrected range of the control target value with the control target value adjusted in the control target value adjustment step.

According to Claim 29 of the present invention, the optical disc signal processing method defined in any of Claims 19 to 26 further includes a drive software identification information acquisition step of acquiring identification information of a drive software that controls the optical disc signal processing device; and the range of the control target value from its minimum value to its maximum value, which is obtained in the margin measurement step, is stored in the nonvolatile memory together with the utilization rate outputted from the utilization rate measurement step and the program identification information outputted from the drive software identification information acquisition step, and processing is carried out for each drive software identification information stored in the nonvolatile memory.

According to Claim 30 of the present invention, the optical disc signal processing method defined in any of Claims 19 to 26 further includes a recording medium identification information acquisition step of acquiring information for identifying the recording medium from the output of the adjustment reference signal generation step; and the range of the control target value from its minimum value to its maximum value, which is obtained in the margin measurement step, is stored in the nonvolatile memory together with the utilization rate outputted from the utilization rate measurement step and the recording medium identification information outputted from the recording medium identification information acquisition step, and processing is carried out for each recording medium identification information stored in the nonvolatile memory.

According to Claim 31 of the present invention, the optical disc signal processing method defined in any of Claims 19 to 26 further includes a power supply identification information acquisition step of acquiring information for identifying the type of a power supply used by the optical disc signal processing device; and the range of the control target value from its minimum value to its maximum value, which is obtained in the margin measurement step, is stored in the nonvolatile memory together with the utilization rate outputted from the utilization rate measurement step and the power supply identification information outputted from the power supply identification information acquisition step, and processing is carried out for each power supply identification information stored in the nonvolatile memory.

According to Claim 32 of the present invention, in the optical disc signal processing method defined in any of Claims 19 to 31, the utilization rate measured in the utilization rate measurement step is the time utilizing a timer.

According to Claim 33 of the present invention, in the optical disc signal processing method defined in any of Claims 19 to 31, the utilization rate measured in the utilization rate measurement step is obtained from a device having a time measurement function, which is connected to the optical disc signal processing device.

According to Claim 34 of the present invention, in the optical disc signal processing method defined in any of Claims 19 to 31, the utilization rate measured in the utilization rate measurement step is the number of times the optical disc signal processing device reproduces or records the recording medium.

According to Claim 35 of the present invention, in the optical disc signal processing method defined in any of Claims 19 to 34, a nonvolatile memory in a device connected to the optical disc signal processing device is used instead of the nonvolatile memory.

According to Claim 36 of the present invention, there is provided an optical disc reproduction and recording method for rotating a recording medium, and performing an optical disc signal processing method which is defined in any of Claims 19 to 35.

Effects of the Invention

According to the present invention, there is provided an optical disc signal processing device comprising: a drive means which changes the physical position or angle of an optical pickup; an error detection means which detects the physical positional relation between the optical pickup and a recording medium from an electric signal generated by the optical pickup; a control target value change means which changes a control target value in the optical disc signal processing device; a control means which controls the drive means according to the outputs from the error detection means and the control target value change means; an adjustment reference signal generation means which generates an adjustment reference signal for adjusting the control target value; a control target value adjustment means which adjusts the control target value changed by the control target value change means, on the basis of the output from the adjustment reference signal generation means; a margin measurement means which obtains a range of the control target value from its minimum value to its maximum value, the control target value being changed by the control target value change means, within which range the optical disc signal processing device can perform normal operation; a condition setting means which sets a threshold value of the adjustment reference signal when measuring the range by the margin measurement means; a utilization rate measurement means which measures the utilization rate of the optical disc signal processing device; a nonvolatile memory which stores the range of the control target value that is obtained by the margin measurement means together with the utilization rate outputted from the utilization rate measurement means; a comparison means which compares the range of the control target value that is stored in the nonvolatile memory with the control target value which is adjusted by the control target value adjustment means; and an adjustment method switching means which changes the change amount of the control target value changed by the control target value change means, on the basis of the number of measurements for the adjustment reference signal that is used for adjusting the control target value by the control target value adjustment means or the output from the control target value adjustment means, and switches the control target value adjustment method on the basis of the output from the comparison means; wherein the adjustment method of the control target value adjustment means, or the number of measurements for the adjustment reference signal, or the change amount of the control target value is optimized so that the control target value adjusted by the control target value adjustment means is included in the range of the control target value which is obtained by the margin measurement means and stored in the nonvolatile memory. Thereby, an optimum adjustment method for the physical position or angle of the optical pickup is automatically selected for each optical disc signal processing device such that an adjustment method having a large variation in the lens position after adjusted and a short adjustment time is used when the margin is wide, whereby the start-up time and the recording start time can be reduced, and thus the user's convenience can be enhanced. Further, even in the case where inexpensive elements having large variations in aging deterioration are used, an adjustment method having a less variation in the convergent lens position after adjusted and a long adjustment time is used when the elements of the drive are deteriorated and the margin is narrowed, whereby the reproduction and recording qualities of the optical disc device after shipment can be maintained.

Further, according to the present invention, there is provided an optical disc signal processing device comprising: a drive means which changes the physical position or angle of an optical pickup; an error detection means which detects the physical positional relation between the optical pickup and a recording medium from an electric signal generated by the optical pickup; a control target value change means which changes a control target value in the optical disc signal processing device; a control means which controls the drive means according to the outputs from the error detection means and the control target value change means; an adjustment reference signal generation means which generates an adjustment reference signal for adjusting the control target value; a control target value adjustment means which adjusts the control target value changed by the control target value change means, on the basis of the output from the adjustment reference signal generation means; a margin measurement means which obtains a range of the control target value from its minimum value to its maximum value, the control target value being changed by the control target value change means, within which range the optical disc signal processing device can perform normal operation; a condition setting means which sets a threshold value of the adjustment reference signal when measuring the range using the margin measurement means; a utilization rate measurement means which measures the utilization rate of the optical disc signal processing device; a nonvolatile memory which stores the range of the control target value that is obtained by the margin measurement means, together with the utilization rate outputted from the utilization rate measurement means; a comparison means which compares the range of the control target value that is stored in the nonvolatile memory with the control target value which is adjusted by the control target value adjustment means; a number-of-rotations selection means which selects the number of rotations of the recording medium on the basis of the output from the comparison means; a number-of-rotations acquisition means which obtains the number of rotations of the recording medium; and a rotation control means which outputs a drive signal for rotating the recording medium with the target number of rotations according to the outputs from the number-of-rotations selection means and the number-of-rotations acquisition means; wherein the range of the control target value which is obtained by the margin measurement means is stored in the nonvolatile memory together with the utilization rate which is outputted from the utilization rate measurement means and the number of rotations of the recording medium which is outputted from the number-of-rotations acquisition means, and the number-of-rotations of the recording medium is optimized by the number-of-rotations selection means so that the control target value adjusted by the control target value adjustment means is included in the range of the control target value which is obtained by the margin measurement means and stored in the nonvolatile memory. Therefore, the optimum number of rotations of the recording medium is automatically selected for each optical disc signal processing device such that the number of rotations is reduced to extend the margin when the margin is narrowed, whereby the reproduction time and the recording time can be reduced as compared with the case where reproduction or recording of the recording medium is performed with a reduced rotation speed after an error occurred in performing reproduction or recording with a high rotation speed, and thus the user's convenience can be enhanced. Further, even in the case where inexpensive elements having large variations in aging deterioration are used, the number of rotations is reduced to increase the margin when the elements of the drive are deteriorated and the margin is narrowed, whereby the reproduction and recording qualities of the optical disc device after shipment can be maintained.

According to the present invention, there is provided an optical disc signal processing device comprising: a drive means which changes the physical position or angle of an optical pickup; an error detection means which detects the physical positional relation between the optical pickup and a recording medium from an electric signal generated by the optical pickup; a control target value change means which changes a control target value in the optical disc signal processing device; a control means which controls the drive means according to the outputs from the error detection means and the control target value change means; an adjustment reference signal generation means which generates an adjustment reference signal for adjusting the control target value; a control target value adjustment means which adjusts the control target value changed by the control target value change means, on the basis of the output from the adjustment reference signal generation means; a margin measurement means which obtains a range of the control target value from its minimum value to its maximum value, the control target value being changed by the control target value change means, within which range the optical disc signal processing device can perform normal operation; a condition setting means which sets a threshold value of the adjustment reference signal when measuring the range using the margin measurement means; a utilization rate measurement means which measures the utilization rate of the optical disc signal processing device; a nonvolatile memory which stores the range of the control target value that is obtained by the margin measurement means together with the utilization rate outputted from the utilization rate measurement means; and a maximum utilization rate estimation means which estimates a utilization rate with which the range of the control target value becomes equal to or lower than a threshold value, from the utilization rate of the optical disc signal processing device which is stored in the nonvolatile memory and the range of the control target value which is obtained by the margin measurement means. Therefore, when the range of the margin is narrowed with the passage of time after drive shipment, a utilization rate at which the range of the adjusted convergent lens position from its minimum value to its maximum value becomes not to be included in the range of the convergent lens position is estimated, whereby the user of the optical disc signal processing device can know the period during which the recording medium can be normally reproduced and recorded.

According to the present invention, there is provided an optical disc signal processing device comprising: a drive means which changes the physical position or angle of an optical pickup; an error detection means which detects the physical positional relation between the optical pickup and a recording medium from an electric signal generated by the optical pickup; a control target value change means which changes a control target value in the optical disc signal processing device; a control means which controls the drive means according to the outputs from the error detection means and the control target value change means; an adjustment reference signal generation means which generates an adjustment reference signal for adjusting the control target value; a control target value adjustment means which adjusts the control target value changed by the control target value change means, on the basis of the output from the adjustment reference signal generation means; a margin measurement means which obtains a range of the control target value from its minimum value to its maximum value, the control target value being changed by the control target value change means, within which range the optical disc signal processing device can perform normal operation; a condition setting means which sets a threshold value of the adjustment reference signal when measuring the range using the margin measurement means; a utilization rate measurement means which measures the utilization rate of the optical disc signal processing device; a nonvolatile memory which stores the range of the control target value that is obtained by the margin measurement means together with the utilization rate outputted from the utilization rate measurement means; a maximum utilization rate estimation means which estimates the utilization rate with which the range of the control target value becomes equal to or lower than a threshold value, from the utilization rate of the optical disc signal processing device which is stored in the nonvolatile memory and the range of the control target value which is obtained by the margin measurement means; and a warning output means which outputs a warning message when the output result of the maximum utilization rate estimation means varies exceeding the predetermined threshold value. Therefore, when the range of the margin is narrowed with the passage of time after drive shipment, the result which is obtained by previously estimating the utilization rate at which the range of the adjusted convergent lens position from its minimum value to its maximum value becomes not to be included in the range of the convergent lens position is compared with the currently estimated result, and data informing a failure of the drive is outputted to the device to which the drive is connected, whereby the user of the optical disc signal processing device can know the abnormal state of the optical disc processing device before the device breaks down.

According to the present invention, there is provided an optical disc signal processing device comprising: a drive means which changes the physical position or angle of an optical pickup; an error detection means which detects the physical positional relation between the optical pickup and a recording medium from an electric signal generated by the optical pickup; a control target value change means which changes a control target value in the optical disc signal processing device; a control means which controls the drive means according to the outputs from the error detection means and the control target value change means; an adjustment reference signal generation means which generates an adjustment reference signal for adjusting the control target value; a control target value adjustment means which adjusts the control target value changed by the control target value change means, on the basis of the output from the adjustment reference signal generation means; a margin measurement means which obtains a range of the control target value from its minimum value to its maximum value, the control target value being changed by the control target value change means, within which range the optical disc signal processing device can perform normal operation; a condition setting means which sets a threshold value of the adjustment reference signal when measuring the range using the margin measurement means; a utilization rate measurement means which measures the utilization rate of the optical disc signal processing device; a nonvolatile memory which stores the range of the control target value from its minimum value to its maximum value, which is obtained by the margin measurement means, together with the utilization rate outputted from the utilization rate measurement means; a program change means which changes a program for managing the respective means; a program comparison means which compares the identification information of the program for the previous margin measurement which is stored in the nonvolatile memory with the identification information of the changed program; and a warning output means which compares, based on the output from the program comparison means, the range of the control target value with which the optical disc signal processing device can perform normal operation, which range is obtained after the program has been changed by the program change means, with the range of the control target value which is stored in the nonvolatile memory, and outputs a warning message when the range of the control target value that is obtained after the program change is reduced exceeding a threshold value as compared with the range of the control target value which is stored in the nonvolatile memory. Therefore, when the margin measurement result of the current program is smaller than the previous margin measurement result, the margin is narrowed after the program change, and thereby the user of the optical disc signal processing device is informed by the warning message that the program after changed might deteriorate the reproduction and recording qualities of the recording medium as compared with the program before changed, and thus the user who emphasizes the reproduction and recording qualities can avoid using of the program which might deteriorate the reproduction and recording qualities.

According to the present invention, the optical disc signal processing device further includes a temperature measurement means which measures the temperature of the optical disc signal processing device; the nonvolatile memory stores the range of the control target value from its minimum value to its maximum value, which is obtained by the margin measurement means, together with the utilization rate outputted from the utilization rate measurement means and the temperature measured by the temperature measurement means; and the comparison means corrects the range of the control target value which is obtained by the margin measurement means and stored in the nonvolatile memory, according to the temperature stored in the nonvolatile memory, and compares the corrected range of the control target value with the control target value adjusted by the control target value adjustment means. Therefore, even when the temperature at margin measurement varies, the margin measurement result is corrected by the temperature measurement result, and the optimum adjustment method for the physical position or angle of the optical pickup is automatically selected for each optical disc signal processing device such that an adjustment method having a large variation in the lens position after adjusted and a short adjustment time is used when the margin is wide, whereby the start-up time and the recording start time can be reduced, and thus the user's convenience can be enhanced. Further, even in the case where inexpensive elements having large variations in aging deterioration are used, the margin measurement result is corrected according to the temperature, and an adjustment method having less variation in the convergent lens position after adjusted and a long adjustment time is used when the elements of the drive are deteriorated and the margin is narrowed, whereby the reproduction and recording qualities of the optical disc device after shipment can be maintained.

BRIEF DESCRIPTION OF THE DRAWINGS

FIG. 23 shows the drive operation and the data structure (1) of the optical disc signal processing device according to the third embodiment.

FIG. 24 shows the drive operation and the data structure (2) of the optical disc signal processing device according to the third embodiment.

Figure 1:
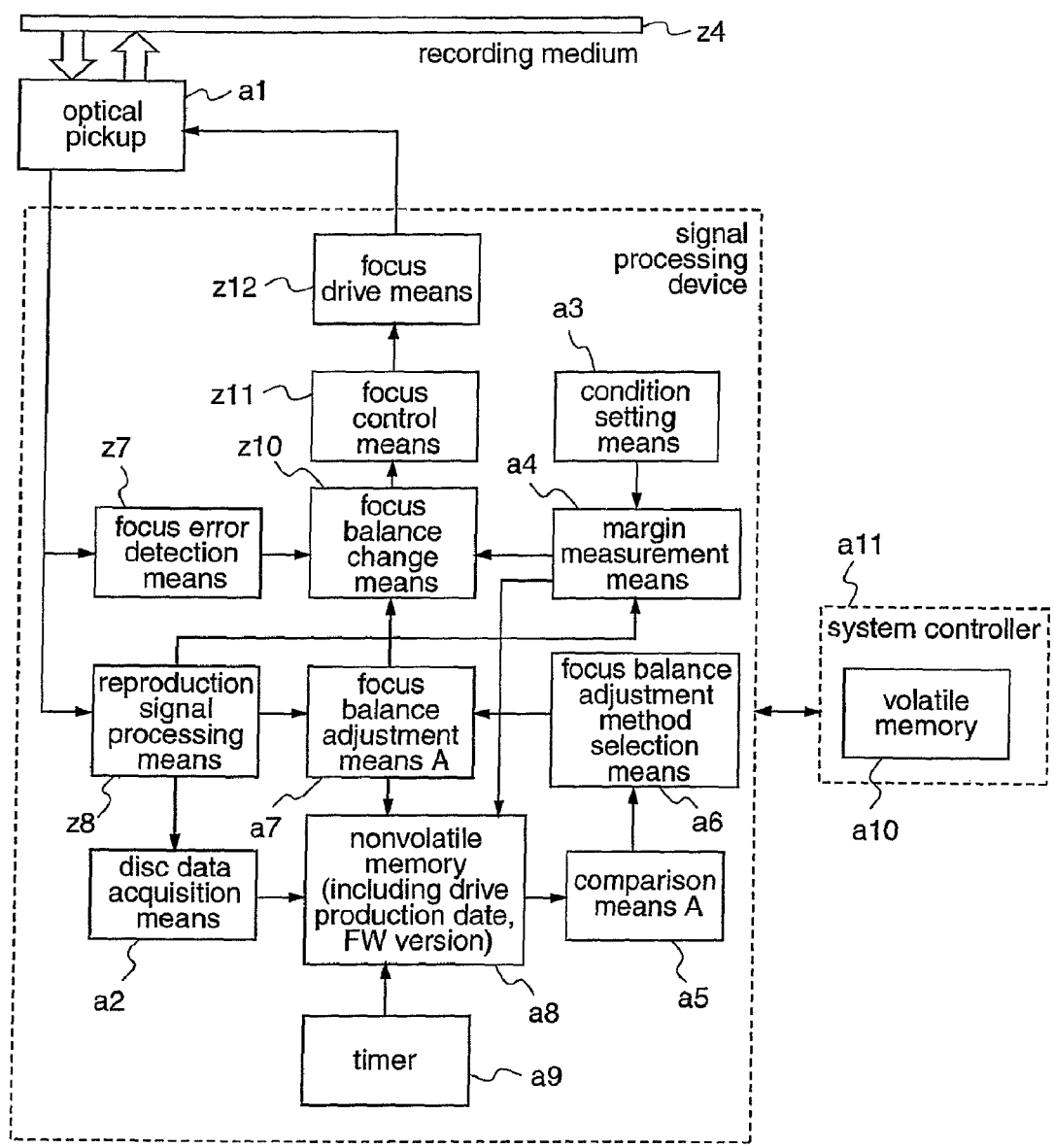
FIG. 1 is a system configuration diagram of an optical disc signal processing device according to a first embodiment of the present invention.
Figure 2:
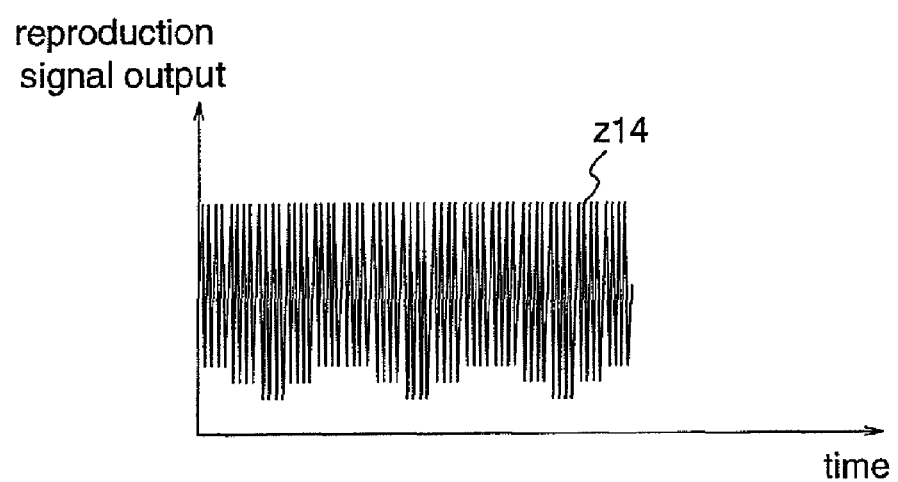
FIG. 2 shows a reproduction signal output.
Figure 3:
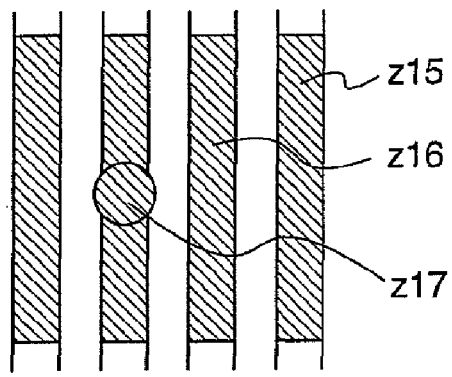
FIG. 3 shows a spot of a light beam on a recording medium.

DESCRIPTION OF REFERENCE NUMERALS a1 . . . optical pickup
a2 . . . disc data acquisition means
a3 . . . condition setting means
a4 . . . margin measurement means
a5 . . . comparison means A
a6 . . . focus balance adjustment method selection means
a7 . . . focus balance adjustment means A
a8 . . . nonvolatile memory
a9 . . . timer
a10 . . . volatile memory
a11 . . . system controller
b1 . . . rotation means
b2 . . . number-of-rotations acquisition means
b3 . . . rotation control means
b4 . . . comparison means B
b5 . . . number-of-rotations selection means
c1 . . . comparison means C
c2 . . . estimation result output means
d1 . . . failure warning output means
e1 . . . temperature measurement means
e2 . . . comparison means E
f1 . . . program change means
f2 . . . program comparison means
f3 . . . warning means
sa1 . . . disc data acquisition step
sa2 . . . focus balance adjustment method acquisition step
sa3 . . . focus balance adjustment step A
sa4 . . . focus balance adjusted value storage step A
sa5 . . . focus balance value acquisition step
sa6 . . . access step
sa7 . . . margin measurement step A
sa8 . . . focus balance value restoration step
sb1 . . . focus balance adjustment step B
sb3 . . . margin measurement step B
sc1 . . . estimation result output step
sd1 . . . failure warning output step
se1 . . . focus balance adjustment method acquisition step B
se2 . . . margin measurement step C
sf1 . . . program comparison step
sf2 . . . warning step
sf3 . . . program change step
sf4 . . . identification information storage step
Disc1 . . . data for individually identifying recording medium
time . . . time elapsed after drive shipment
value . . . convergent lens position
mgn_max . . . maximum value of convergent lens position at margin measurement
mgn_min . . . minimum value of convergent lens position at margin measurement
adj_max . . . maximum value of convergent lens position at adjustment
adj_min . . . minimum value of convergent lens position at adjustment
mgn_max1 . . . maximum value of convergent lens position at margin measurement (1st time)
mgn_min1 . . . minimum value of convergent lens position at margin measurement (1st time)
mgn_max2 . . . maximum value of convergent lens position at margin measurement (2nd time)
mgn_min2 . . . minimum value of convergent lens position at margin measurement (2nd time)
mgn_max3 . . . maximum value of convergent lens position at margin measurement (3rd time)
mgn_min3 . . . minimum value of convergent lens position at margin measurement (3rd time)
mgn_maxN . . . maximum value of convergent lens position at margin measurement (Nth time)
mgn_minN . . . minimum value of convergent lens position at margin measurement (Nth time)
Limit . . . estimation result outputted from comparison means Cc1
temp . . . temperature measurement result
Version A . . . program identification information at margin measurement
Version B . . . program identification information which is stored after program change by program change means
z1 . . . light source
z2 semi-transparent mirror
z3 . . . convergent lens
z4 . . . recording medium
z5 . . . focus driving circuit
z6 . . . divided photodetector
z7 . . . focus error detection means
z8 . . . reproduction signal processing means
z9 . . . focus balance adjustment means
z10 . . . focus balance change means
z11 . . . focus control means
z12 . . . focus drive means
z13 . . . laser light path from light source to divided photodetector
z14 . . . reproduction signal output
z15 . . . signal recording track on recording medium z16 ... unrecorded portion between tracks
z17 ... light beam spot on recording medium
z18 ... minimum value of reproduction signal amplitude required for accurately reproducing data from recording medium
z19 ... minimum value of convergent lens position with which reproduction signal amplitude becomes z18 or more
z20 ... maximum value of convergent lens position with which reproduction signal amplitude becomes z18 or more
z21 ... margin
z22 ... maximum value of reproduction jitter required for accurately reproducing data from recording medium
z23 ... minimum value of convergent lens position with which reproduction jitter becomes z22 or less
z24 ... maximum value of convergent lens position with which reproduction jitter becomes z22 or more
z25 ... margin
A1 ... procedure 1 of convergent lens position adjustment method A or C
A2 ... procedure 2 of convergent lens position adjustment method A or C
A3 ... procedure 3 of convergent lens position adjustment method A or C
A4 ... procedure 4 of convergent lens position adjustment method A or C
A(1) ... convergent lens position before execution of procedure 1 of adjustment method A or C
A(2) ... convergent lens position during execution of procedure 1 of adjustment method A or C
A(3) ... convergent lens position after execution of procedure 1 of adjustment method A or C
A(4) ... convergent lens position after execution of procedure 2 of adjustment method A or C
A(5) ... convergent lens position after execution of procedure 3 of adjustment method A or C
A(6) ... convergent lens position after execution of procedure 4 of adjustment method A or C
B1 ... procedure 1 of conversion lens position adjustment method B or D
B2 ... procedure 2 of conversion lens position adjustment method B or D
B3 ... procedure 3 of conversion lens position adjustment method B or D
B(1) ... conversion lens position before execution of procedure 1 of adjustment method B or D
B(2) ... conversion lens position after execution of procedure 1 of adjustment method B or D
B(3) ... conversion lens position after execution of procedure 2 of adjustment method B or D
B(4) ... conversion lens position after execution of procedure 3 of adjustment method B or D
B(5) ... conversion lens position after execution of adjustment method B or D

BEST MODE TO EXECUTE THE INVENTION

Embodiment 1

FIG. 1 is a system configuration diagram of an optical disc signal processing device according to a first embodiment of the present invention. The present invention is provided with a focus error detection means z7, a reproduction signal processing means z8, a focus balance change means z10, a focus control means z11, a focus drive means z12, an optical pickup a1, a disc data acquisition means a2, a condition setting means a3, a margin measurement means a4, a comparison means Aa5, a focus balance adjustment method selection means a6, a focus balance adjustment means Aa7, a nonvolatile memory a8, a timer a9, and a system controller a11 which includes a volatile memory a10, and manages the above-mentioned respective means with programs.

Next, the respective constituents will be described along the signal transmission path.

Since the focus error detection means z7, the reproduction signal processing means z8, the focus balance change means z10, the focus control means z11, the focus drive means z12, and the optical pickup a1 have already been described, repeated description is not necessary.

The disc data acquisition means a2 acquires data for individually identifying the recording medium z4 by using a reproduction signal z14 outputted from the reproduction signal processing means z8. As an example of the data for individually identifying the recording medium z4, there is BCA (Burst Cutting Area) data which has previously been embedded in the recording medium z4.

The condition setting means a3 outputs a minimum value z18 of the reproduction signal amplitude which is required to accurately reproduce the data from the set recording medium z4, to the margin measurement means a4.

Figure 7:
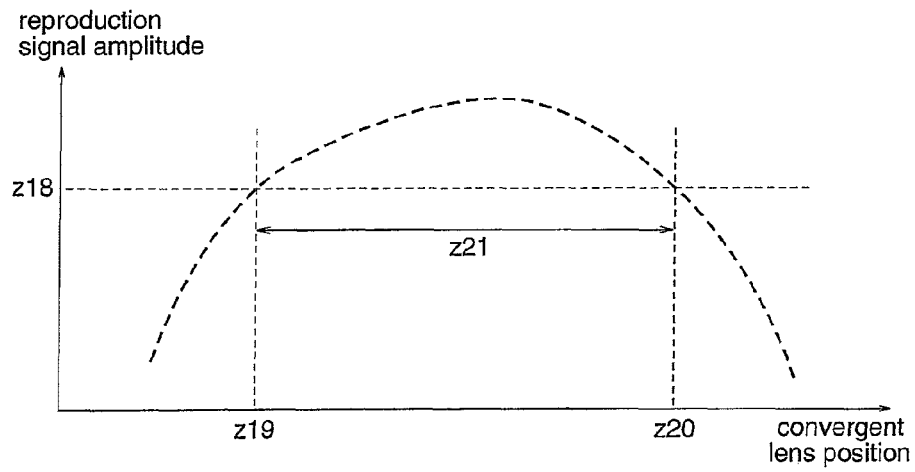
FIG. 7 shows the relation between the focus position and the margin (the case of the reproduction signal amplitude).
Figure 8:
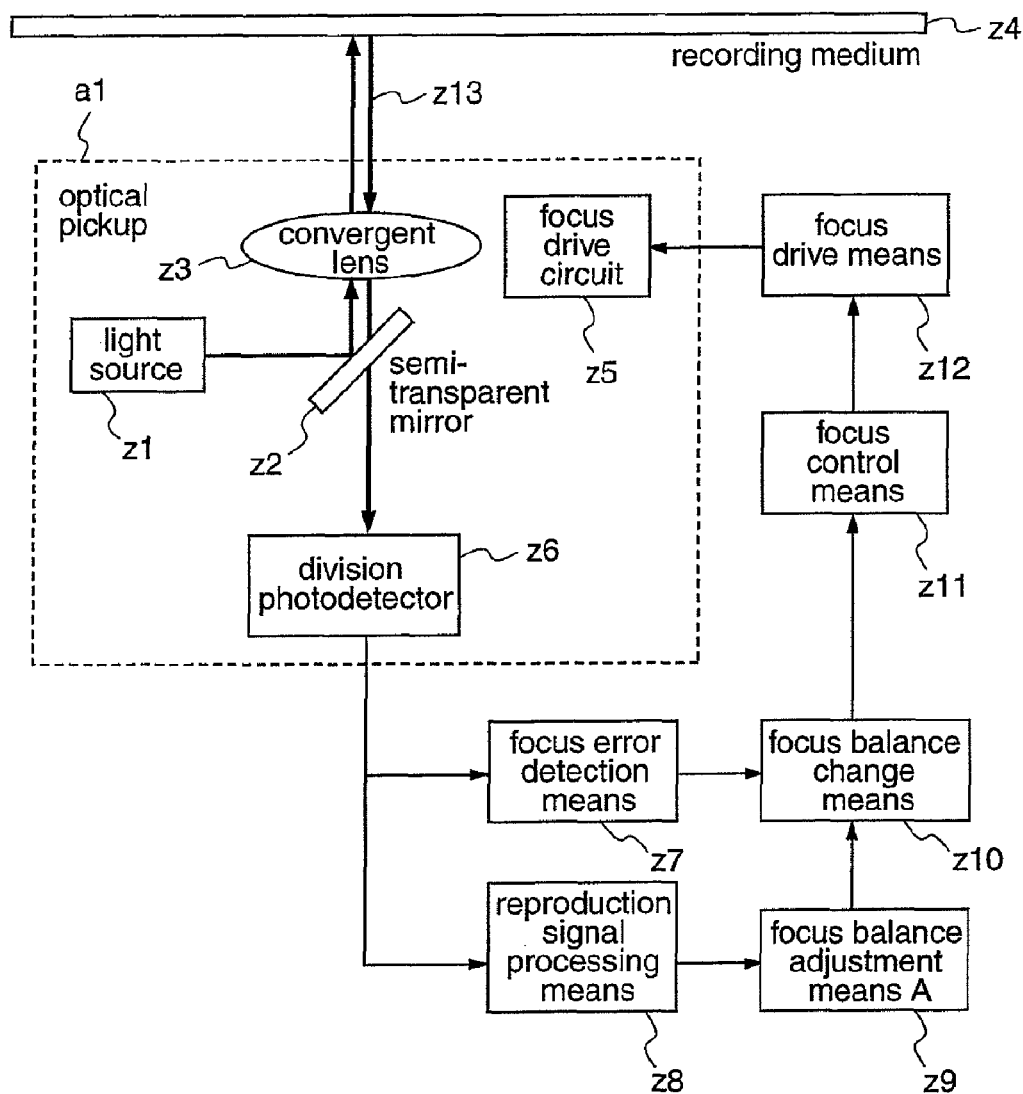
FIG. 8 is a system configuration diagram of a conventional focus control device.

The margin measurement means a4 adds an offset to a focus error signal by using the focus balance change means z10 to move the convergent lens position, and obtains the reproduction signal amplitude after the lens position movement from the reproduction signal processing means z8. By repeating this operation, the margin measurement means a4 obtains the relation between the convergent lens position and the reproduction signal amplitude shown in FIG. 7, and obtains the range (z19,z20) of the convergent lens position in which the reproduction signal amplitude exceeds z18 from the minimum value z18 of the reproduction signal amplitude required to accurately reproduce the data from the recording medium z4, which minimum value z18 is set by the condition setting means a3, and then stores the range (z19,z20) of the convergent lens position in the nonvolatile memory a8.

The comparison means Aa5 compares the convergent lens position range (z19,z20) stored in the nonvolatile memory a8 with the adjusted convergent lens position outputted from the focus balance adjustment means Aa7, and outputs the comparison result to the focus balance adjustment method selection means a6. The manner of obtaining the comparison result will be described later.

The focus balance adjustment method selection means a6 outputs a signal for selecting an adjustment method from the above-mentioned adjustment method A and adjustment method B according to the output of the comparison means Aa5, to the focus balance adjustment means Aa7.

The focus balance adjustment means Aa7 executes the adjustment method A or the adjustment method B according to the output from the focus balance adjustment method selection means a6, and stores the adjusted convergent lens position in the nonvolatile memory a8. Further, the focus balance adjustment means Aa7 changes the number of measurements for the reproduction signal or the movement amount of the convergent lens position when performing the adjustment method.

The nonvolatile memory a8 stores the convergent lens position range (z19,z20) outputted from the margin measurement means a4, and the data indicating the utilization rate of the drive, which is outputted from the timer a9. Further, the nonvolatile memory a8 stores the data for individually identifying the recording medium z4 which is outputted from the disc data acquisition means a2, and the adjusted convergent lens position which is outputted from the focus balance adjustment means Aa7, according to the operation of the program embedded in the system controller which is described later. Then, the nonvolatile memory a8 outputs the stored contents to the comparison means Aa5.

The timer a9 outputs the data indicating the utilization rate of the drive. To be specific, the data indicating the utilization rate of the drive specifically is the time elapsed after shipment of the drive, or the absolute time which is counted by a device to which an acquirable drive is connected through a cable (e.g., ATAPI cable) connecting the drive and the device, or the counter value which is counted up every time the drive reproduces or records the recording medium. As for a command format to be used when the drive and the device connected to the drive perform data exchange through the cable, an ATAPI command or a DIAG command may be adopted (an original command format used when data exchange is performed between the program which is operated on the system controller a11 and the program which is operated on the device connected to the drive).

While in the present invention the nonvolatile memory a8 included in the optical disc signal processing device is used, a nonvolatile memory included in a device connected to the optical disc signal processing device may be used. Further, while in the present invention the data indicating the utilization rate of the drive is obtained from the timer a9, it may be obtained from a device having a time measurement function, which is connected to the optical disc signal processing device.

Next, a description will be given of the operation of the program embedded in the system controller a11. The operation of the program includes the case where the adjusted convergent lens position outputted from the focus balance adjustment means Aa7 is used (first operation) and the case where the adjusted convergent lens position is not used (second operation). A difference between the first operation and the second operation will be described as additional contents to the description of the first operation. The first and second operations are examples of functions possessed by the drive, and the first operation which utilizes the adjusted convergent lens position outputted from the focus balance adjustment means Aa7 can select more appropriate adjustment method as compared with the second operation.

FIG. 13 is a flowchart showing the procedure of the first operation of the optical disc signal processing device of this first embodiment, wherein (a) shows the procedure at start-up or before start of recording, and (b) shows the procedure during margin measurement. The specific steps in the flowchart will be described.

The following steps are executed at start-up or before start of recording.

Figure 13A:
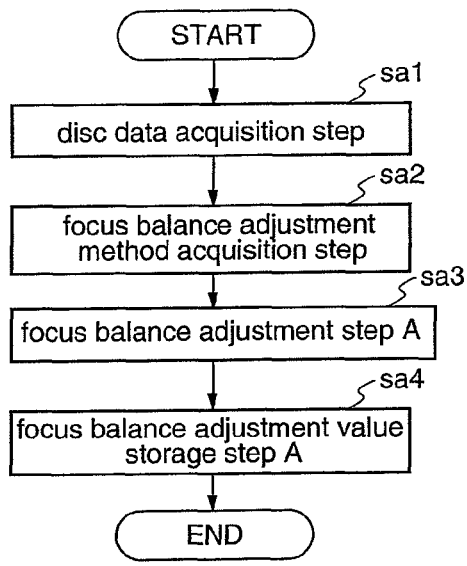
FIG. 13 is a flowchart illustrating the program operation of the optical disc signal processing device according to the first embodiment.

As shown in FIG. 13(a), initially, in a disc data acquisition step sa1, the disc data acquisition means a2 is operated to obtain the data for individually identifying the recording medium z4, and stores the data in the volatile memory a10.

Next, in a focus balance adjustment method acquisition step sa2, the comparison means Aa5 is operated, and a signal for selecting an adjustment method from the above-described adjustment method A and adjustment method B is outputted from the comparison means Aa5 to the focus balance adjustment means Aa7.

In a focus balance adjustment step Asa3, the adjustment method A or the adjustment method B is executed using the focus balance adjustment means Aa7, and the adjusted convergent lens position is stored in the volatile memory a10. The adjustment method is selected according to the signal for selecting an adjustment method from the adjustment methods A and B.

In a focus balance adjusted value storage step Asa4, the data for individually identifying the recording medium z4, which is stored in the volatile memory a10, the adjusted convergent lens position, and the data indicating the utilization rate of the drive, which is outputted from the timer a9, are stored in the nonvolatile memory a8. In the case of the second operation, this step is not executed.

The system controller a11 continuously monitors the data outputted from the timer a9, and executes the following steps when the data is increased by a certain value.

Figure 13B:
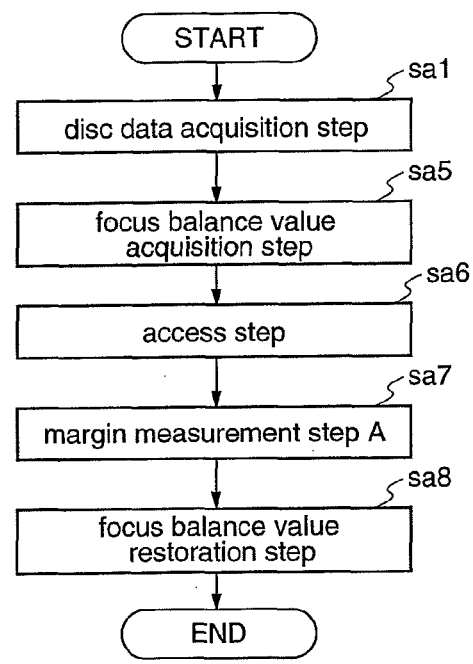

As shown in FIG. 13(b), initially, the disc data acquisition step sa1 is carried out. Since the disc data acquisition step sa1 has already been described, repeated description is not necessary.

Next, in a focus balance value acquisition step sa5, the convergent lens position is obtained and stored in the volatile memory a10.

In an access step sa6, the optical pickup a1 is moved to a position on the recording medium z4 where the reproduction signal amplitude is to be measured.

In a margin measurement step A sa1, the margin measurement means a4 is operated to obtain the range (z19,z20) of the convergent lens position, and the obtained range is stored in the nonvolatile memory a8 together with the data for individually identifying the recording medium z4, which is stored in the volatile memory a10, and the data indicating the utilization rate of the drive, which is outputted from the timer a9.

In a focus balance value restoration step sa8, the convergent lens position stored in the volatile memory a10 in the focus balance value acquisition step sa5 is restored.

Next, the drive operation and the data structure stored in the nonvolatile memory a8, which are obtained when the optical disc signal processing method of this first embodiment is executed; will be described with reference to FIGS. 14 to 20.

Figure 14:
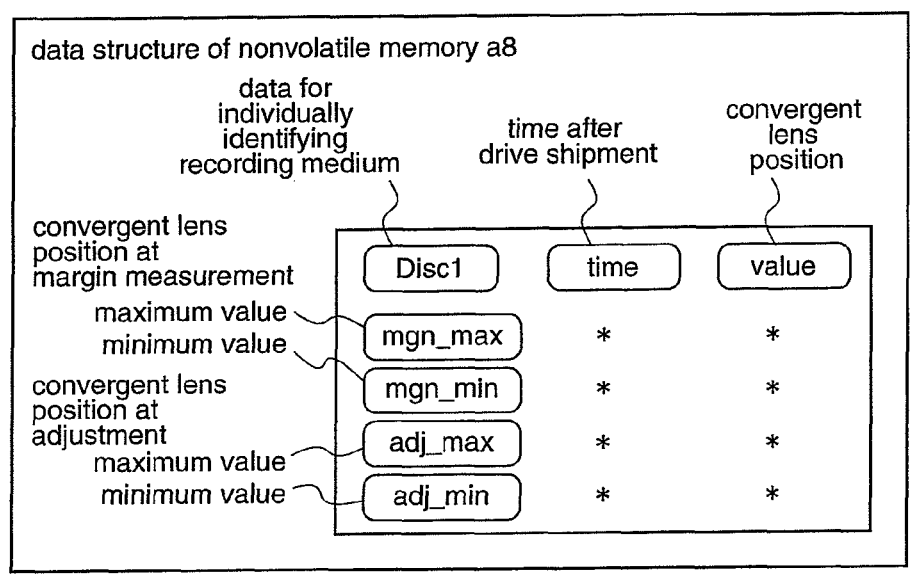
FIG. 14 shows the drive operation and the data structure (1) of the optical disc signal processing device according to the first embodiment.

FIG. 14 shows the data structure which is stored in the nonvolatile memory a8 in the optical disc signal processing device of this first embodiment.

In FIG. 14, "mgn_max" denotes the maximum value of the convergent lens position at margin measurement, "mgn_min" denotes the minimum value of the convergent lens position at margin measurement, "adj_max" denotes the maximum value of the convergent lens position at adjustment, and "adj_min" denotes the minimum value of the convergent lens position at adjustment. Further, "Disc1" denotes the data for individually identifying the recording medium, "time" denotes the time elapsed after drive shipment, and "value" denotes the convergent lens position.

In the case of performing the operation B which does not utilize the adjusted convergent lens position outputted from the focus balance adjustment means Aa7, the maximum value (adj_max) and the minimum value (adj_min) of the convergent lens position during adjustment do not exist.

Figure 15:
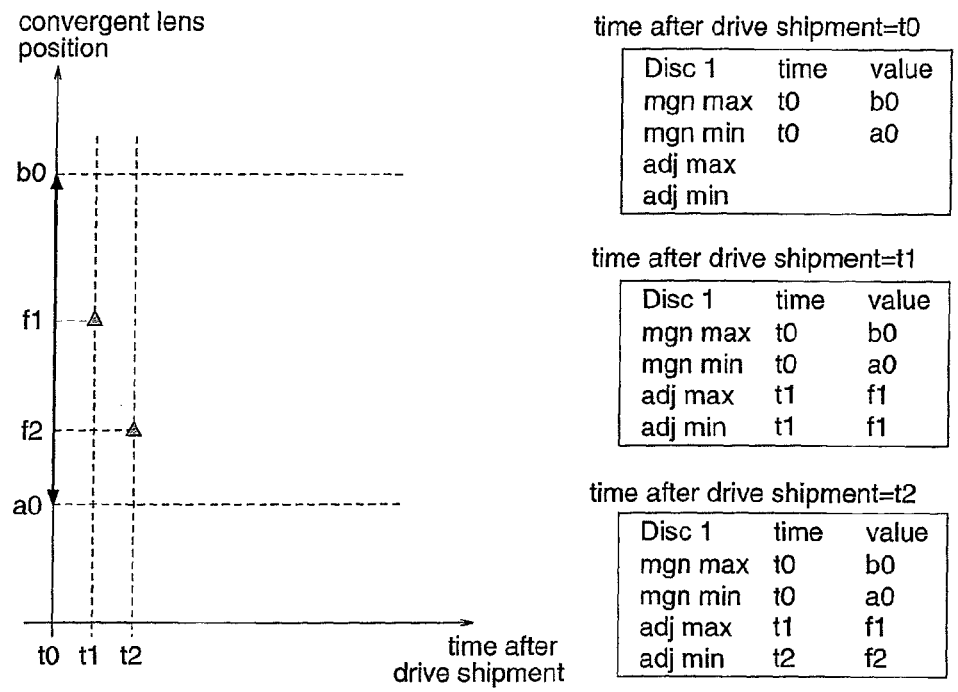
FIG. 15 shows the drive operation and the data structure (2) of the optical disc signal processing device according to the first embodiment.
Figure 16:
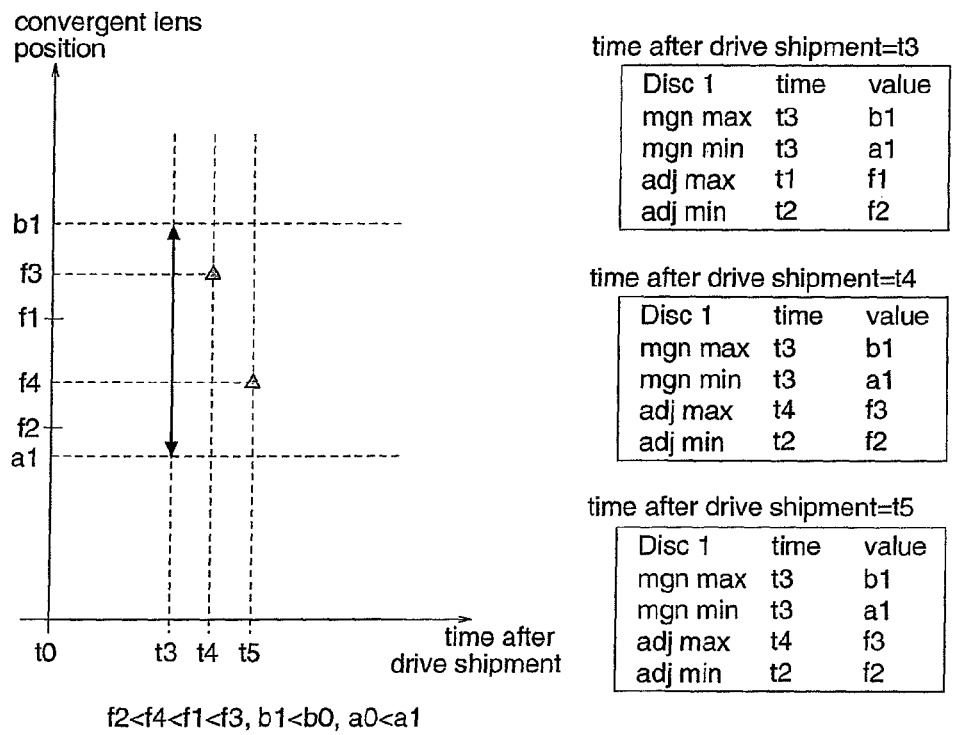
FIG. 16 shows the drive operation and the data structure (3) of the optical disc signal processing device according to the first embodiment.
Figure 17:
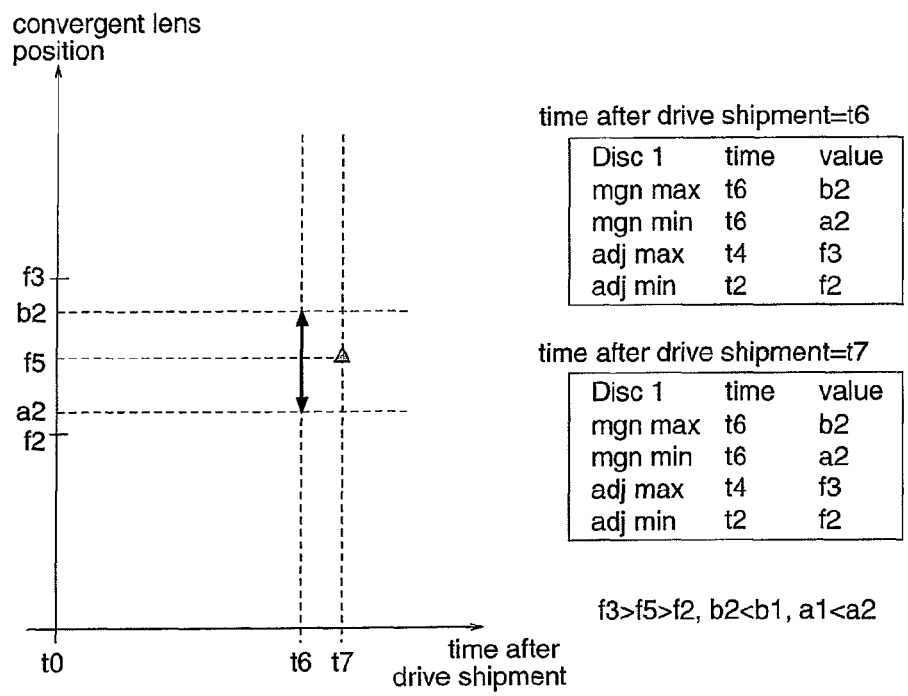
FIG. 17 shows the drive operation and the data structure (4) of the optical disc signal processing device according to the first embodiment.

FIGS. 15 to 17 show the drive operation and the data contents stored in the nonvolatile memory a8, which are obtained when the first operation of the optical disc signal processing device of the first embodiment is executed. Hereinafter, the details of conditional expressions used in FIGS. 15 to 17 will be described. When the data for individually identifying the recording medium z4 is utilized, the processes of conditional expressions A to E are performed only when the data for individually identifying the recording medium z4, which is currently obtained by reproducing the recording medium and stored in the volatile memory a10, matches the data for individually identifying the recording medium z4, which has previously been obtained by reproducing the recording medium and stored in the nonvolatile memory a8. When the data for individually identifying the recording medium z4 is not utilized, the processes of the conditional expressions A to E are carried out regardless of the data for individually identifying the recording medium z4, which is stored in the volatile memory a10, and the data for individually identifying the recording medium z4, which is stored in the nonvolatile memory a8. When the data for individually identifying the recording medium z4 is utilized, an adjustment method can be selected with respect to a specific disc such as a DVD-RAM or a DVD-R. When the data for individually identifying the recording medium z4 is not utilized, an adjustment method can be selected without distinguishing the disc.

[Conditional Expression A]
(i) When mgn_max>adj_max and adj_min>mgn_min or when values are not stored for all of mgn_max, mgn_min, adj_max, and adj_min, the adjustment method A is executed. That is, when the maximum value of the convergent lens position at margin measurement is larger than the maximum value of the convergent lens position at adjustment and the minimum value of the convergent lens position at margin measurement is smaller than the minimum value of the convergent lens position at adjustment, or when values are not stored for the maximum value and minimum value of the convergent lens position at margin measurement and the maximum value and minimum value of the convergent lens position at adjustment, the adjustment method A is executed.
(ii) When mgn_max<adj_max or adj_min<mgn_min, the adjustment method B is executed. That is, when the maximum value of the convergent lens position at margin measurement is smaller than the maximum value of the convergent lens position at adjustment and the minimum value of the convergent lens position at margin measurement is larger than the minimum value of the convergent lens position at adjustment, the adjustment method B is executed.

[Conditional Expression B]
(i) When the maximum value of the convergent lens position after margin measurement (m_max)<mgn_max of the nonvolatile memory a8, or when no value is stored for mgn_max, the value of mgn_max is changed to m_max. That is, when the maximum value of the convergent lens position after margin measurement is smaller than the maximum value of the convergent lens position at margin measurement which is stored in the nonvolatile memory a8, or when no value is stored for the maximum value of the convergent lens position at margin measurement, the maximum value of the convergent lens position at margin measurement is changed to the maximum value of the convergent lens position after margin measurement.
(ii) When the maximum value of the convergent lens position after margin measurement (m_max)>mgn_max of the nonvolatile memory a8, nothing is executed.

[Conditional Expression C]
(i) When the minimum value of the convergent lens position after margin measurement (m_min)>mgn_min stored in the nonvolatile memory a8 or when no value is stored for mgn_min, the value of mgn_min is changed to m_min. That is, when the minimum value of the convergent lens position after margin measurement is larger than the minimum value of the convergent lens position at margin measurement which is stored in the nonvolatile memory a8 or when no value is stored for the minimum value of the convergent lens position at margin measurement, the value of the minimum value of the convergent lens position at margin measurement is changed to the minimum value of the convergent lens position after margin measurement.
(ii) When the minimum value of the convergent lens position after margin measurement (m_min)<mgn_min stored in the nonvolatile memory a8, nothing is executed.

[Conditional Expression D]
(i) When the maximum value of the convergent lens position after adjustment (a_max)>adj_max stored in the nonvolatile memory a8 or when no value is stored for adj_max, the value of adj_max is changed to a_max. That is, when the maximum value of the convergent lens position after adjustment is larger than the maximum value of the convergent lens position at adjustment which is stored in the nonvolatile memory a8 or when no value is stored for the maximum value of the convergent lens position at adjustment, the maximum value of the convergent lens position at adjustment is changed to the maximum value of the convergent lens position after adjustment.
(ii) When the maximum value of the convergent lens position after adjustment (a_max)<adj_max in the nonvolatile memory a8, nothing is executed.

[Conditional Expression E]
(i) When the minimum value of the convergent lens after adjustment (a_min)<adj_min stored in the nonvolatile memory a8 or when no value is stored for adj_min, the value of the adj_min is changed to a_min. That is, when the minimum value of the convergent lens position after adjustment is smaller than the minimum value of the convergent lens position at adjustment which is stored in the nonvolatile memory a8, or when no value is stored for the minimum value of the convergent lens position at adjustment, the minimum value of the convergent lens position at adjustment is changed to the minimum value of the convergent lens position after adjustment.
(ii) When the minimum value of the convergent lens position after adjustment (a_min)>adj_min in the nonvolatile memory a8, nothing is executed.

When time has not passed after drive shipment, the margin is wide and the convergent lens position at adjustment is included in the range of the margin, and therefore, the adjustment method A is selected as shown in Conditional Expression A(i). However, when time has passed after the drive shipment, the parts of the drive are deteriorated and the margin becomes narrower, and thereby the convergent lens position at adjustment is not included in the range of the margin, and thus the adjustment method B is selected as shown in Conditional Expression A(ii).

Further, margin measurement is periodically carried out after shipment of the drive, and the state where the margin becomes narrower is stored in the nonvolatile memory a8 in the conditional expressions B(i) and C(i).

Hereinafter, FIGS. 15 to 17 will be described.

In FIG. 15, when the time elapsed after drive shipment is to, the margin is measured, and the measurement result is stored in the nonvolatile memory a8 according to the conditional expressions B and C. To be specific, since no values are stored for mgn_max and mgn_min, b0 and a0 are stored for mgn_max and mgn_min, respectively, according to the conditional expressions B(i) and C(i). Accordingly, in the nonvolatile memory a8, mgn_max has time t0 and value b0, and mgn_min has time t0 and value a0.

Next, when the time elapsed after drive shipment is t1, the contents of the nonvolatile memory a8 are obtained, and the adjustment method is selected according to the conditional expression A. Since no values are stored for adj_max and adj_min, the conditional expression A(i) is satisfied, and thereby the adjustment method A is executed. Since no values are stored for adj_max and adj_min, f1 is stored for adj_max and adj_min, respectively, according to the conditional expressions D(i) and E(i). Accordingly, in the nonvolatile memory a8, mgn_max has time t0 and value b0, mgn_min has time t0 and value a0, adj_max has time t1 and value f1, and adj_min has time t1 and value f1.

When the time elapsed after drive shipment is t2, the contents of the nonvolatile memory a8 are obtained to select an adjustment method according to the conditional expression A. Since b0>f1 and f2>a0, the conditional expression A(i) is satisfied, and thereby the adjustment method A is executed. Since f2<f1, adj_min is changed from f1 to f2 without changing adj_max according to the conditional expressions D(ii) and E(i). Accordingly, in the nonvolatile memory a8, mgn_max has time t0 and value b0, mgn_min has time t0 and value a0, adj_max has time t1 and value f1, and adj_min has time t2 and value f2.

In FIG. 16, when the time elapsed after drive shipment is t3, the margin is measured, and the measurement result is stored in the nonvolatile memory a8 according to the conditional expressions B and C. To be specific, since b1<b0 and a1>a0, mgn_max is changed from b0 to b1 and mgn_min is changed from a0 to a1 according to the conditional expressions B(i) and C(i). Accordingly, in the nonvolatile memory a8, mgn_max has time t3 and value b1, mgn_min has time t3 and value a1, adj_max has time t1 and value f1, and adj_min has time t2 and value f2.

Next, when the time elapsed after drive shipment is t4, the contents of the nonvolatile memory a8 are obtained, and an adjustment method is selected according to the conditional expression A. Since b1>f1 and f2>a1, the conditional expression A(i) is satisfied, and thereby the adjustment method A is executed. Since f3>f1, adj_max is changed from f1 to f3 with adj_min remaining at f1 according to the conditional expressions D(i) and E(ii). Accordingly, in the nonvolatile memory a8, mgn_max has time t3 and value b1, mgn_min has time t3 and value a1, adj_max has time t4 and value f3, and adj_min has time t2 and value f2.

When the time elapsed after drive shipment is t5, the contents of the nonvolatile memory a8 are obtained, and an adjustment method is selected according to the conditional expression A. Since the conditional expression A(i) is satisfied, the adjustment method A is executed, and the result is stored in the nonvolatile memory a8 according to the conditional expressions D and E. To be specific, since b1>f3 and a1>f2, the conditional expression A(i) is satisfied, and thereby the adjustment method A is executed. Since f4<f3 and f4>f2, adj_max remains at f3 and adj_min remains at f2 according to the conditional expressions D(ii) and E(ii). Accordingly, in the nonvolatile memory a8, mgn_max has time t3 and value b1, mgn_min has time t3 and value a1, adj_max has time t4 and value f3, and adj_min has time of t2 and value of f2.

In FIG. 17, when the time elapsed after drive shipment is t6, the margin is measured, and the measurement result is stored in the nonvolatile memory a8 according to the conditional expressions B and C. That is, since b2<b1 and a2>a1, mgn_max is changed from b1 to b2 and mgn_min is changed from a1 to a2 according to the conditional expressions B(i) and C(i). Accordingly, in the nonvolatile memory a8, mgn_max has time t6 and value b2, mgn_min has time t6 and value a2, adj_max has time t4 and value f3, and adj_min has time t2 and value f2.

Next, when the time elapsed after drive shipment is t7, the contents of the nonvolatile memory a8 are obtained, and an adjustment method is selected according to the conditional expression A. Since b2<f3 and f2<a2, the conditional expression A(ii) is satisfied, and thereby the adjustment method B is executed. Since f5<f3 and f5>f2, adj_max remains at f3 and adj_min remains at f2 according to the conditional expressions D(ii) and E(ii). Accordingly, in the nonvolatile memory a8, mgn_max has time t6 and value b2, mgn_min has time t6 and value a1, adj_max has time t4 and value f3, and adj_min has time of t2 and the value of f2.

Figure 18:
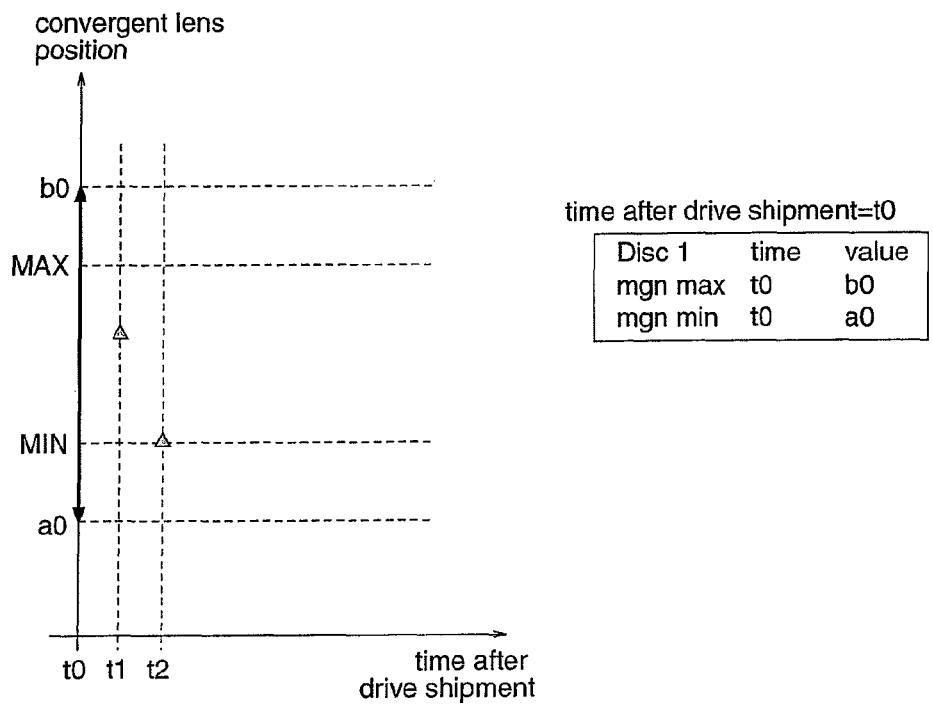
FIG. 18 shows the drive operation and the data structure (5) of the optical disc signal processing device according to the first embodiment.
Figure 19:
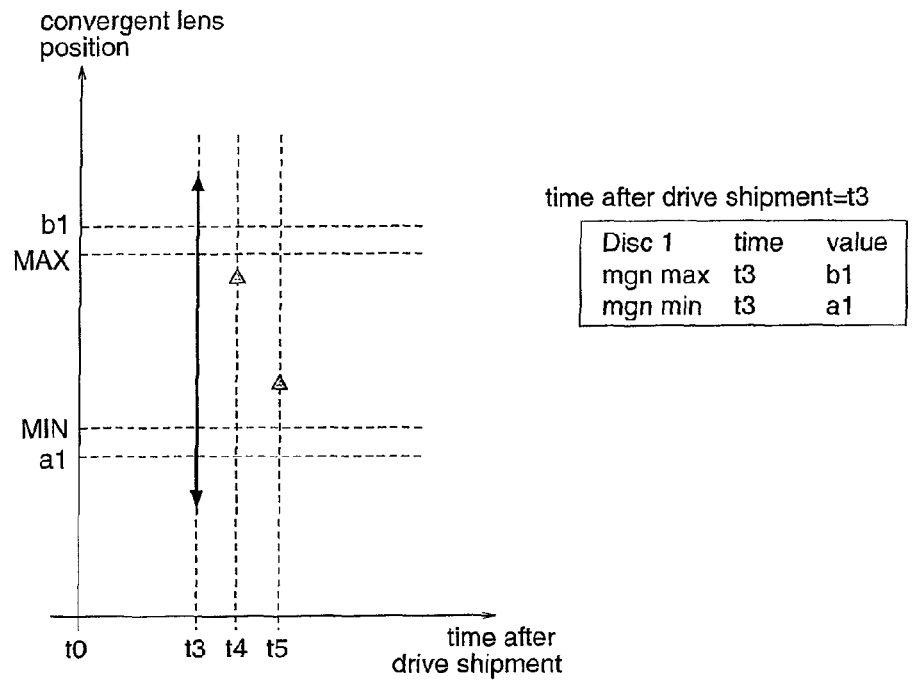
FIG. 19 shows the drive operation and the data structure (6) of the optical disc signal processing device according to the first embodiment.
Figure 20:
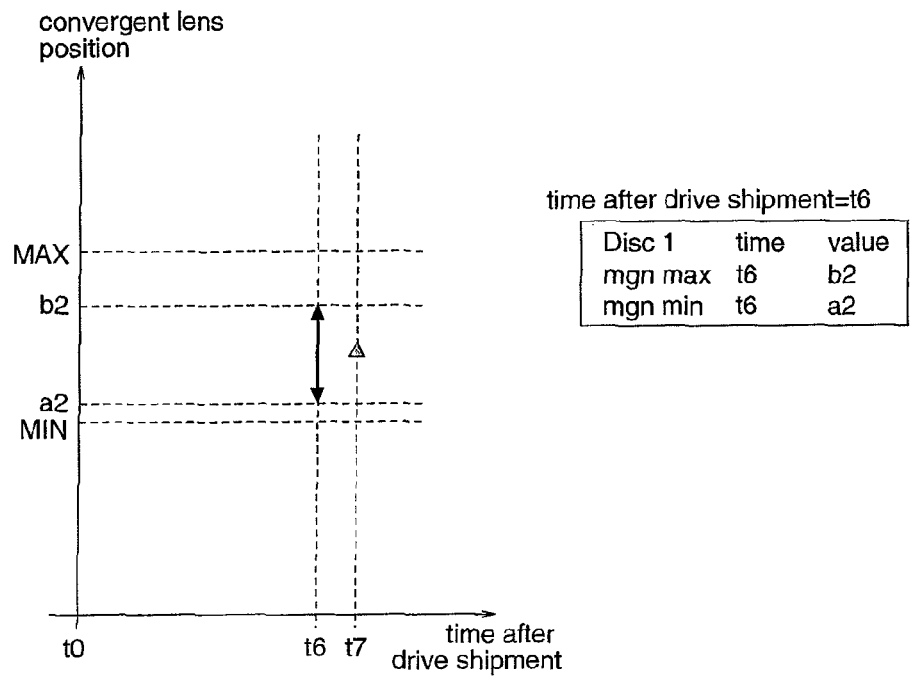
FIG. 20 shows the drive operation and the data structure (7) of the optical disc signal processing device according to the first embodiment.

FIGS. 18 to 20 show the drive operation and the data stored in the nonvolatile memory a8 which are obtained when the second operation of the optical disc signal processing device of this first embodiment is executed. The details of the conditional expressions used in FIGS. 18 to 20 will be described hereinafter. In the case of using the data for individually identifying the recording medium z4, the processes of the conditional expressions F to H are carried out only when the data for individually identifying the recording medium z4 which is stored in the volatile memory a10 matches the data for individually identifying the recording medium z4 which is stored in the nonvolatile memory a8. When the data for individually identifying the recording medium z4 is not used, the processes of the conditional expressions F to H are carried out regardless of the data for individually identifying the recording medium z4 which is stored in the volatile memory a10 and the data for individually identifying the recording medium z4 which is stored in the nonvolatile memory a8.

[Conditional Expression F]
(i) When mgn_max>MAX (fixed value) and MIN (fixed value)>mgn_min, the adjustment method A is executed. To be specific, when the maximum value of the convergent lens position at margin measurement is larger than MAX (fixed value) and the minimum value of the convergent lens position at margin measurement is smaller than MIN (fixed value), the adjustment method A is executed. MAX (fixed value) and MIN (fixed value) are predetermined values.
(ii) When mgn_max<MAX(fixed value) or MIN(fixed value)<mgn_min, the adjustment method B is executed.

[Conditional Expression G]
(i) When maximum value of the convergent lens position after margin measurement (m_max)<mgn_max stored in the nonvolatile memory or when no value is stored for mgn_max, the value of mgn_max is changed to m_max. To be specific, when the maximum value of the convergent lens position after margin measurement is smaller than the maximum value of the convergent lens position at margin measurement which is stored in the nonvolatile memory, or when no value is stored for the maximum value of the convergent lens position at margin measurement, the maximum value of the convergent lens position at margin measurement is changed to the maximum value of the convergent lens position after margin measurement.
(ii) When the maximum value of the convergent lens position after margin measurement (m_max)>mgn_max stored in the nonvolatile memory, nothing is executed.

[Conditional Expression H]
(i) When the minimum value of the convergent lens position after margin measurement (m_min)>mgn_min stored in the nonvolatile memory, or when no value is stored for mgn_min, the value of mgn_min is changed to m_min. That is, when the minimum value of the convergent lens position after margin measurement is larger than the minimum value of the convergent lens position at margin measurement which is stored in the nonvolatile memory, or when no value is stored for the minimum value of the convergent lens position at margin measurement, the minimum value of the convergent lens position at margin measurement is changed to the minimum value of the convergent lens position after margin measurement.

(ii) When the minimum value of the convergent lens position after margin measurement (m_min)<mgn_min stored in the nonvolatile memory, nothing is executed.

Hereinafter, FIGS. 18 to 20 will be described.

In FIG. 18, when the time elapsed after drive shipment is t0, the margin is measured, and the measurement result is stored in the nonvolatile memory a8 according to the conditional expressions G and H. That is, since no values are stored for mgn_max and mgn_min, b0 and a0 are stored for mgn_max and mgn_min according to the conditional expressions G(i) and H(i), respectively. Accordingly, in the nonvolatile memory a8, mgn_max has time t0 and value b0, and mgn_min has time t0 and value a0.

Next, when the time elapsed after drive shipment is t1, the contents of the nonvolatile memory a8 are obtained, and the adjustment method is selected according to the conditional expression F. Since b0>MAX(fixed value) and MIN(fixed value)>a0, the conditional expression F(i) is satisfied, and thereby the adjustment method A is executed.

When the time elapsed after drive shipment is t2, the contents of the nonvolatile memory a8 are obtained, and the adjustment method is selected according to the conditional expression F. Since b0>MAX(fixed value) and MIN(fixed value)>a0, the conditional expression F(i) is satisfied, and thereby the adjustment method A is executed.

In FIG. 19, when the time elapsed after drive shipment is t3, the margin is measured, and the measurement result is stored in the nonvolatile memory a8 according to the conditional expressions G and H. That is, since b1<b0 and a1>a0, mgn_max is changed from b0 to b1 and mgn_min is changed from a0 to a1 according to the conditional expressions G(i) and H(i). Accordingly, in the nonvolatile memory a8, mgn_max has time t3 and value b1, and mgn_min has time t3 and value a1.

Next, when the time elapsed after drive shipment is t4, the contents of the nonvolatile memory a8 are obtained, and the adjustment method is selected according to the conditional expression F. Since the conditional expression F(i) is satisfied, the adjustment method A is executed. That is, since b1>MAX(fixed value) and MIN(fixed value)>a1, the conditional expression F(i) is satisfied, and thereby the adjustment method A is executed.

When the time elapsed after drive shipment is t5, the contents of the nonvolatile memory a8 are obtained, and the adjustment method is selected according to the conditional expression F. Since b1>MAX(fixed value) and MIN(fixed value)>a1, the conditional expression F(i) is satisfied, and thereby the adjustment method A is executed.

In FIG. 20, when the time elapsed after drive shipment is t6, the margin is measured, and the measurement result is stored in the nonvolatile memory a8 according to the conditional expressions G and H. That is, since b2<b1 and a2>a1, mgn_max is changed from b1 to b2 and mgn_min is changed from a1 to a2 according to the conditional expressions G(i) and H(i). Accordingly, in the nonvolatile memory a8, mgn_max has time t6 and value b2, and mgn_min has time t6 and value a2.

Next, when the time elapsed after drive shipment is t7, the contents of the nonvolatile memory a8 are obtained, and the adjustment method is selected according to the conditional expression F. Since b2<MAX(fixed value) and MIN(fixed value)<a2, the conditional expression F(ii) is satisfied, and thereby the adjustment method B is executed.

Figure 5:
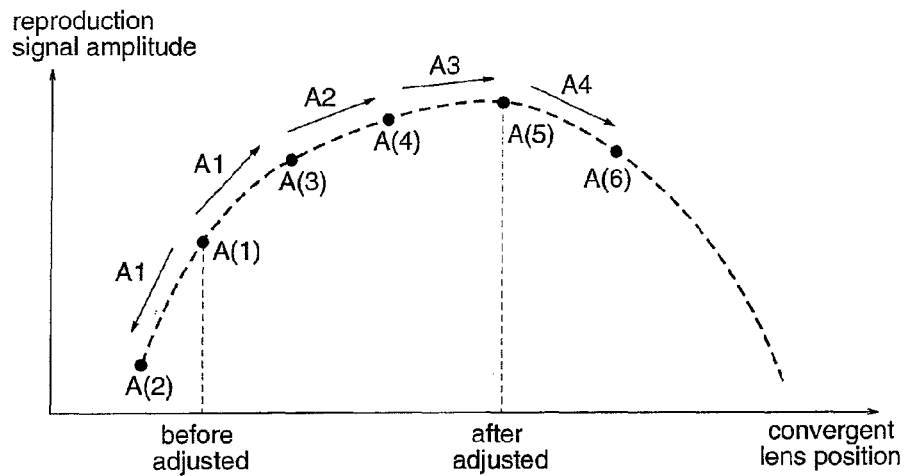
FIG. 5 shows a convergent lens position adjustment method A.
Figure 6:
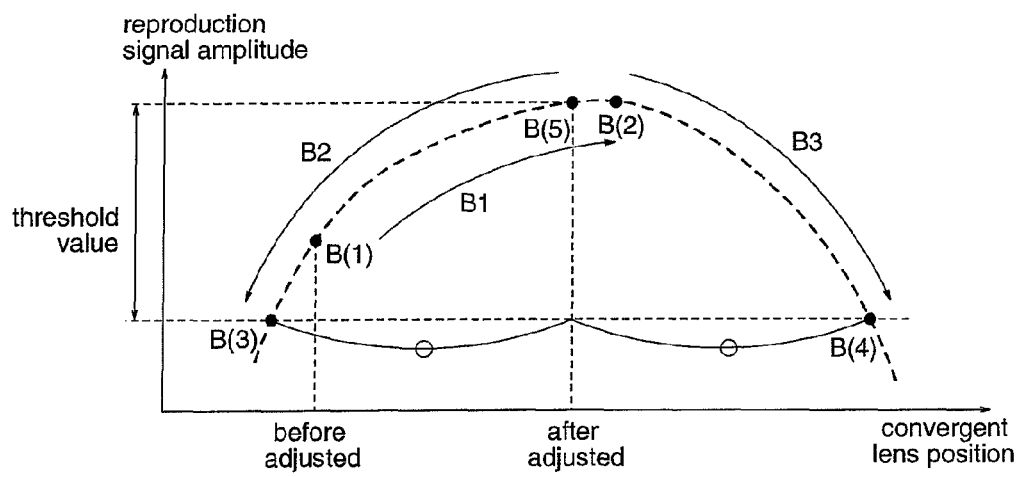
FIG. 6 shows a convergent lens position adjustment method B.

While in this first embodiment either of the adjustment method A shown in FIG. 5 or the adjustment method B shown in FIG. 6 is selected, either of first and second adjustment methods may be selected, which are obtained by changing the adjustment methods A and B with respect to the number of reproduction signal measurements or the convergent lens position movement amount by the focus balance adjustment means Aa7. For example, when the number of reproduction signal measurements in the adjustment method A shown in FIG. 5 is changed to one time or five times to provide the first adjustment method and the second adjustment method, respectively, the second adjustment method has higher precision. On the other hand, when the convergent lens position movement amount is changed to x or y (x<y) to provide the first adjustment method and the second adjustment method, respectively, the first adjustment method has higher precision.

Further, while in the first embodiment the focus error detection means z7, the focus balance change means z10, the focus control means z11, and the focus drive means z12 are used, a tracking error detection means which detects a physical distance between the optical pickup a1 and the center of the groove existing on the recording medium z4 or the center of the data sequence stored in the recording medium z4 may be provided instead of the focus error detection means z7, a tracking balance change means which adds an offset to the tracking error generated by the tracking error detection means may be provided instead of the focus balance change means z10, a tracking control means which obtains the movement amount of the convergent lens z3 for reducing the tracking error may be provided instead of the focus control means z11, and a tracking drive means which changes the position of the optical pickup a1 in the radial direction of the recording medium z4 may be provided instead of the focus drive means z12.

Furthermore, a tilt error detection means which detects a physical angle difference between the optical pickup a1 and the recording medium z4 from an electric signal generated by the optical pickup a1 may be provided instead of the focus error detection means z7, a tilt change means which adds an offset to the tilt error generated by the tilt error detection means may be provided instead of the focus balance change means z10, a tilt control means which obtains an angle change amount of the convergent lens z3 for reducing the tilt error may be provided instead of the focus control means z11, and a tilt drive means which changes the physical angle of the optical pickup a1 may be provided instead of the focus drive means z12.

The tilt error is detected from the dark-side level of the reflected beam (the output current or output voltage from the divided photodetector z6 when the reflected beam becomes dark) which is detected by the divided photodetector z6 when the laser light emitted from the optical pickup a1 passes through the physical configuration having the positional information on the disc that is called CAPA (Complementary Allocated Pit Address) when the recording medium z4 is a DVD-RAM. To be specific, the tilt error detection means detects, as a tilt error, a difference between the dark-side level of the CAPA which exists at a position shifted from the center of the groove existing on the recording medium z4 by half of the groove interval toward the center of the recording medium z4, and the dark-side level of the CAPA which exists at a position shifted from the center of the groove existing on the recording medium z4 by half of the groove interval toward the outer circumference of the recording medium z4.

Figure 9C:
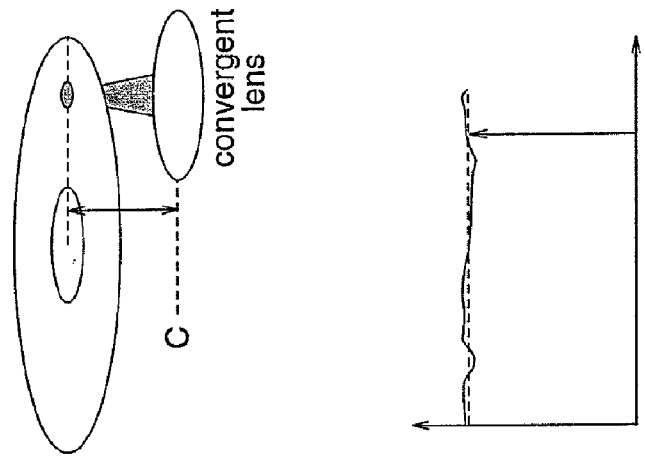
FIG. 9 shows the relation between the convergent lens position and the reproduction jitter.
Figure 9B:
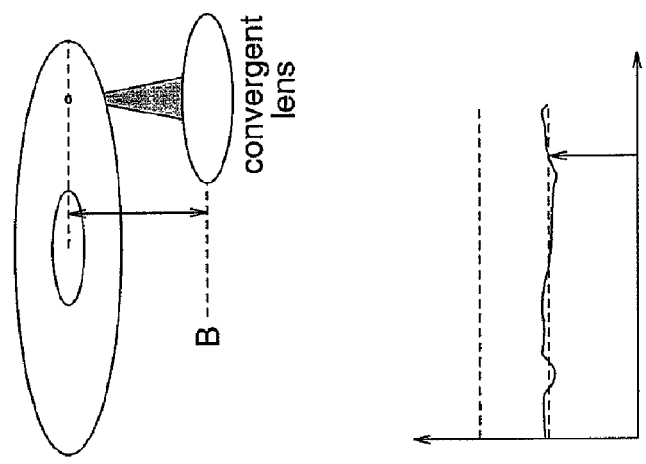
Figure 9A:
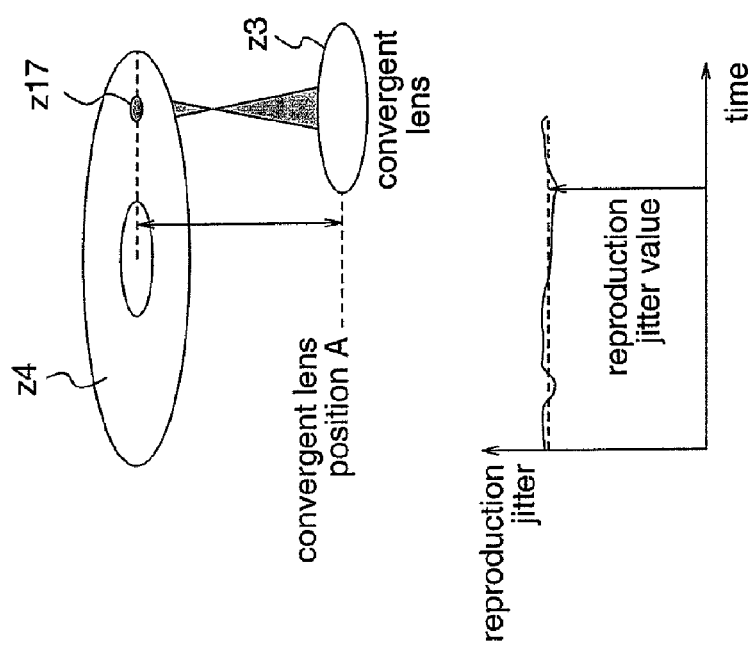

Further, while in this first embodiment the reproduction signal processing means z8 is used, a reproduction jitter processing means which outputs a difference (reproduction jitter) between the period of a signal obtained by binarizing the reproduction signal output z14 and the reference period defined in the specification of the recording medium may be provided instead of the reproduction signal processing means z8, and the same function can be realized. In this case, however, the relation between the convergent lens position and the reproduction jitter becomes as shown in FIG. 9 in contrast to the relation between the convergent lens position and the reproduction signal shown in FIG. 4. In FIG. 9, (a) to (c) show the states where the convergent lens position is A to C, respectively. The reproduction jitter varies depending on the spot diameter of the light beam. As shown in FIG. 4(b), when the light beam is focused (when the convergent lens position is B), i.e., when the light beam is correctly converged, the spot diameter becomes minimum and thereby the reproduction jitter value also becomes minimum. Since the data can be correctly reproduced from the recording medium z4 when the reproduction jitter value is minimum, the position of the convergent lens z3 is adjusted so as to make the reproduction jitter value maximum before the data is reproduced from the recording medium z4 in the optical disc device.

Figure 10:
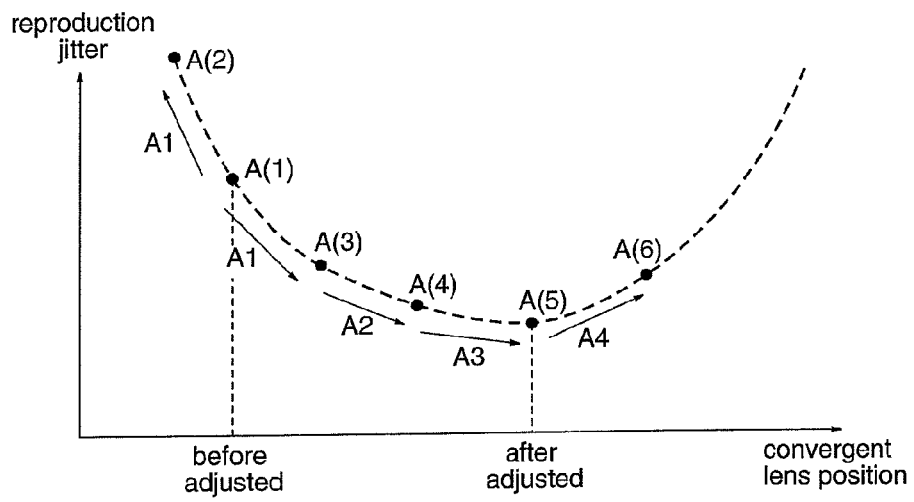
FIG. 10 shows a convergent lens position adjustment method C.
Figure 11:
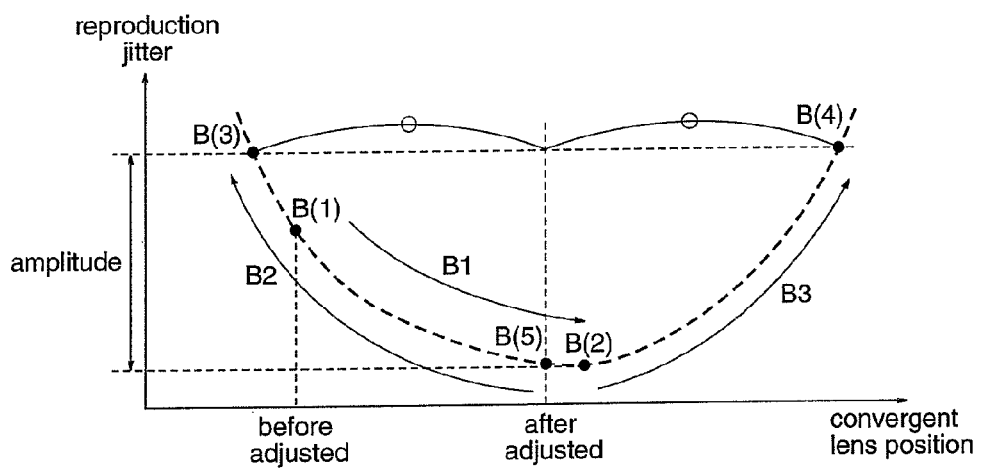
FIG. 11 shows a convergent lens position adjustment method D.
Figure 12:
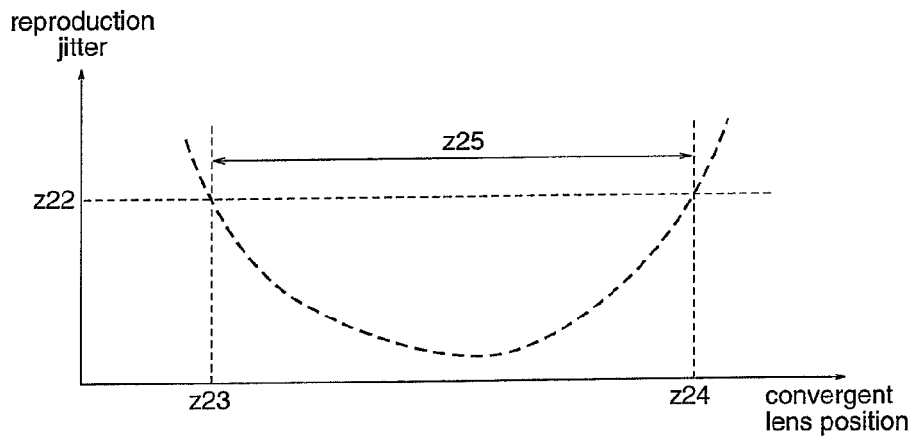
FIG. 12 shows the relation between the focus position and the margin (the case of the reproduction jitter).

According to the relation between the convergent lens position and the reproduction jitter shown in FIG. 9, the convergent lens position adjustment method becomes the convergent lens position adjustment method C shown in FIG. 10 or the convergent lens position adjustment method D shown in FIG. 11. The relation between the focus position and the margin becomes as shown in FIG. 12. Initially, the procedure of the adjustment method C will be described with reference to FIG. 10.

In FIG. 10, in step A1, the reproduction jitter of the convergent lens position A(1) before adjustment is measured. Next, the convergent lens position is changed to A(2) and the reproduction jitter is measured. Since the value of A(2) is larger than the value of A(1), the convergent lens position is changed to A(3) which is in the direction opposite to A(2).

Next, in step A2, after the value of A(3) is measured, the convergent lens position is changed to A(4) and the reproduction jitter value is measured. Since the value of A(4) is smaller than the value of A(3), the process goes to step A3.

In step A3, the convergent lens position is changed to A(5) and the reproduction jitter value is measured. Since the value of A(5) is larger than the value of A(4), the process goes to step A4.

In step A4, the lens position is changed to A(6) and the reproduction jitter value is measured. Since the value of A(6) is larger than the value of A(5), the adjustment is ended having A(5) as the lens position after adjustment.

Next, the procedure of the adjustment method D will be described using FIG. 11.

Initially, in step B1, the reproduction jitter value of the convergent lens position B(1) before adjustment is measured. Next, the convergent lens position is adjusted to the lens position B(2) at which the reproduction jitter value becomes minimum, by the same procedure as that of the adjustment method A shown in FIG. 5.

Next, in step B2, the lens position is changed from B(2) in the direction opposite to that in the step B1 to find the lens position B(3) having a value obtained by subtracting a threshold value from the reproduction jitter value at the lens position B(2).

In step B3, the lens position is changed from B(2) in the same direction as in step B1 to find the lens position B(4) having an amplitude obtained by subtracting a threshold value from the reproduction jitter value at the lens position B(2).

In step B4, the adjustment is ended having the lens position B(5) which is an intermediate position between B(3) and B(4) as the lens position after adjustment.

FIG. 12 shows the relation between the reproduction jitter value and the convergent lens position. Assuming that the maximum value of the reproduction jitter value which is required to accurately reproduce data from the recording medium z4 is z22, the convergent lens position at which the reproduction jitter value becomes equal to or lower than z22 is in a range from z23 to z24. This range is called a margin z25.

Figure 4A:
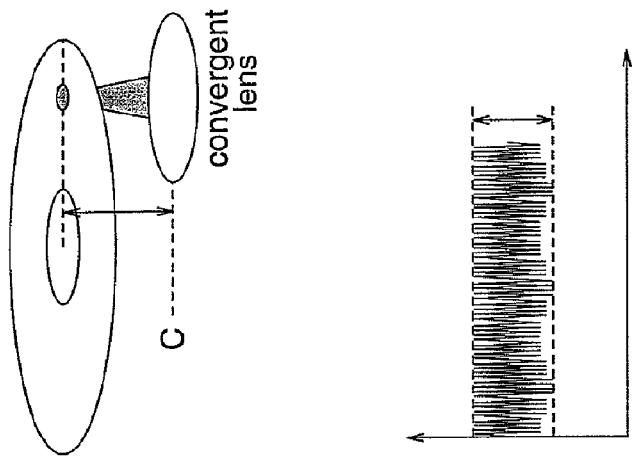
FIG. 4 shows the relation between the convergent lens position and the reproduction signal.
Figure 4B:
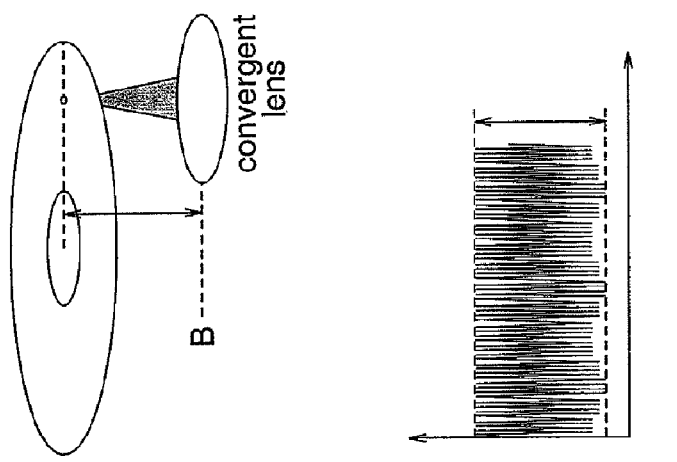
Figure 4C:
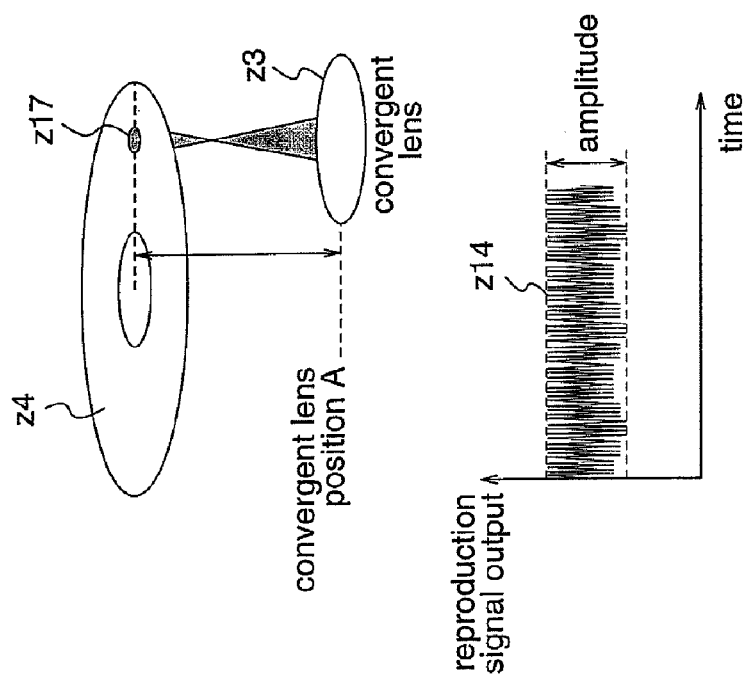

Further, when the movement amount of the convergent lens z3 for reducing the tracking error is not outputted from the tracking control means to the tracking drive means, the relation between the tracking error detected by the tracking error detection means and the convergent lens position becomes equal to the relation between the convergent lens position and the reproduction signal shown in FIG. 4, and therefore, the tracking error detection means may be used instead of the reproduction signal processing means z8.

Further, when the movement amount of the convergent lens z3 for reducing the tracking error is outputted from the tracking control means to the tracking drive means, the relation between the convergent lens position and the amplitude of the detection signal of the groove (wobble) existing on the recording medium z4 becomes equal to the relation between the convergent lens position and the reproduction signal shown in FIG. 4, and therefore, the wobble signal processing means which outputs the amplitude of the wobble detection signal may be used instead of the reproduction signal processing means z8.

Further, since the relation between the convergent lens position and a difference (wobble jitter) between the period of the signal obtained by binarizing the wobble detection signal and the reference period which is defined in the specification of the recording medium becomes equal to the relation between the convergent lens position and the reproduction jitter which is shown in FIG. 9, the wobble jitter processing means which outputs the wobble jitter may be used instead of the reproduction signal processing means z8.

As described above, the optical disc signal processing device of this first embodiment comprises the focus balance adjustment means Aa7 which adjusts the convergent lens position by using the focus balance change means z10 on the basis of the output from the reproduction signal processing means z8, the margin measurement means a4 which obtains the range of the convergent lens position from its minimum value to its maximum value, within which the optical disc signal processing device can perform normal operation, the condition setting means a3 which sets a threshold value of the reproduction signal when measuring the margin, the timer a9 which measures the utilization rate of the optical disc signal processing device, the nonvolatile memory a8 which stores the range of the convergent lens position that is obtained by the margin measurement means a4 together with the utilization rate outputted from the timer a9, the comparison means Aa5 which compares the range of the convergent lens position that is stored in the nonvolatile memory a8 with the convergent lens position adjusted by the focus balance adjustment means Aa7, and the focus balance adjustment method selection means a6 which changes the number of times of reproduction signal measurement to be used when adjusting the convergent lens position or the convergent lens position movement amount and selects the convergent lens position adjustment method according to the output of the comparison means Aa5, and the adjustment method of the focus balance adjustment means A a7, or the number of times of reproduction signal measurement, or the convergent lens position movement amount are optimized so that the convergent lens position adjusted by the focus balance adjustment means Aa7 is included within the range of the convergent lens position. Therefore, the optimum method for adjusting the physical position or angle of the optical pickup can be automatically selected for each optical disc signal processing device such that the adjustment method having a large variation in the lens position after adjusted and a short adjustment time is used when the margin is wide, whereby the start-up time and the recording start time are reduced, and thus the user's convenience can be enhanced. Further, even in the case where inexpensive elements having large variations in aging deterioration are used, the adjustment method having a less variation in the convergent lens position after adjusted and a long adjustment time is used when the elements of the drive are deteriorated and the margin is narrowed, whereby the reproduction and recording qualities of the optical disc device after shipment can be maintained.

Embodiment 2

Figure 21:
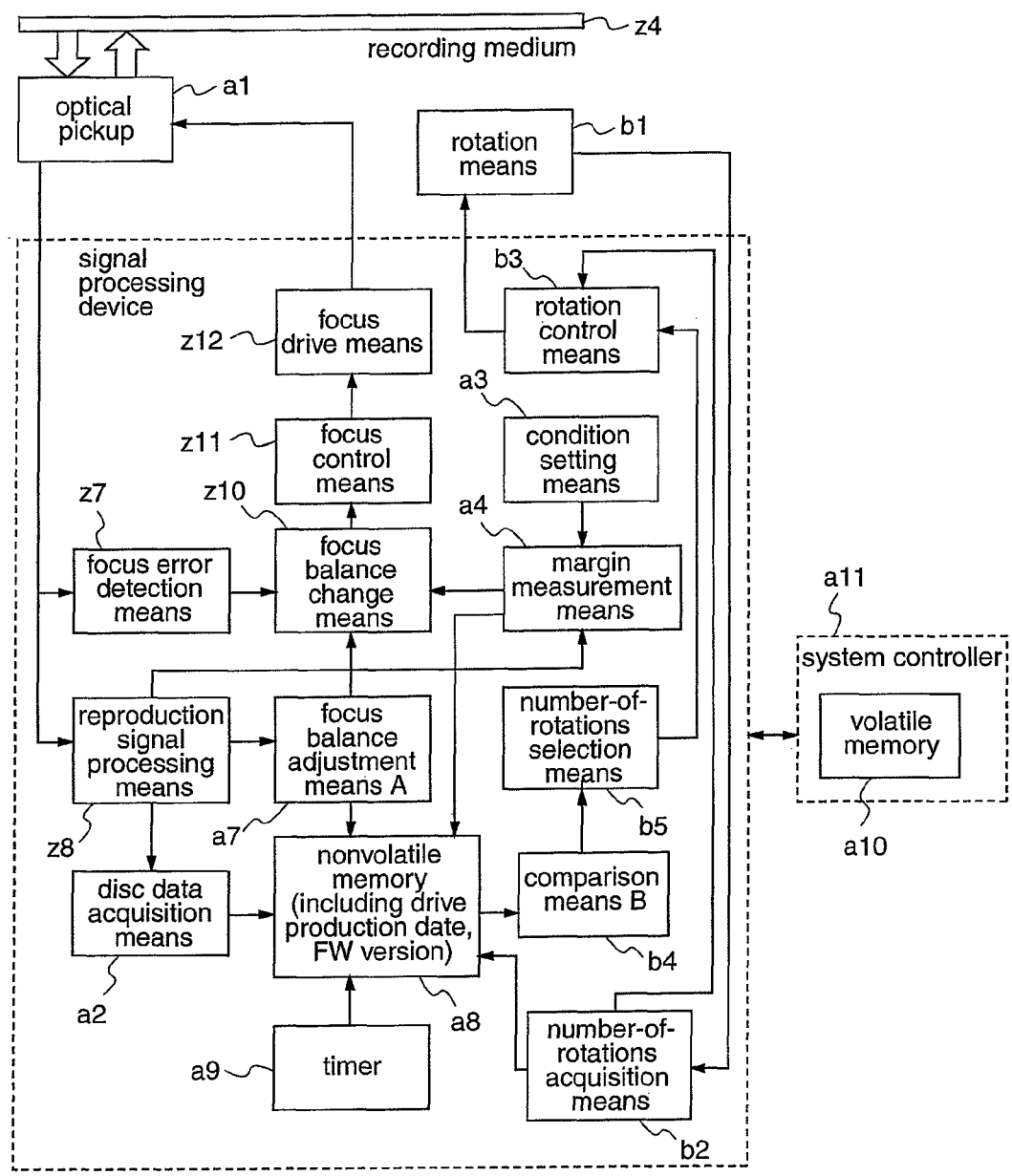
FIG. 21 is a system configuration diagram of an optical disc signal processing device according to a second embodiment of the present invention.

FIG. 21 is a system configuration diagram of an optical disc signal processing device according to a second embodiment of the present invention. The present invention is provided with a rotation means b1, a number-of-rotations acquisition means b2, a rotation control means b3, a comparison means Bb4, a number-of-rotations selection means b5, in addition to the above-described focus error detection means z7, reproduction signal processing means z8, focus balance change means z10, focus control means z11, focus drive means z12, optical pickup a1, disc data acquisition means a2, condition setting means a3, margin measurement means a4, focus balance adjustment means Aa7, nonvolatile memory a8, and timer a9, and further, it includes a system controller a11 having a volatile memory a10, which manages the above-described means with programs. While the adjustment method is selected in the first embodiment, the number of rotations of the disc is changed in this second embodiment. In this second embodiment, when the margin is narrowed, the margin can be increased by reducing the number of rotations without changing the adjustment method. Since the margin can be increased without changing the adjustment method, accurate reproduction can be realized.

Next, the respective constituents will be described along the signal transmission route.

Since the focus error detection means z7, the reproduction signal processing means z8, the focus balance change means z10, the focus control means z11, the focus drive means z12, the optical pickup a1, the disc data acquisition means a2, the condition setting means a3, the margin measurement means a4, the focus balance adjustment means Aa7, the nonvolatile memory a8, and the timer a9 have already been explained, repeated description is not necessary.

The rotation means b1 rotates the recording medium z4 according to a drive signal supplied from the rotation control means b3, and outputs a signal indicating the number of rotations of the recording medium z4 to the number-of-rotations acquisition means b2. The signal indicating the number of rotations of the recording medium z4 is such as an FG signal which is generated from a signal outputted from the driver to a DC motor rotating the recording medium z4.

The number-of-rotations acquisition means b2 calculates the number of rotations of the recording medium z4 from the signal indicating the number of rotations of the recording medium z4 which is outputted from the rotation means b1, and stores the same in the nonvolatile memory a8. Further, it periodically outputs the obtained number of rotations to the rotation control means b3.

The rotation control means b3 compares the number of rotations of the recording medium z4 which is periodically outputted from the number-of-rotations acquisition means b2 with the target number of rotations, and calculates a drive signal with which the number of rotations of the recording medium z4 reaches the target number of rotations, and outputs the same to the rotation means b1. Further, the rotation control means b3 changes the target number of rotations according to the output from the number-of-rotations selection means b5.

The comparison means Bb4 compares the range (z19,z20) of the convergent lens position which is stored in the nonvolatile memory a8 with the adjusted convergent lens position which is outputted from the focus balance adjustment means Aa7, and outputs the comparison result to the number-of-rotations selection means b5. The manner for obtaining the comparison result will be described later.

The number-of-rotations selection means b5 selects the target number of rotations according to the comparison result outputted from the comparison means Bb4, and outputs a selection signal indicating the target number of rotations to the rotation control means b3.

Next, the operation of the program embedded in the system controller will be described.

The program operation includes the case of using the adjusted convergent lens position which is outputted from the focus balance adjustment means Aa7 (third operation) and the case of not using the adjusted convergent lens position (fourth operation). A difference between the third operation and the fourth operation will be described as supplementary contents for the description of the third operation.

FIG. 22 is a flowchart illustrating the procedure of the third operation of the optical disc device of this second embodiment, wherein (a) shows the procedure at start-up or before start of recording, and (b) shows the procedure during margin measurement. The specific steps in the flowchart will be described hereinafter.

Upon start-up or before start of recording, the following steps will be executed.

Since the disc data acquisition step sa1 and the focus balance adjustment value storage step Asa4 have already been described, repeated description is not necessary. However, the difference contents between the first operation and the second operation should be replaced with the difference contents between the third operation and the fourth operation.

Figure 22A:
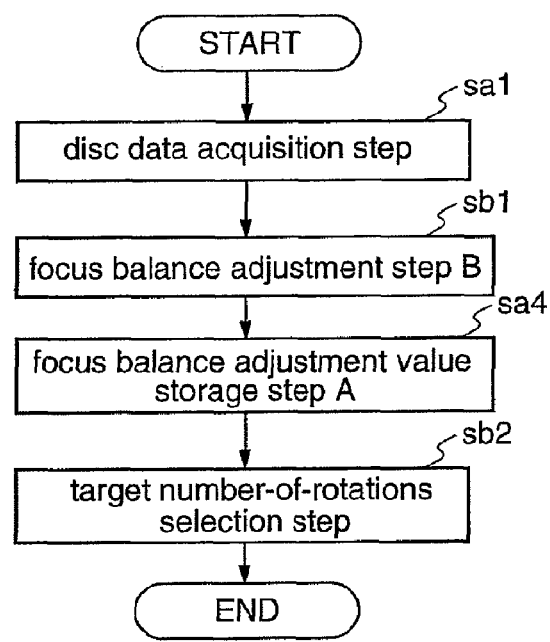
FIG. 22 is a flowchart illustrating the program operation of the optical disc signal processing device according to the second embodiment.

As shown in FIG. 22(a), initially, the disc data acquisition step sa1 is performed, and thereafter, the above-described adjustment method A is consistently executed using the focus balance adjustment means Aa7 in the focus balance adjustment step Bsb1, and the adjusted convergent lens position is stored in the volatile memory a10. The adjustment method B may be consistently executed instead of the adjustment method A.

Next, after the focus balance adjustment value storage step A sa4 is performed, the comparison means Bb4 is operated and a signal for selecting either of the target number of rotations A or the target number of rotations B is outputted to the rotation control means b3 according to the output from the comparison means Bb4 in the target number-of-rotations selection step sb2.

The system controller a11 continuously monitors the data outputted from the timer a9, and performs the following steps when the data is increased by a predetermined value.

Since the disc data acquisition step sa1, the focus balance value acquisition step sa5, the access step sa6, and the focus balance value restoration step sa8 have already been described, repeated description is not necessary. However, the difference contents between the first operation and the second operation are replaced with the difference contents between the third operation and the fourth operation.

Figure 22B:
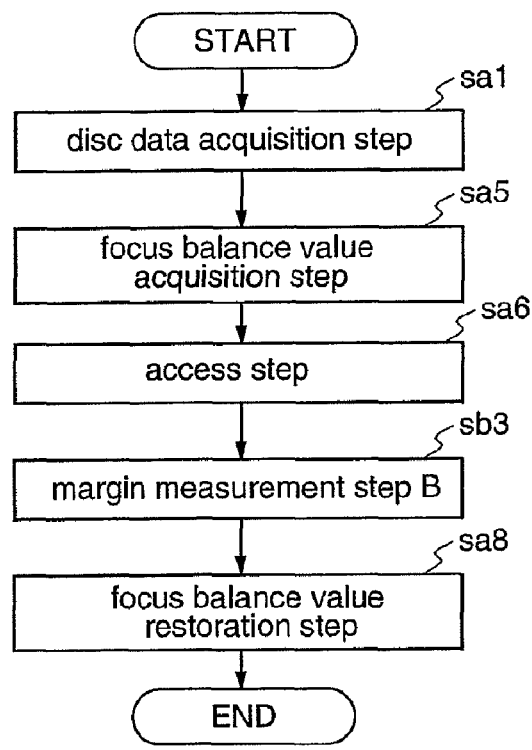

As shown in FIG. 22(b), after the disc data acquisition step sa1, the focus balance value acquisition step sa5, and the access step sa6 are performed, the margin measurement step Bsb3 is carried out, wherein the comparison means Bb4 is operated to select a target number of rotations of the recording medium z4 according to a signal for selecting the target number of rotations which is outputted from the comparison means Bb4, and the margin measurement means a4 is operated to obtain the margin (z19,z20) of the convergent lens position, and then the margin is stored in the nonvolatile memory a8 together with the data for individually identifying the recording medium z4 which is stored in the volatile memory a10 and the data indicating the drive utilization rate which is outputted from the timer a9. Thereafter, the focus balance value restoration step sa8 is performed to complete the processing.

Next, the drive operation and the data contents stored in the nonvolatile memory a8 which are obtained when executing the optical disc signal processing method of this second embodiment will be described with reference to FIGS. 23 to 28.

Since the data structure stored in the nonvolatile memory a8 is identical to that shown in FIG. 14, repeated description is not necessary. However, the difference contents between the first operation and the second operation should be replaced with the difference contents between the third operation and the fourth operation.

Figure 25:
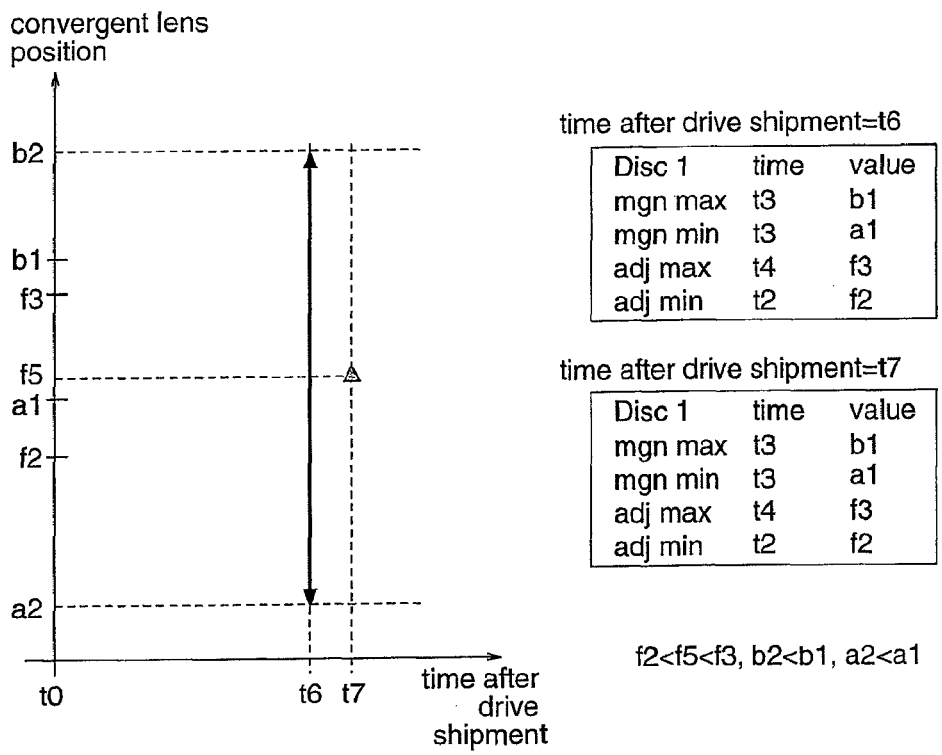
FIG. 25 shows the drive operation and the data structure (3) of the optical disc signal processing device according to the third embodiment.

FIGS. 23 to 25 show the drive operation and the data contents stored in the nonvolatile memory a8, which are obtained when the third operation of the optical disc signal processing device of this second embodiment is executed. The details of the conditional expressions used in FIGS. 23 to 25 will be described hereinafter. When using the data for individually identifying the recording medium z4, the processes of the conditional expressions A2 to C2, D, E are performed only when the data for individually identifying the recording medium z4 which is stored in the volatile memory a10 matches the data for individually identifying the recording medium z4 which is stored in the nonvolatile memory a8. When the data for individually identifying the recording medium z4 is not used, the processes of the conditional expressions A2 to C2, D, E are performed regardless of the data for individually identifying the recording medium z4 which is stored in the volatile memory a10 and the data for individually identifying the recording medium z4 which is stored in the nonvolatile memory a8.

[Conditional Expression A2]
(i) When mgn_max>adj_max and adj_min>mgn_min, the target number of rotations A is selected. That is, when the maximum value of the convergent lens position at margin measurement is larger than the maximum value of the convergent lens position at adjustment and the minimum value of the convergent lens position at margin measurement is smaller than the minimum value of the convergent lens position at adjustment, the target number of rotations A is selected.
(ii) When no values are stored for all of mgn_max, mgn_min, adj_max, and adj_min, the target number of rotations A is selected.
(iii) When mgn_max<adj_max or adj_min<mgn_min, the target number of rotations B is selected.
(target number of rotations A>target number of rotations B)

[Conditional Expression B2]
(i) When the maximum value of the convergent lens position after margin measurement (m_max)<mgn_max stored in the nonvolatile memory or when no value is stored for mgn_max, the value of mgn_max is changed to m_max. That is, when the maximum value of the convergent lens position after margin measurement is smaller than the maximum value of the convergent lens position at margin measurement which is stored in the nonvolatile memory a8 or when no value is stored as the maximum value of the convergent lens position at margin measurement, the maximum value of the convergent lens position at margin measurement is changed to the maximum value of the convergent lens position after margin measurement.
(ii) When the maximum value of the convergent lens position after margin measurement (m_max)>mgn_max stored in the nonvolatile memory, nothing is executed.

[Conditional Expression C2]
(i) When the minimum value of the convergent lens position after margin measurement (m_min)>mgn_min stored in the nonvolatile memory, or when no value is stored for mgn_min, the value of mgn_min is changed to m_min. That is, when the minimum value of the convergent lens position after margin measurement is larger than the minimum value of the convergent lens position at margin measurement which is stored in the nonvolatile memory a8 or when no value is stored for the minimum value of the convergent lens position at margin measurement, the minimum value of the convergent lens position at margin measurement is changed to the minimum value of the convergent lens position after margin measurement.
(ii) When the minimum value of the convergent lens position after margin measurement (m_min)<mgn_min stored in the nonvolatile memory, nothing is done.

Since the conditional expressions D and E have already been described, repeated description is not necessary.

Hereinafter, FIGS. 23 to 25 will be described.

In FIG. 23, when the time elapsed after drive shipment is to, the contents of the nonvolatile memory a8 are obtained, and the target number of rotations is selected according to the conditional expression A2. Since no values are stored for all of mgn_max, mgn_min, adj_max, and adj_min, the conditional expression A2(ii) is satisfied, and thereby the target number of rotations A is selected. According to the conditional expressions B2(i) and C2(i), b0 and a0 are stored for mgn_max and mgn_min, respectively. Accordingly, in the nonvolatile memory a8, mgn_max has time t0 and value b0 and mgn_min has time t0 and value a0.

Next, when the time elapsed after drive shipment is t1, the adjustment method A is executed, and the result is stored in the nonvolatile memory a8 according to the conditional expressions D and E. That is, since no values are stored for adj_max and adj_min, f1 is stored for adj_max and adj_min, respectively, according to the conditional expressions D(i) and E(i). Accordingly, in the nonvolatile memory a8, mgn_max has time t0 and value b0, mgn_min has time t0 and value a0, adj_max has time t1 and value f1, and adj_min has time t1 and value f1. Further, the contents of the nonvolatile memory a8 are obtained, and the target number of rotations is selected according to the conditional expression A2. Since no values are stored for adj_max and adj_min, the conditional expression A2(ii) is satisfied, and thereby the target number of rotations A is selected.

When the time elapsed after drive shipment is t2, the adjustment method A is executed, and the adjustment result is stored in the nonvolatile memory a8 according to the conditional expressions D and E. That is, since f2<f1, adj_min is changed from f1 to f2 without changing adj_max according to the conditional expressions D(ii) and E(i). Accordingly, in the nonvolatile memory a8, mgn_max has time t0 and value b0, mgn_min has time t0 and value a0, adj_max has time t1 and value f1, and adj_min has time t2 and value f2. Further, the contents of the nonvolatile memory a8 are obtained, and the target number of rotations is selected according to the conditional expression A2. Since b0>f1 and f2>a0, the conditional expression A2(i) is satisfied, and thereby the target number of rotations A is selected.

In FIG. 24, when the time elapsed from drive shipment is t3, the contents of the nonvolatile memory a8 are obtained, and the target number of rotations is selected according to the conditional expression A2. Since b0>f1 and f2>a0, the conditional expression A2(i) is satisfied, and thereby the target number of rotations A is selected. Since b1<b0 and a1>a0, mgn_max is changed from b0 to b1 and mgn_min is changed from a0 to b0 according to conditional expressions B2(i) and C2(i). Accordingly, in the nonvolatile memory a8, mgn_max has time t3 and value b1, mgn_min has time t3 and value a1, adj_max has time t1 and value f1, and adj_min has time t1 and value f1.

Next, when the time elapsed after drive shipment is t4, the adjustment method A is executed, and the adjustment result is stored in the nonvolatile memory a8 according to the conditional expressions D and E. That is, since f3>f1, the adj_max is changed from f1 to f3 and adj_min remains at f2 according to the conditional expressions D(i) and E(ii). Accordingly, in the nonvolatile memory a8, mgn_max has time t3 and value b1, mgn_min has time t3 and value a1, adj_max has time t4 and value f3, and adj_min has time t2 and value f2. The contents of the nonvolatile memory a8 are obtained, and the target number of rotations is selected according to the conditional expression A2. Since the conditional expression A2(iii) is satisfied, the target number of rotations B is selected. That is, since a1>f2, the conditional expression A2(iii) is satisfied, and thereby the target number of rotations B is selected.

When the time elapsed after drive shipment is t5, the adjustment method A is executed, and the adjustment result is stored in the nonvolatile memory a8 according to the conditional expressions D and E. That is, since f4<f3 and f4>f2, adj_max remains at f3 and adj_min remains at f2 according to the conditional expressions D(ii) and E(ii). Here, mgn_max has time t3 and value b1, mgn_min has time t3 and value a1, adj_max has time t4 and value f3, and adj_min has time t2 and value f2. Further, the contents of the nonvolatile memory a8 are obtained, and the target number of rotations is selected according to the conditional expression A2. Since a1>f4, the conditional expression A2(iii) is satisfied, and thereby the target number of rotations B is selected.

In FIG. 25, when the time elapsed after drive shipment is t6, the contents of the nonvolatile memory a8 are obtained, and the target number of rotations is selected according to the conditional expression A2. The margin is measured to obtain a2 and b2, and the margin is stored in the nonvolatile memory a8 according to the conditional expressions B2 and C2. That is, since f2<a1, the conditional expression A2(iii) is satisfied, and thereby the target number of rotations B is selected. Since b2>b1 and a2<a1, mgn_max remains at b1 and mgn_min remains at a1 according to the conditional expressions B2(ii) and C2(ii). Here, mgn_max has time t3 and value b1, mgn_min has time t3 and value a1, adj_max has time t4 and value f3, and adj_min has time t2 and value f2.

Next, when the time elapsed after drive shipment is t7, the adjustment method A is executed, and the adjustment result is stored in the nonvolatile memory a8 according to the conditional expressions D and E. That is, since f5<f3 and f5>f2, adj_max remains at f3 and adj_min remains at f2 according to the conditional expressions D(ii) and E(ii). Here, mgn_max has time t3 and value b1, mgn_min has time t3 and value a1, adj_max has time t4 and value f3, and adj_min has time t2 and value f2. Since a1>f2, the conditional expression A2(iii) is satisfied, and thereby the target number of rotations B is selected.

Figure 26:
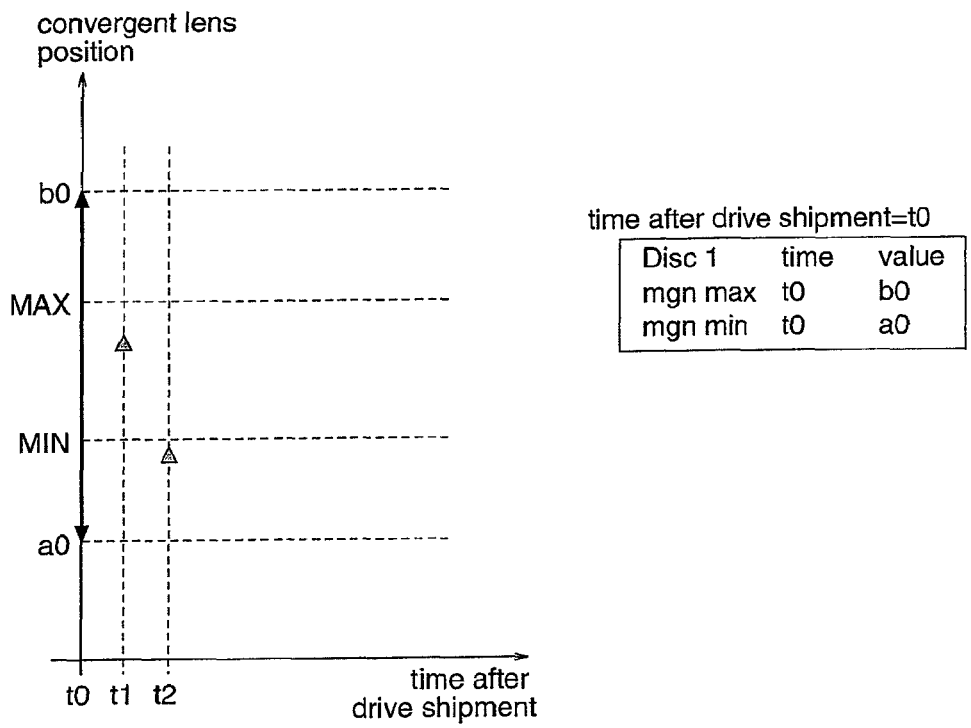
FIG. 26 shows the drive operation and the data structure (4) of the optical disc signal processing device according to the third embodiment.
Figure 27:
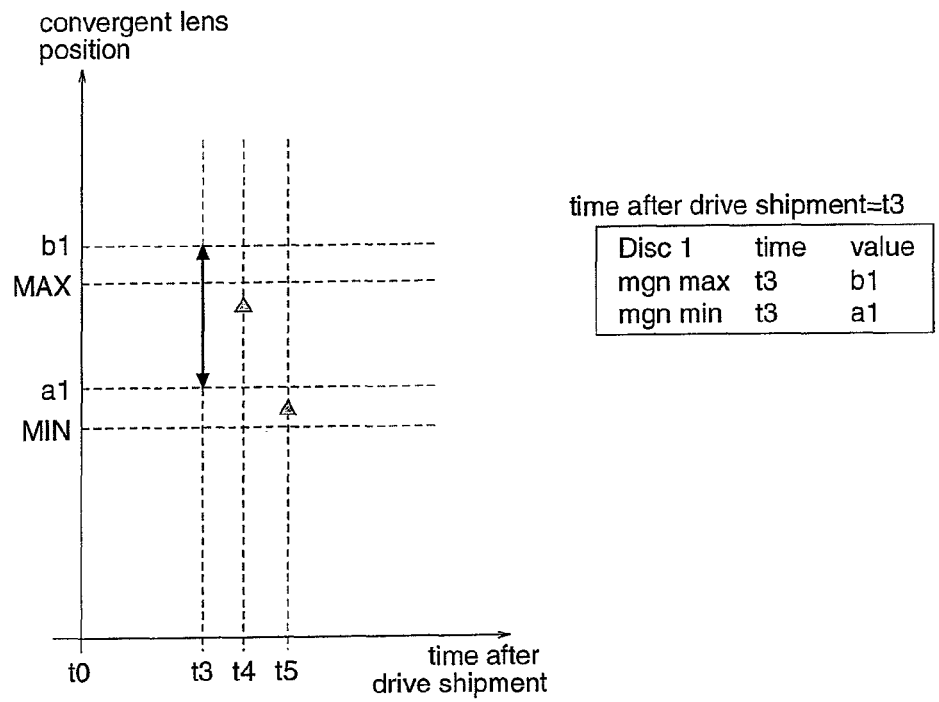
FIG. 27 shows the drive operation and the data structure (5) of the optical disc signal processing device according to the third embodiment.
Figure 28:
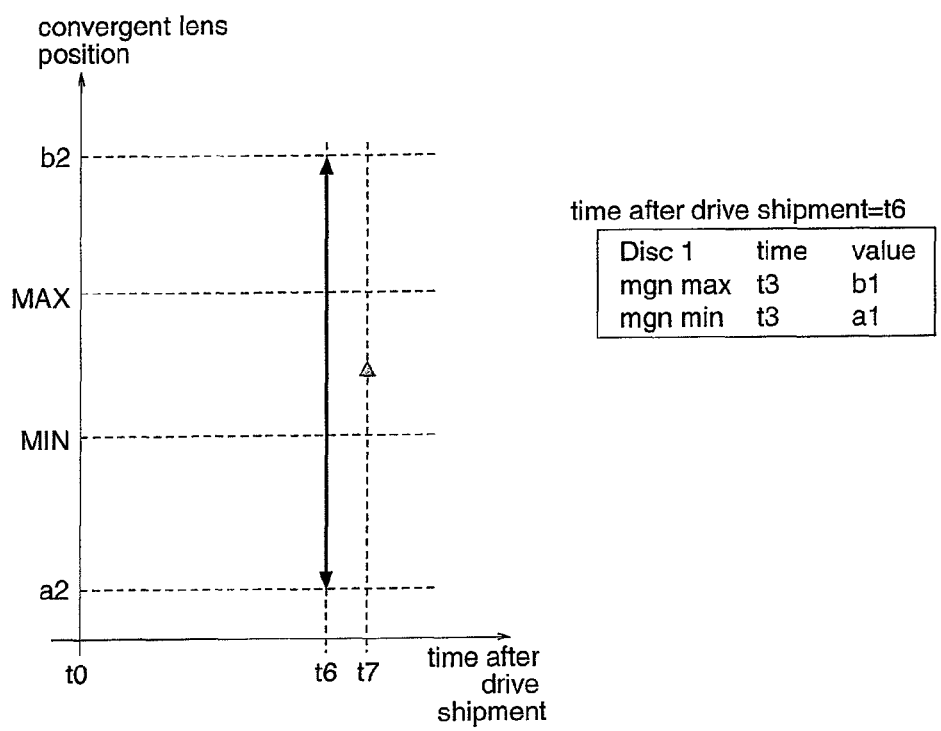
FIG. 28 shows the drive operation and the data structure (6) of the optical disc signal processing device according to the third embodiment.

FIGS. 26 to 28 show the drive operation and the data contents stored in the nonvolatile memory a8, which are obtained when the fourth operation of the optical disc signal processing device of the second embodiment is executed. The details of the conditional expressions used in FIGS. 26 to 28 will be described hereinafter. When using the data for individually identifying the recording medium z4, the processes of the conditional expressions F2 to H2 are performed only when the data for individually identifying the recording medium z4 which is stored in the volatile memory a10 matches the data for individually identifying the recording medium z4 which is stored in the nonvolatile memory a8. When the data for individually identifying the recording medium z4 is not used, the processes of the conditional expressions F2 to H2 are performed regardless of the data for individually identifying the recording medium z4 which is stored in the volatile memory a10 and the data for individually identifying the recording medium z4 which is stored in the nonvolatile memory a8.

[Conditional Expression F2]
(i) When mgn_max>MAX(fixed value) and MIN(fixed value)>mgn_min, the target number of rotations A is selected. That is, when the maximum value of the convergent lens position after margin measurement is larger than MAX (fixed value) and the minimum value of the convergent lens position after margin measurement is smaller than MIN (fixed value), the target number of rotations A is selected.
(ii) When no values are stored for all of mgn_max and mgn_min, the target number of rotations A is selected. That is, when no values are stored for all of the maximum value of the convergent lens position after margin measurement and the minimum value of the convergent lens position after margin measurement, the target number of rotations A is selected.
(iii) When mgn_max<MAX(fixed value) or MIN(fixed value)<mgn_min, the target number of rotations B is selected.
(target number of rotations A>target number of rotations B)

[Conditional Expression G2]
(i) When the maximum value of the convergent lens position after margin measurement (m_max)<mgn_max stored in the nonvolatile memory or when no value is stored for mgn_max, the value of mgn_max is changed to m_max. That is, when the maximum value of the convergent lens position after margin measurement is smaller than the maximum value of the convergent lens position after margin measurement which is stored in the nonvolatile memory a8 or when no value is stored for the maximum value of the convergent lens position after margin measurement which is stored in the nonvolatile memory a8, the value of the maximum value of the convergent lens position after margin measurement is changed to the maximum value of the convergent lens position after margin measurement.
(ii) When the maximum value of the convergent lens position after margin measurement (m_max)>mgn_max in the nonvolatile memory, nothing is executed.

[Conditional Expression H2]
(i) When the minimum value of the convergent lens position after margin measurement (m_min)>mgn_min stored in the nonvolatile memory, or when no value is stored for mgn_min, the value of mgn_min is changed to m_min.

That is, when the minimum value of the convergent lens position after margin measurement is larger than the minimum value of the convergent lens position after margin measurement which is stored in the nonvolatile memory a8 or when no value is stored for the minimum value of the convergent lens position after margin measurement which is stored in the nonvolatile memory a8, the value of the minimum value of the convergent lens position after margin measurement is changed to the minimum value of the convergent lens position after margin measurement.

(ii) When the minimum value of the convergent lens position after margin measurement (m_min)<mgn_min stored in the nonvolatile memory, nothing is executed.

Hereinafter, FIGS. 26 to 28 will be described.

In FIG. 26, when the time elapsed after drive shipment is t0, the contents of the nonvolatile memory a8 are obtained, and the target number of rotations is selected according to the conditional expression A2. Since no values are stored for all of mgn_max and mgn_min, the conditional expression F2(ii) is satisfied, and thereby the target number of rotations A is selected. Since no values are stored for mgn_max and mgn_min, b0 and a0 are stored for mgn_max and mgn_min, respectively, according to the conditional expressions G2(i) and H2(i). Accordingly, in the nonvolatile memory a8, mgn_max has time t0 and value b0, and mgn_min has time t0 and value a0.

Next, when the time elapsed after drive shipment is t1, the adjustment method A is executed. Since b0>MAX(fixed value) and MIN(fixed value)>a0, the conditional expression F2(i) is satisfied, and thereby the target number of rotations A is selected.

When the time elapsed after drive shipment is t2, the adjustment method A is executed. The contents of the nonvolatile memory a8 are obtained, and the target number of rotations is selected according to the conditional expression F2. Since the conditional expression F2(i) is satisfied, the target number of rotations A is selected. That is, since b0>MAX(fixed value) and MIN(fixed value)>a0, the conditional expression F2(i) is satisfied, and thereby the target number of rotations A is selected.

In FIG. 27, when the time elapsed after drive shipment is t3, the contents of the nonvolatile memory a8 are obtained, and the target number of rotations is selected according to the conditional expression F2. Since b1>MAX(fixed value) and MIN(fixed value)>a1, the conditional expression F2(i) is satisfied, and thereby the target number of rotations A is selected. Since b1<b0 and a1>a0, b1 and a1 are stored for mgn_max and mgn_min according to the conditional expressions G2(i) and H2(i), respectively. Accordingly, in the nonvolatile memory a8, mgn_max has time t3 and value b1, and mgn_min has time t3 and value a1.

Next, when the time elapsed after drive shipment is t4, the adjustment method A is executed. Since MIN(fixed value)<a1, the conditional expression F2(iii) is satisfied, and thereby the target number of rotations B is selected.

When the time elapsed after drive shipment is t5, the adjustment method A is executed. Since MIN(fixed value)<a1, the conditional expression F2(iii) is satisfied, and thereby the target number of rotations B is selected.

In FIG. 28, when the time elapsed after drive shipment is t6, the contents of the nonvolatile memory a8 are obtained, and the target number of rotations is selected according to the conditional expression F2. Since MIN(fixed value)<a1, the conditional expression F2(iii) is satisfied, and thereby the target number of rotations B is selected. Since b2>b1 and a2<a1, mgn_max remains at b1 and mgn_min remains at a1 according to conditional expressions G2(ii) and H2(ii). Here, mgn_max has the time t3 and the value b1, and mgn_min has the time t3 and the value a1.

Next, when the time elapsed after drive shipment is t7, the adjustment method A is executed. Since MIN(fixed value)<a1, the conditional expression F2(iii) is satisfied, and thereby the target number of rotations B is selected.

While in this second embodiment the focus error detection means z7, the focus control means z11, and the focus drive means z12 are used, the tracking balance change means may be provided instead of the focus error detection means z7, the tracking control means may be provided instead of the focus control means z11, and the tracking drive means may be provided instead of the focus drive means z12.

Further, the tilt error detection means may be provided instead of the focus error detection means z7, the tilt change means may be provided instead of the focus balance change means z10, the tilt control means may be provided instead of the focus control means z11, and the tilt drive means may be provided instead of the focus drive means z12.

Further, while in this second embodiment the reproduction signal processing means z8 is used, the reproduction jitter processing means may be provided instead of the reproduction signal processing means z8.

When the movement amount of the convergent lens z3 for reducing the tracking error is not outputted from the tracking control means to the tracking drive means, the tracking error detection means may be used instead of the reproduction signal processing means z8.

When the movement amount of the convergent lens z3 for reducing the tracking error is outputted from the tracking control means to the tracking drive means, the wobble signal processing means may be used instead of the reproduction signal processing means z8.

Furthermore, the wobble jitter processing means may be provided instead of the reproduction signal processing means z8.

As described above, according to the second embodiment, the optical disc signal processing device comprises the focus balance adjustment means Aa7 which adjusts the convergent lens position by the focus balance change means z10 on the basis of the output from the reproduction signal processing means z8, the margin measurement means a4 which obtains a range of the control target value from its minimum value to its maximum value, within which the optical disc signal processing device can perform normal operation, the condition setting means a3 which sets a threshold value of the reproduction signal when measuring the margin, the timer a9 which measures the utilization rate of the optical disc signal processing device, the nonvolatile memory a8 which stores the range of the convergent lens position from its minimum value to its maximum value, which is obtained by the margin measurement means a4, together with the utilization rate outputted from the timer a9, the comparison means Bb4 which compares the range of the convergent lens position that is stored in the nonvolatile memory a8 with the convergent lens position which is adjusted by the focus balance adjustment means Aa7, the number-of-rotations selection means b5 which selects the number of rotations of the recording medium on the basis of the output from the comparison means Bb4, the number-of-rotations acquisition means b2 which acquires the number of rotations of the recording medium, and the rotation control means b3 which outputs a driving signal for rotating the recording medium with the target number of rotations according to the outputs of the number-of-rotations selection means b5 and the number-of-rotations acquisition means b2, and the range of the convergent lens position is stored in the nonvolatile memory a8 together with the utilization rate outputted from the timer a9 and the number of rotations of the recording medium which is outputted from the number-of-rotations acquisition means b2, and the number of rotations of the recording medium is optimized so that the convergent lens position adjusted by the focus balance adjustment means Aa7 is included in the range of the convergent lens position. Therefore, the optimum number of rotations of the recording medium can be automatically selected for each optical disc signal processing device such that the number of rotations is reduced to extend the margin when the margin is narrowed, whereby the reproduction time and the recording time can be reduced as compared with the case where reproduction or recording of the recording medium is performed with a reduced rotation speed after an error occurred in performing reproduction or recording with a high rotation speed, and thus the user's convenience can be enhanced. Further, even in the case where inexpensive elements having large variations in aging deterioration are used, the number of rotations is reduced to increase the margin when the elements of the drive are deteriorated and the margin is narrowed, whereby the reproduction and recording qualities of the optical disc device after shipment can be maintained.

Embodiment 3

Figure 29:
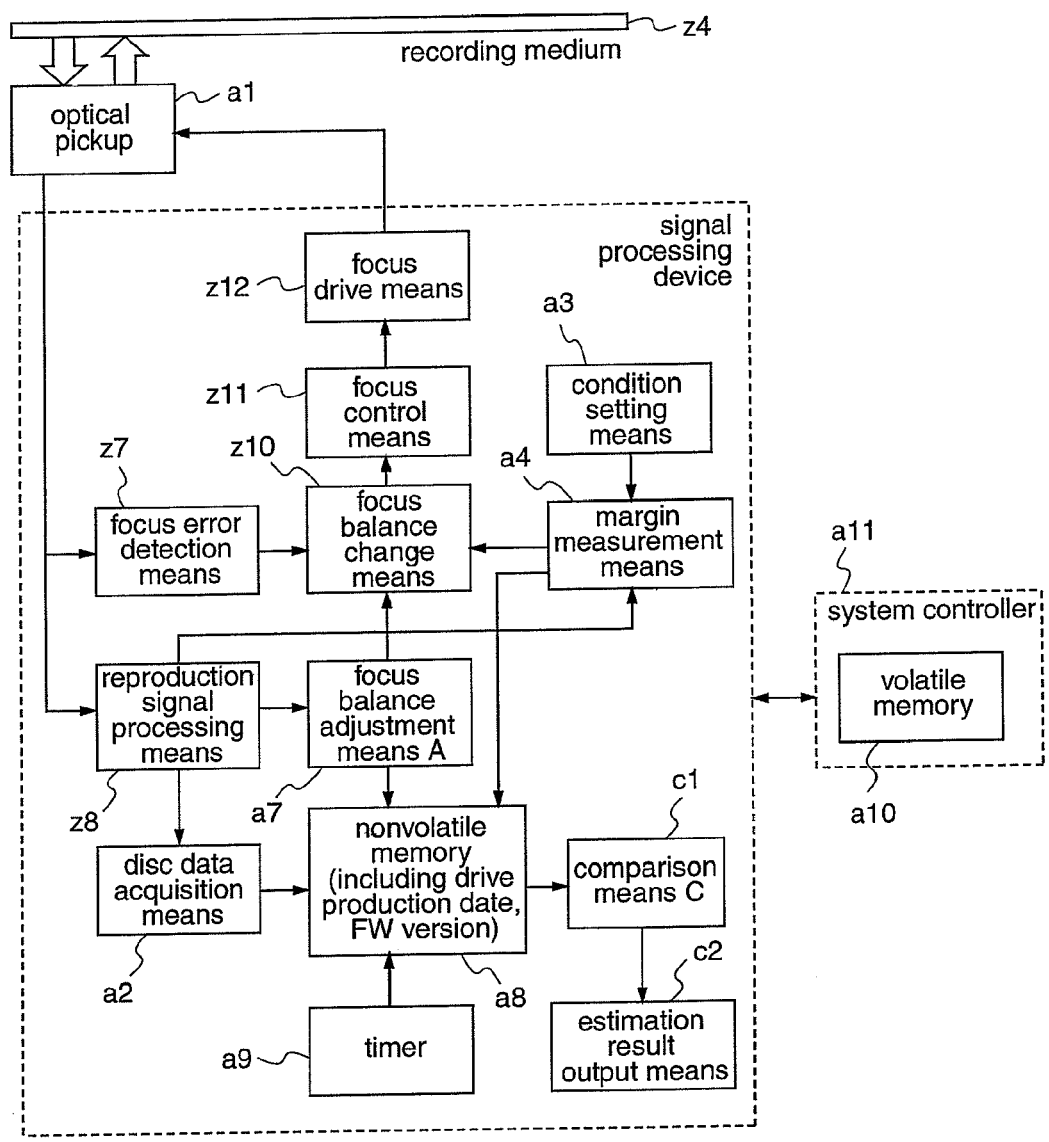
FIG. 29 is a system configuration diagram of an optical disc signal processing device according to a third embodiment of the present invention.

FIG. 29 is a system configuration diagram of an optical disc signal processing device according to a third embodiment of the present invention. The present invention is provided with an comparison means Cc1 and an estimation result output means c2 in addition to the above-described focus error detection means z7, reproduction signal processing means z8, focus balance change means z10, focus control means z11, focus drive means z12, optical pickup a1, disc data acquisition means a2, condition setting means a3, margin measurement means a4, focus balance adjustment means Aa7, nonvolatile memory a8, and timer a9, and further, it includes a system controller a11 having a volatile memory a10, which manages the above-described respective means by programs.

Next, the respective constituents will be described along the signal transmission path.

Since the focus error detection means z7, the reproduction signal processing means z8, the focus balance change means z10, the focus control means z11, the focus drive means z12, the optical pickup a1, the disc data acquisition means a2, the condition setting means a3, the margin measurement means a4, the focus balance adjustment means Aa7, the nonvolatile memory a8, and the timer a9 have already been described, repeated description is not necessary.

The comparison means Cc1 estimates the utilization rate at which the range of the adjusted convergent lens position from its minimum value to its maximum value becomes not to be included in the range (z19,z20) of the convergent lens position, by using the range (z19,z20) of the convergent lens position which is stored in the nonvolatile memory a8 and the adjusted convergent lens position which is outputted from the focus balance adjustment means Aa7, and outputs the estimation result to the estimation result output means c2. The manner of obtaining the estimation result will be described later.

The estimation result output means c2 outputs the estimation result outputted from the comparison means Cc1 to a device to which the drive is connected through a cable (e.g., ATAPI cable). As for a command format for performing data exchange through the cable, for example, an ATAPI command or a DIAG comment may be adopted (original command format which is used when data exchange is carried out between a program operating on the system controller a11 and a program operating on the device to which the drive is connected). The estimation result is of the same format as the data indicating the utilization rate of the drive, which data is outputted from the timer a9. For example, when the data indicating the utilization rate of the drive is the passage time after drive shipment, the estimation result also has the format of the passage time after drive shipment. When the data indicating the utilization rate of the drive is the absolute time which is counted by the device to which the drive is connected and is available through the cable connecting the drive and the device, the estimation result also has the format of the absolute time. When the data indicating the utilization rate of the drive is the counter value which is counted up every time the drive reproduces or records the recording medium, the estimation result also has the format of the counter value.

Next, the operation of the program embedded in the system controller will be described.

The operation of the program includes the case of using the adjusted convergent lens position outputted from the focus balance adjustment means Aa7 (fifth operation) and the case of not using the same (sixth operation). A difference between the fifth operation and the sixth operation will be described as supplemental contents for the description of the fifth operation.

FIG. 30 is a flowchart showing the procedure of the fifth operation of the optical disc signal processing device of this third embodiment, wherein (a) shows the procedure at start-up or before start of recording, and (b) shows the procedure during margin measurement. Hereinafter, the detailed process steps in the flowchart will be described.

Upon start-up or before start of recording, the following steps will be executed.

Since the disc data acquisition step sa1, the focus balance adjustment step Bsb1, and the focus balance adjusted value storage step Asa4 have already been described, repeated description is not necessary. However, the contents of the difference between the first operation and the second operation should be replaced with the contents of the difference between the fifth operation and the sixth operation.

Figure 30A:
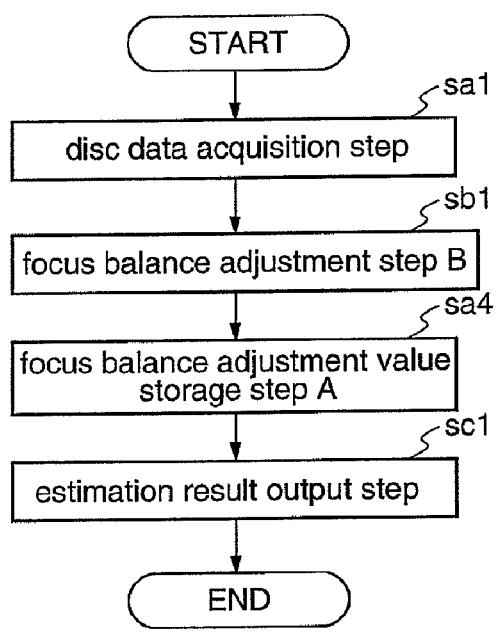
FIG. 30 is a flowchart illustrating the program operation of the optical disc signal processing device according to the third embodiment.

As shown in FIG. 30(a), after the disc data acquisition step sa1, the focus balance adjustment step Bsb1 and the focus balance adjusted value storage step Asa4 are performed, if two or more margin measurement results are stored in the nonvolatile memory a8, the utilization rate at which the range of the adjusted convergent lens position from its minimum value to its maximum value becomes not to be included in the range (z19,z20) of the convergent lens position is estimated by using the data indicating the drive utilization rate which is stored in the nonvolatile memory a8, the range (z19,z20) of the convergent lens position, and the adjusted convergent lens position which is outputted from the focus balance adjustment means Aa7, and then the estimation result is outputted to the device to which the drive is connected via the cable connecting the drive and the device. When two or more margin measurement results are not stored in the nonvolatile memory a8, this procedure is ended with doing nothing. In the case of the operation F, when two or more margin measurement results are stored in the nonvolatile memory a8, the utilization rate at which the range of the fixed value becomes not to be included in the range (z19,z20) of the convergent lens position is estimated by using the data indicating the drive utilization rate which is stored in the nonvolatile memory a8, and the range (z19,z20) of the convergent lens position, and then the estimation result is outputted to the device to which the drive is connected via the cable connecting the drive and the device. When two or more margin measurement results are not stored in the nonvolatile memory a8, this procedure is ended with doing nothing.

The system controller a11 continuously monitors the data outputted from the timer a9, and when the data is increased by a predetermined value, the following procedure is executed.

Since the disc data acquisition step sa1, the focus balance value acquisition step sa5, the access step sa6, the margin measurement step Asa7, and the focus balance value restoration step sa8 have already been described, repeated description is not necessary. However, the contents of the difference between the first operation and the second operation should be replaced with the contents of the difference between the fifth operation and the sixth operation.

Figure 30B:
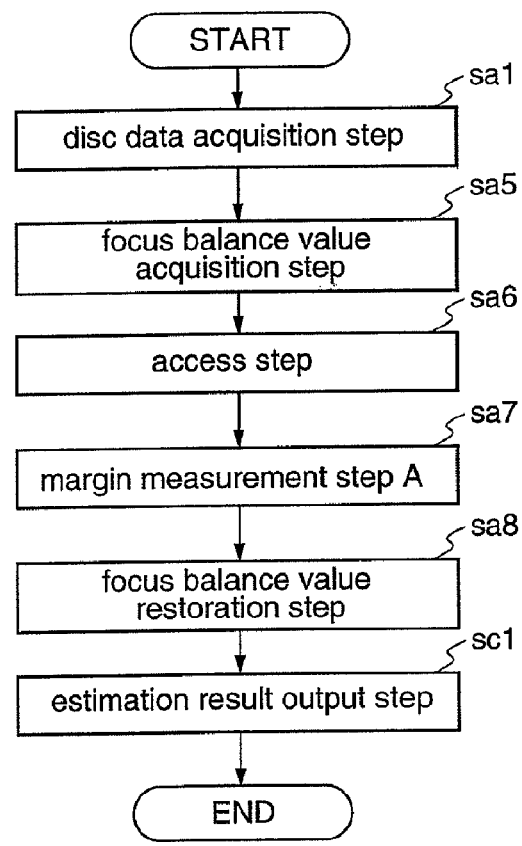

As shown in FIG. 30(b), after the disc data acquisition step sa1, the focus balance value acquisition step sa5, the access step sa6, the margin measurement step Asa7, and the focus balance value restoration step sa8 are performed, the same processing as that performed at start-up or before start of recording is performed in the estimation result output step sc1.

Next, the drive operation and the contents of data stored in the nonvolatile memory a8 which are obtained when the present invention is executed will be described with reference to FIGS. 31 to 38.

Figure 31:
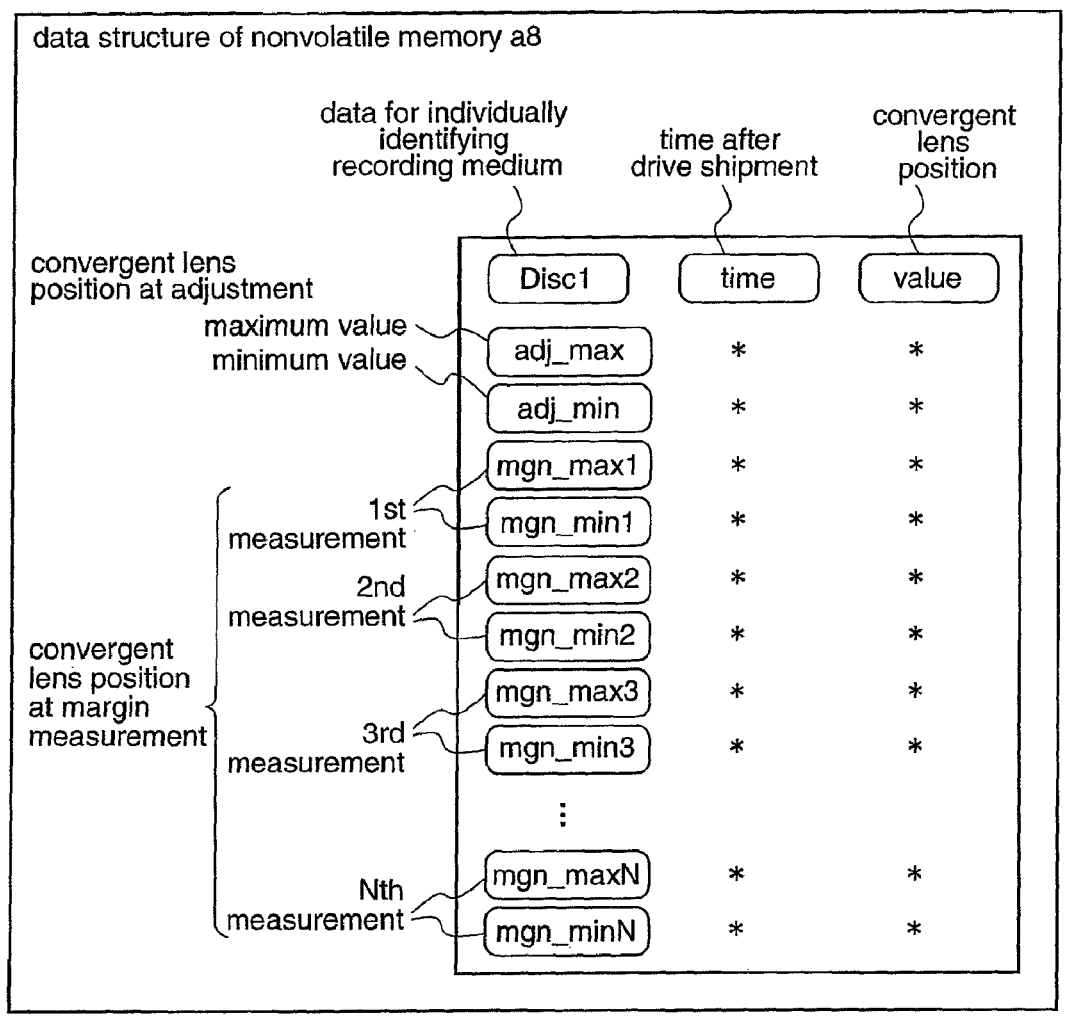
FIG. 31 shows the drive operation and the data structure (1) of the optical disc signal processing device according to the third embodiment.

FIG. 31 shows the data structure which is stored in the nonvolatile memory a8 of the optical disc signal processing device of this third embodiment. During margin measurement, the storage region for the convergent lens position at margin measurement is extended, and the newly measured range (z19,z20) of the convergent lens position is stored in the extended region. In the case of the operation F, the portions corresponding to the maximum value (adj_max) and the minimum value (adj_min) of the convergent lens position at adjustment do not exist.

Figure 32:
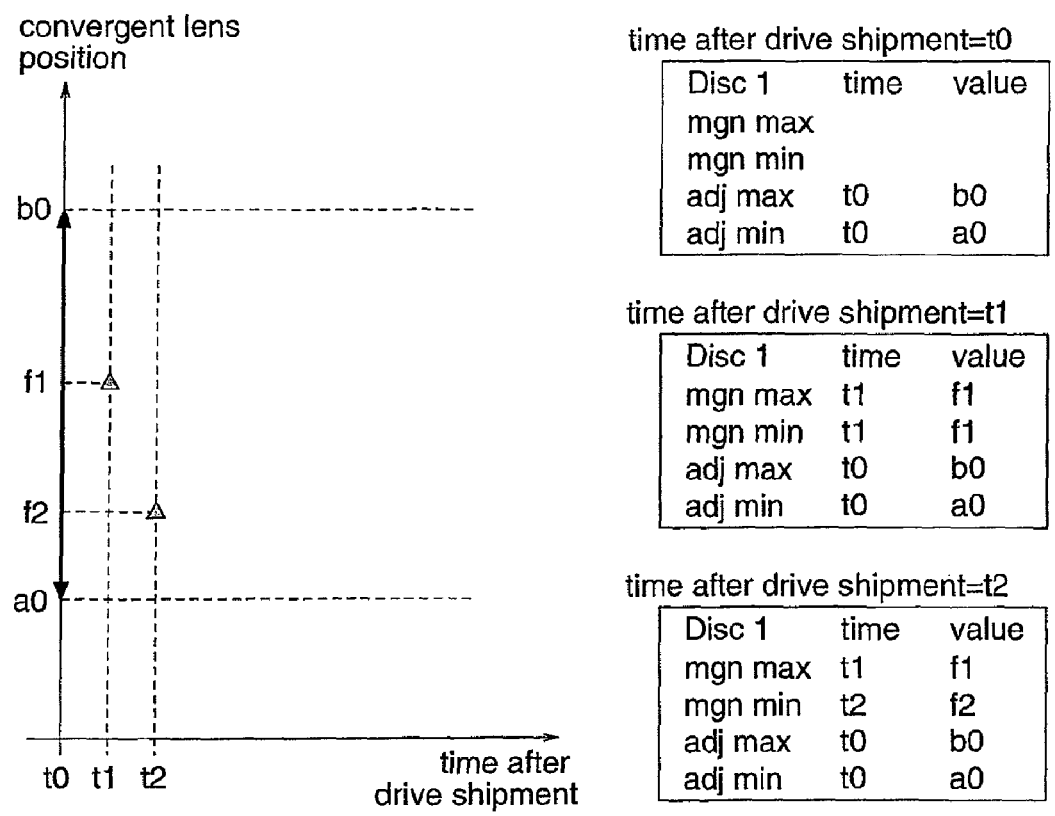
FIG. 32 shows the drive operation and the data structure (2) of the optical disc signal processing device according to the third embodiment.
Figure 33:
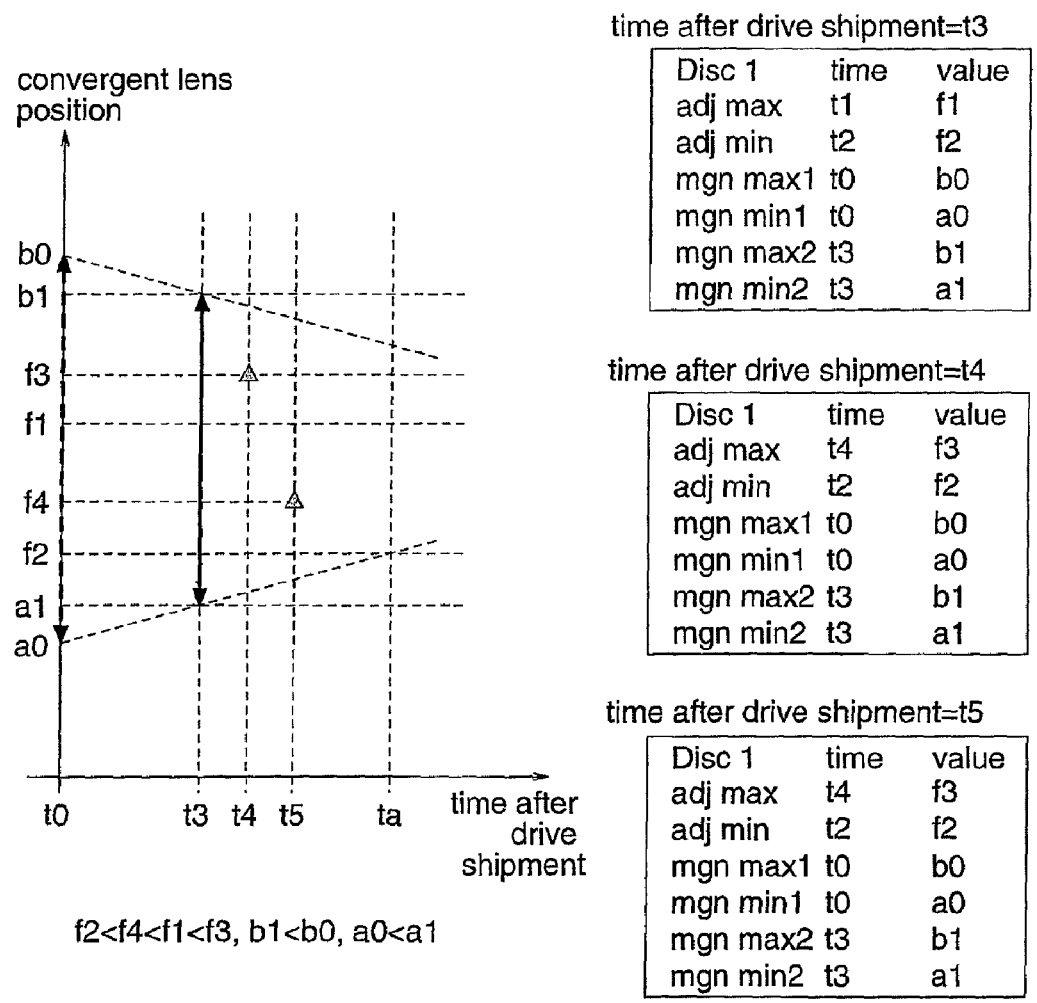
FIG. 33 shows the drive operation and the data structure (3) of the optical disc signal processing device according to the third embodiment.
Figure 34:
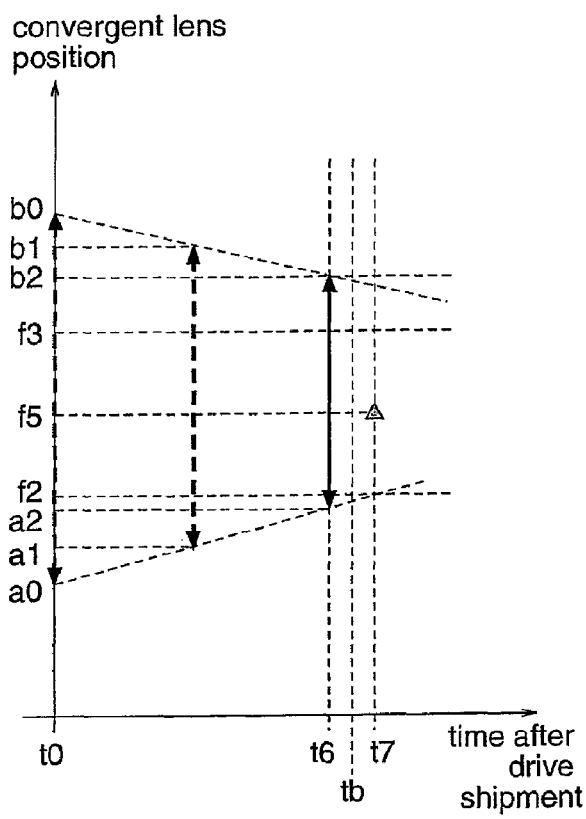
FIG. 34 shows the drive operation and the data structure (4) of the optical disc signal processing device according to the third embodiment.

FIGS. 32 to 34 show the drive operation and the data contents stored in the nonvolatile memory a8, which are obtained when the fifth operation is executed in the optical disc signal processing device of the third embodiment. As for the conditional expressions, the above-described conditional expressions D and E and a conditional expression A3 to be described later are adopted. In the case of using the data for individually identifying the recording medium z4, the processings of the conditional expressions D, E, and A3 are performed only when the data for individually identifying the recording medium z4 which is stored in the volatile memory a10 matches the data for individually identifying the recording medium z4 which is stored in the nonvolatile memory a8. When the data for individually identifying the recording medium z4 is not used, the processings of the conditional expressions D, E, and A3 are performed regardless of the data for individually identifying the recording medium z4 which is stored in the volatile memory a10 and the data for individually identifying the recording medium z4 which is stored in the nonvolatile memory a8. In this third embodiment, margin measurement is carried out at least twice, and at least two sets of mgn_max and mgn_min are required.

[Conditional Expression A3]

(i) When values are stored for all of mgn_max1, mgn_min1, mgn_max2, and mgn_min1, a utilization rate at which the range of the adjusted convergent lens position from its minimum value to its maximum value becomes not to be included in the range (z19,z20) of the convergent lens position is estimated, and the estimation result is outputted to the estimation result output means c2. That is, when values are stored for all of the maximum value 1 and the maximum value 2 of the convergent lens position after margin measurement and the minimum value 1 and the minimum value 2 of the convergent lens position after margin measurement, a utilization rate at which the range of the adjusted convergent lens position from its minimum value to its maximum value becomes not to be included in the range (z19,z20) of the convergent lens position is estimated, and the estimation result is outputted to the estimation result output means c2.

(ii) When no values are stored for all of mgn_max1, mgn_min1, mgn_max2, and mgn_min2, nothing is executed.

Hereinafter, FIGS. 32 to 34 will be described.

In FIG. 32, when the time elapsed after drive shipment is t0, the margin is measured, and the measurement result is stored in the nonvolatile memory a8. Here, mgn_max has time t0 and value b0 and mgn_min has time t0 and value a0. Since no values are stored for all of mgn_max1, mgn_min1, mgn_max2, and mgn_min1, the conditional expression A3(ii)) is satisfied, and thereby the processing is ended with doing nothing.

Next, when the time elapsed after drive shipment is t1, the adjustment method A is executed, and the result is stored in the nonvolatile memory a8 according to the conditional expressions D and E. That is, since no values are stored for adj_max and adj_min, f1 is stored for adj_max and f1 is stored for adj_min according to the conditional expressions D(i) and E(i). Accordingly, in the nonvolatile memory a8, adj_max has time t1 and value f1, adj_min has time t1 and value f1, mgn_max has time t0 and value b0, and mgn_min has time t0 and value a0. Since no values are stored for all of mgn_max1, mgn_min1, mgn_max2, and mgn_min2, the conditional expression A3(ii)) is satisfied, and thereby the processing is ended with doing nothing.

When the time elapsed after drive shipment is t2, the adjustment method A is executed, and the result is stored in the nonvolatile memory a8 according to the conditional expressions D and E. That is, since f2<f1, adj_min is changed from f1 to f2 with adj_max remaining as it is, according to the conditional expressions D(ii) and E(i). Accordingly, in the nonvolatile memory a8, adj_max has time t1 and value f1, adj_min has time t2 and value f2, mgn_max has time t0 and value b0, and mgn_min has time t0 and value a0. Since no values are stored for all of mgn_max1, mgn_min1, mgn_max2, and mgn_min2, the conditional expression A3(ii)) is satisfied, and thereby the processing is ended with doing nothing.

In FIG. 33, when the time elapsed after drive shipment is t3, the margin is measured, and the measurement result is stored in the extended region in the nonvolatile memory a8. Here, adj_max has time t1 and value f1, adj_min has time t2 and value f2, mgn_max1 has time t0 and value b0, mgn_min1 has time t0 and value a0, mgn_max2 has time t3 and value b1, and mgn_mint has time t3 and value a1. Since values are stored for all of mgn_max1, mgn_min1, mgn_max2, and mgn_min2, the conditional expression A3(i) is satisfied, and the utilization rate is estimated to output the estimation result (ta). The estimation result (ta) is a result estimated from the value a0 of mgn_min and the value al of mgn_min2.

Next, when the time elapsed after drive shipment is t4, the adjustment method A is executed, and the result is stored in the nonvolatile memory a8 according to the conditional expressions D and E. That is, since f3>f1 and f3>f2, adj_max is changed from f1 to f3 while adj_min remains at f2 according to the conditional expressions D(i) and E(ii). Accordingly, in the nonvolatile memory a8, adj_max has time t4 and value f3, adj_min has time t2 and value f2, mgn_max1 has time t0 and value b0, mgn_min1 has time t0 and value a0, mgn_max2 has time t3 and value b1, and mgn_min2 has time t3 and value a1. Since values are stored for all of mgn_max1, mgn_min1, mgn_max 2, and mgn_min2, the conditional equation A3(i) is satisfied, and the utilization rate is measured to output the measurement result (ta).

When the time elapsed after drive shipment is t5, the adjustment method A is executed, and the result is stored in the nonvolatile memory a8 according to the conditional expressions D and E. That is, since f4<f3 and f4>f2, adj_max remains at f3 and adj_min remains at f2 according to the conditional expressions D(ii) and E(ii). Therefore, in the nonvolatile memory a8, adj_max has time t4 and value f3, adj_min has time t2 and value f2, mgn_max1 has time t0 and value b0, mgn_min1 has time t0 and value a0, mgn_max2 has time t3 and value b1, and mgn_min2 has time t3 and value a1. Since values are stored for all of mgn_max1, mgn_min1, mgn_max 2, and mgn_min2, the conditional equation A3(i) is satisfied, and the utilization rate is measured to output the measurement result (ta).

In FIG. 34, when the time elapsed after drive shipment is t6, the margin is measured, and the measurement result is stored in the extended region in the nonvolatile memory a8. Here, adj_max has time t4 and value f3, adj_min has time t2 and value f2, mgn_max1 has time t0 and value b0, mgn_min1 has time t0 and value a0, mgn_max2 has time t3 and value b1, mgn_min2 has time t3 and value a1, mgn_max3 has time t6 and value b2, and mgn_min3 has time t6 and value a2. Since values are stored for all of mgn_max1, mgn_min1, mgn_max2, mgn_min2, mgn_max3, and mgn_min3, the conditional expression A3(i) is satisfied, and the utilization rate is estimated to output the estimation result (tb). The estimation result (tb) is a result which is estimated from the value a0 of mgn_min1, the value a1 of mgn_min2, and the value a2 of mgn_min3.

Next, when the time elapsed after drive shipment is t7, the measurement method A is executed, and the result is stored in the nonvolatile memory a8 according to the conditional expressions D and E. That is, since f5<f3 and f5>f2, adj_max remains at f3 and adj_min remains at f2 according to the conditional expressions D(ii) and E(ii). Here, adj_max has time t4 and value f3, adj_min has time t2 and value f2, mgn_max1 has time t0 and value b0, mgn_min1 has time t0 and value a0, mgn_max2 has time t3 and value b1, mgn_min2 has time t3 and value a1, mgn_max3 has time t6 and value b2, and mgn_min3 has time t6 and value a2. Since values are stored for all of mgn_max1, mgn_min1, mgn_max2, mgn_min2, mgn_max3, and mgn_min3, the conditional expression A3(i) is satisfied, and the utilization rate is estimated to output the estimation result (tb).

Figure 35:
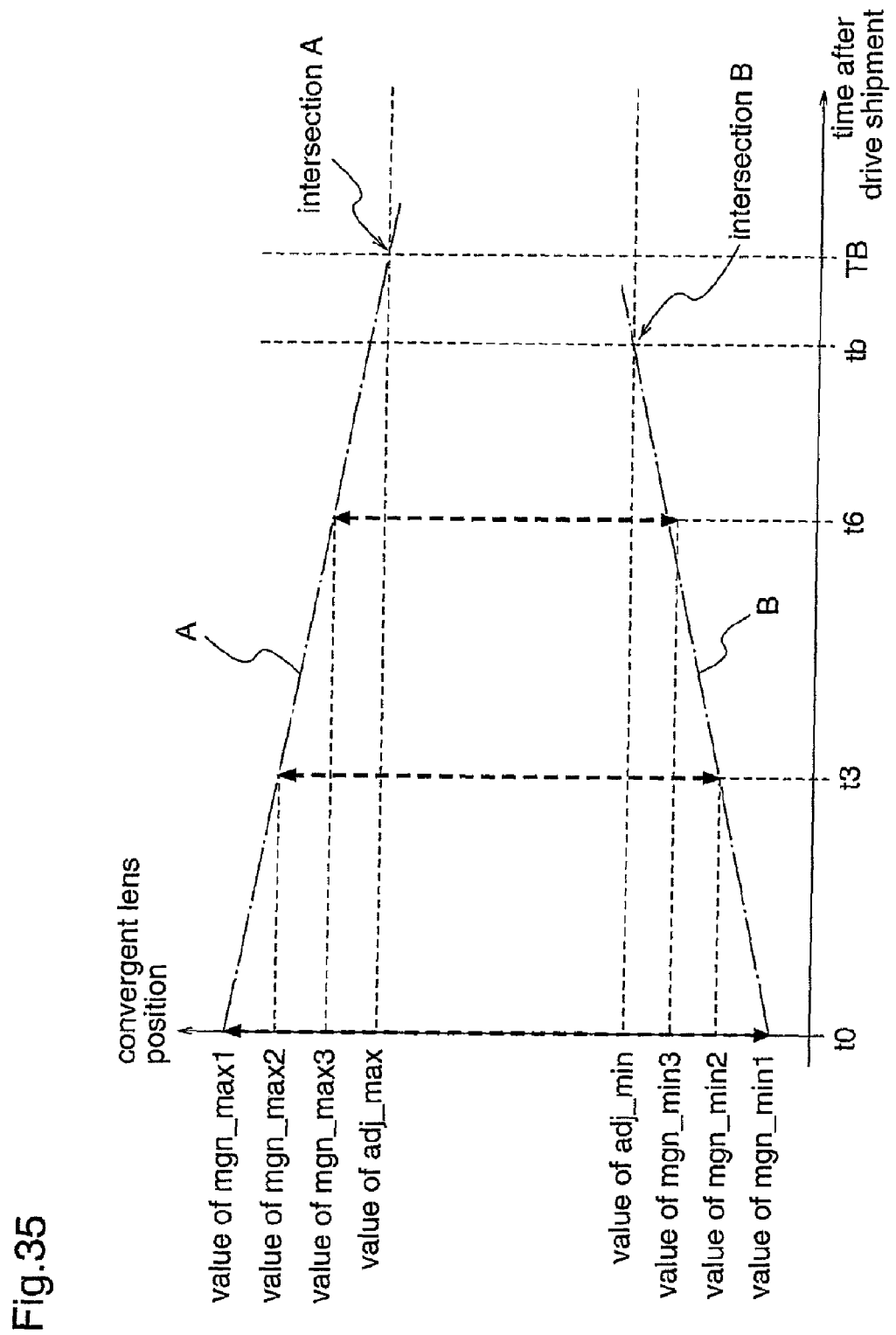
FIG. 35 shows a utilization rate estimation method of the optical disc signal processing device according to the third embodiment.

FIG. 35 is a diagram for explaining the method of estimating the utilization rate at which the range of the adjusted convergent lens position from its minimum value to its maximum value becomes not to be included in the range (z19,z20) of the convergent lens position in the optical disc signal processing device of the third embodiment, which method will be explained for the case where "the time elapsed after drive shipment is t6" shown in FIG. 34. While in FIG. 35 a straight line A having the shortest distances from (t0, value of mgn_max1), (t3, value of mgn_max2), and (t6, value of mgn_max3) is obtained and a straight line B having the shortest distances from (t0, value of mgn (t3, value of mgn_min2), and (t6, value of mgn_min3) is obtained, specifically an approximation method such as a least-square method is utilized. Further, a similar function can be realized by performing an approximation using second or more order functions instead of the straight lines. Among the time (TB) at the intersection A of the straight line A and the value of adj_max and the time (tb) at the intersection B of the straight line B and the value of adj_min, the time (tb) at the intersection at which the time elapsed after drive shipment is shorter is outputted as the estimation result. As shown in FIG. 35, the range of the margin is narrowed with the passage of time after drive shipment. Further, in the case of the operation F, a utilization rate at which the range of the fixed values becomes not to be included in the range (z19,z20) of the convergent lens position is estimated by a similar method except that "value of adj_max" is replaced with "MAX (fixed value)" and "value of adj_min" is replaced with "MIN (fixed value)" in FIG. 35.

In this third embodiment, as shown in FIGS. 32 to 34 and FIGS. 36 to 38, the time (tb) of the intersection at which the passage time after drive shipment is shorter is outputted as the estimation result. However, the time (TB) of the intersection at which the passage time after drive shipment is longer, or (tb+TB)/2 may be outputted as the estimation result.

Figure 36:
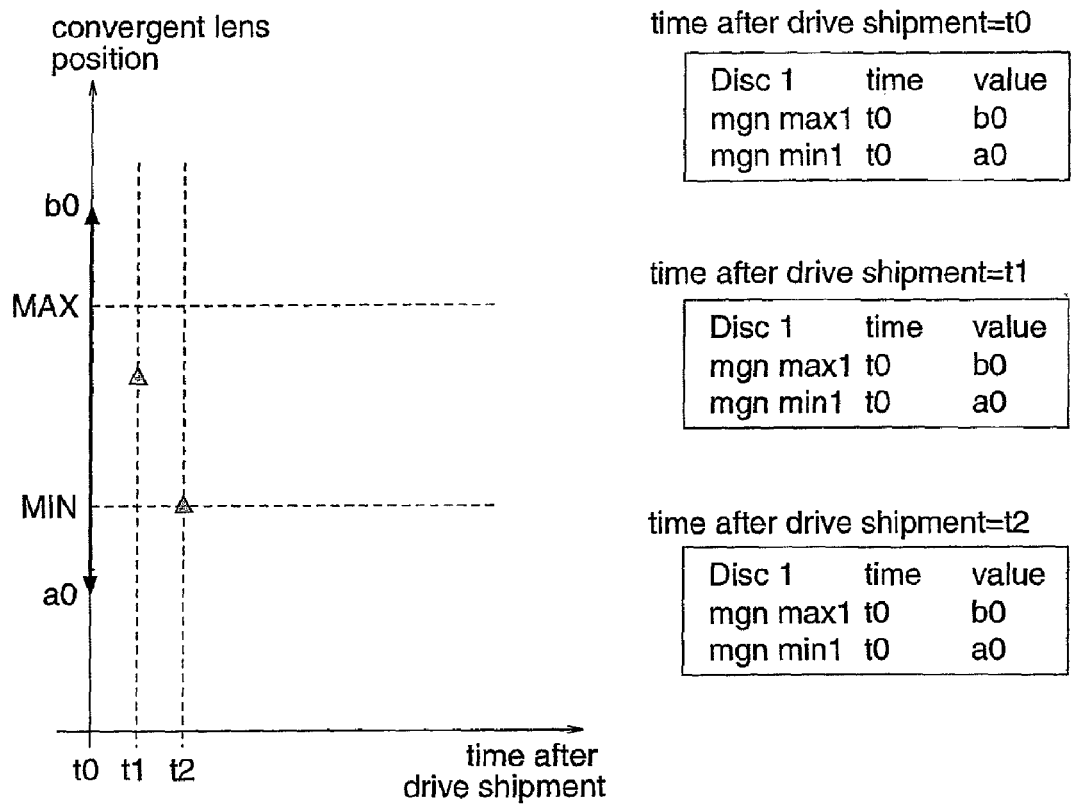
FIG. 36 shows the drive operation and the data structure (5) of the optical disc signal processing device according to the third embodiment.
Figure 37:
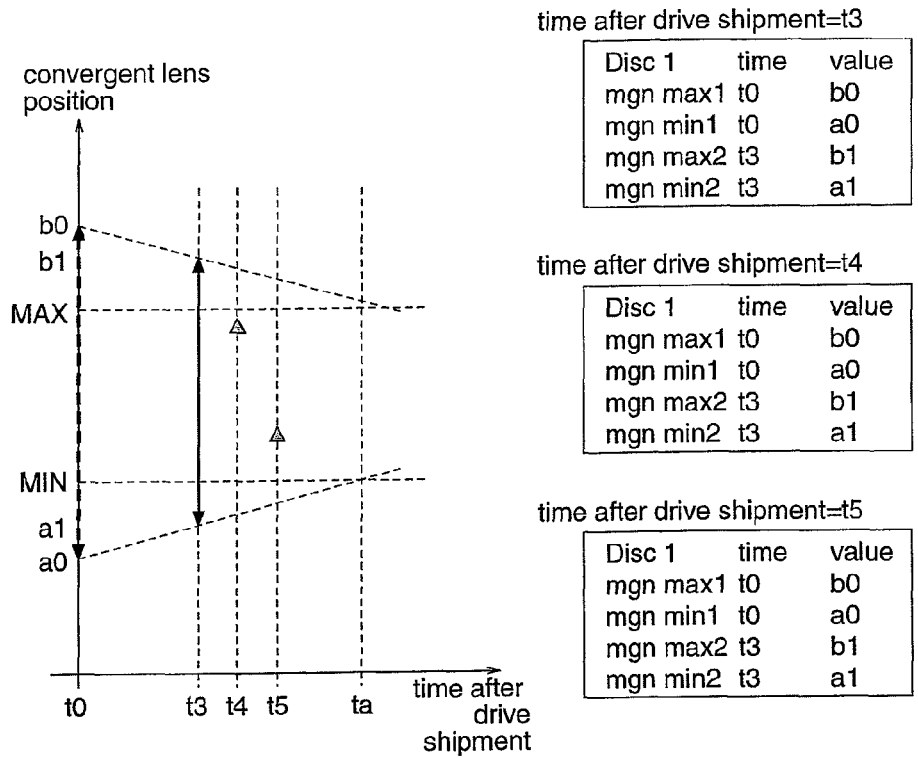
FIG. 37 shows the drive operation and the data structure (6) of the optical disc signal processing device according to the third embodiment.
Figure 38:
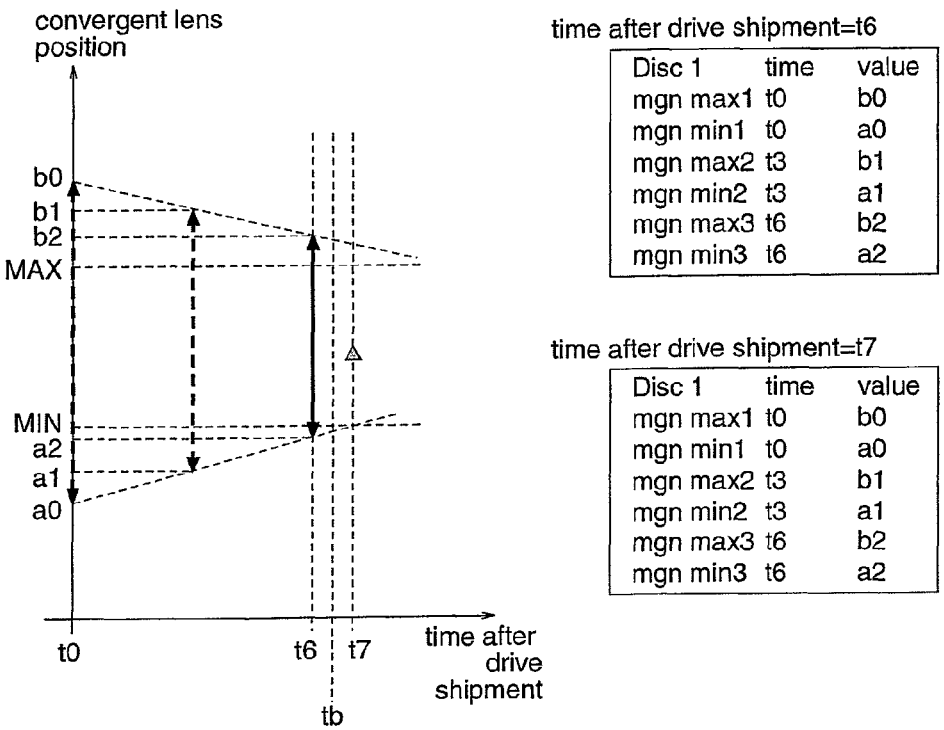
FIG. 38 shows the drive operation and the data structure (7) of the optical disc signal processing device according to the third embodiment.

FIGS. 36 to 38 show the drive operation and the data contents stored in the nonvolatile memory a8, which are obtained when the sixth operation of the optical disc signal processing device of the third embodiment is executed. As for the conditional expressions, the above-described conditional expressions D and E and a conditional expression F3 to be described later are adopted. In the case of using the data for individually identifying the recording medium z4, the processings of the conditional expressions D, E, and F3 are performed only when the data for individually identifying the recording medium z4 which is stored in the volatile memory a10 matches the data for individually identifying the recording medium z4 which is stored in the nonvolatile memory a8. When the data for individually identifying the recording medium z4 is not used, the processings of the conditional expressions D, E, and F3 are carried out regardless of the data for individually identifying the recording medium z4 which is stored in the volatile memory a10 and the data for individually identifying the recording medium z4 which is stored in the nonvolatile memory a8.

[Conditional Expression F3]

(i) When values are stored for all of mgn_max1, mgn_min1, mgn_max2, and mgn_min2, a utilization rate at which the range of the fixed values becomes not to be included in the range (z19,z20) of the convergent lens position is estimated, and the estimation result is outputted to the estimation result output means c2. That is, when values are stored for all of the maximum value 1 and the maximum value 2 of the convergent lens position after margin measurement and the minimum value 1 and the minimum value 2 of the convergent lens position after margin measurement, a utilization rate at which the range of the fixed values becomes not to be included in the range (z19,z20) of the convergent lens position is estimated, and the estimation result is outputted to the estimation result output means c2.

(ii) When no values are stored for all of mgn_max1, mgn_min1, mgn_max2, and mgn_min2, nothing is executed.

Hereinafter, FIGS. 36 to 38 will be described.

In FIG. 36, when the time elapsed after drive shipment is t0, the margin is measured, and the measurement result is stored in the nonvolatile memory a8. Here, mgn_max has time t0 and value b0 and mgn_min has time t0 and value a0. Since no values are stored for all of mgn_max1, mgn_min1, mgn_max2, and mgn_min2, the conditional expression F3(ii) is satisfied, and the processing is ended with doing nothing.

Next, when the time elapsed after drive shipment is t1, the adjustment method A is executed. Here, mgn_max has time t0 and value b0 and mgn_min has time t0 and value a0. Since no values are stored for all of mgn_max1, mgn_min1, mgn_max2, and mgn_min1, the conditional expression F3(ii) is satisfied, and the processing is terminated with doing nothing.

When the time elapsed after drive shipment is t2, the adjustment method A is executed. Here, mgn_max has time t0 and value b0 and mgn_min has time t0 and value a0. Since no values are stored for all of mgn_max1, mgn_min1, mgn_max2, and mgn_min2, the conditional expression F3(ii) is satisfied, and the processing is ended with doing nothing.

In FIG. 37, when the time elapsed after drive shipment is t3, the margin is measured, and the measurement result is stored in the extended region in the nonvolatile memory a8. Here, mgn_max1 has time t0 and value b0, mgn_min1 has time t0 and value a0, mgn_max2 has time t3 and value b1, and mgn_min2 has time t3 and value a1. Since values are stored for all of mgn_max1, mgn_min1, mgn_max2, and mgn_min2, the conditional expression F3(i) is satisfied, and the utilization rate is estimated to output the estimation result (ta).

Next, when the time elapsed after drive shipment is t4, the adjustment method A is executed. Here, mgn_max1 has time t0 and value b0, mgn_min1 has time t0 and value a0, mgn_max2 has time t3 and value b1, and mgn_min2 has time t3 and value a1. Since values are stored for all of mgn mail, mgn_min1, mgn_max 2, and mgn_min2, the conditional equation F3(i) is satisfied, and the utilization rate is measured to output the measurement result (ta).

When the time elapsed after drive shipment is t5, the adjustment method A is executed. Here, mgn_max1 has time t0 and value b0, mgn_min1 has time t0 and value a0, mgn_max2 has time t3 and value b1, and mgn_min2 has time t3 and value a1. Since values are stored for all of mgn mail, mgn_min1, mgn_max 2, and mgn_min2, the conditional equation F3(i) is satisfied, and the utilization rate is measured to output the measurement result (ta).

In FIG. 38, when the time elapsed after drive shipment is t6, the margin is measured, and the measurement result is stored in the extended region in the nonvolatile memory a8. Here, mgn_max1 has time t0 and value b0, mgn_min1 has time t0 and value a0, mgn_max2 has time t3 and value b1, mgn_min2 has time t3 and value a1, mgn_max3 has time t6 and value b2, and mgn_min3 has time t6 and value a2. Since values are stored for all of mgn_max1, mgn_min1, mgn_max2, mgn_min2, mgn_max3, and mgn_min3, the conditional expression F3(i) is satisfied, and the utilization rate is estimated to output the estimation result (tb).

Next, when the time elapsed after drive shipment is t7, the measurement method A is executed. Here, mgn mail has time t0 and value b0, mgn_min1 has time t0 and value a0, mgn_max2 has time t3 and value b1, mgn_min2 has time t3 and value a1, mgn_max3 has time t6 and value b2, and mgn_min3 has time t6 and value a2. Since values are stored for all of mgn_max1, mgn_min1, mgn_max2, mgn_min2, mgn_max3, and mgn_min3, the conditional expression F3(i) is satisfied, and the utilization rate is estimated to output the estimation result (tb).

While in this third embodiment the focus error detection means z7, the focus control means z11, and the focus driving means z12 are used, the tracking balance change means may be provided instead of the focus error detection means z7, the tracking control means may be provided instead of the focus control means z11, and the tracking driving means may be provided instead of the focus driving means z12.

Further, while in this third embodiment the focus balance change means z10, the focus control means z11, and the focus drive means z12 are used, the tilt error detection means may be provided instead of the focus error detection means z7, the tilt change means may be provided instead of the focus balance change means z10, the tilt control means may be provided instead of the focus control means z11, and the tilt drive means may be provided instead of the focus drive means z12.

Further, the reproduction jitter processing means may be provided instead of the reproduction signal processing means z8.

Further, when the movement amount of the convergent lens z3 for reducing the tracking error is not outputted from the tracking control means to the tracking drive means, the tracking error detection means may be used instead of the reproduction signal processing means z8.

Further, when the movement amount of the convergent lens z3 for reducing the tracking error is outputted from the tracking control means to the tracking drive means, the wobble signal processing means may be used instead of the reproduction signal processing means z8.

Further, the wobble jitter processing means may be provided instead of the reproduction signal processing means z8.

As described above, according to the third embodiment, the optical disc signal processing device comprises the focus balance adjustment means Aa7 which adjusts the convergent lens position by using the focus balance change means z10 on the basis of the output from the reproduction signal processing means z8, the margin measurement means a4 which obtains a range of the control target value from its minimum value to its maximum value, within which the optical disc signal processing device can perform normal operation, the condition setting means a3 which sets a threshold value of the reproduction signal when measuring the margin, the timer a9 which measures the utilization rate of the optical disc signal processing device, the nonvolatile memory a8 which stores the range of the convergent lens position from its minimum value to its maximum value, which is obtained by the margin measurement means a4, together with the utilization rate outputted from the timer a9, the comparison means Cc1 which estimates the utilization rate at which the range of the convergent lens position becomes equal to or smaller than a certain threshold value on the basis of the utilization rate of the optical disc signal processing device which is stored in the nonvolatile memory, and the range of the convergent lens position which is obtained by the margin measurement means a4, and the estimation result output means c2 which outputs the estimated utilization rate. Therefore, when the range of the margin is narrowed with the passage of time after drive shipment, the utilization rate with which the range of the adjusted convergent lens position from its minimum value to its maximum value becomes not to be included in the range of the convergent lens position is estimated, and thereby the user of the optical disc signal processing device can know the period during which the recording medium can be normally reproduced and recorded.

Embodiment 4

Figure 39:
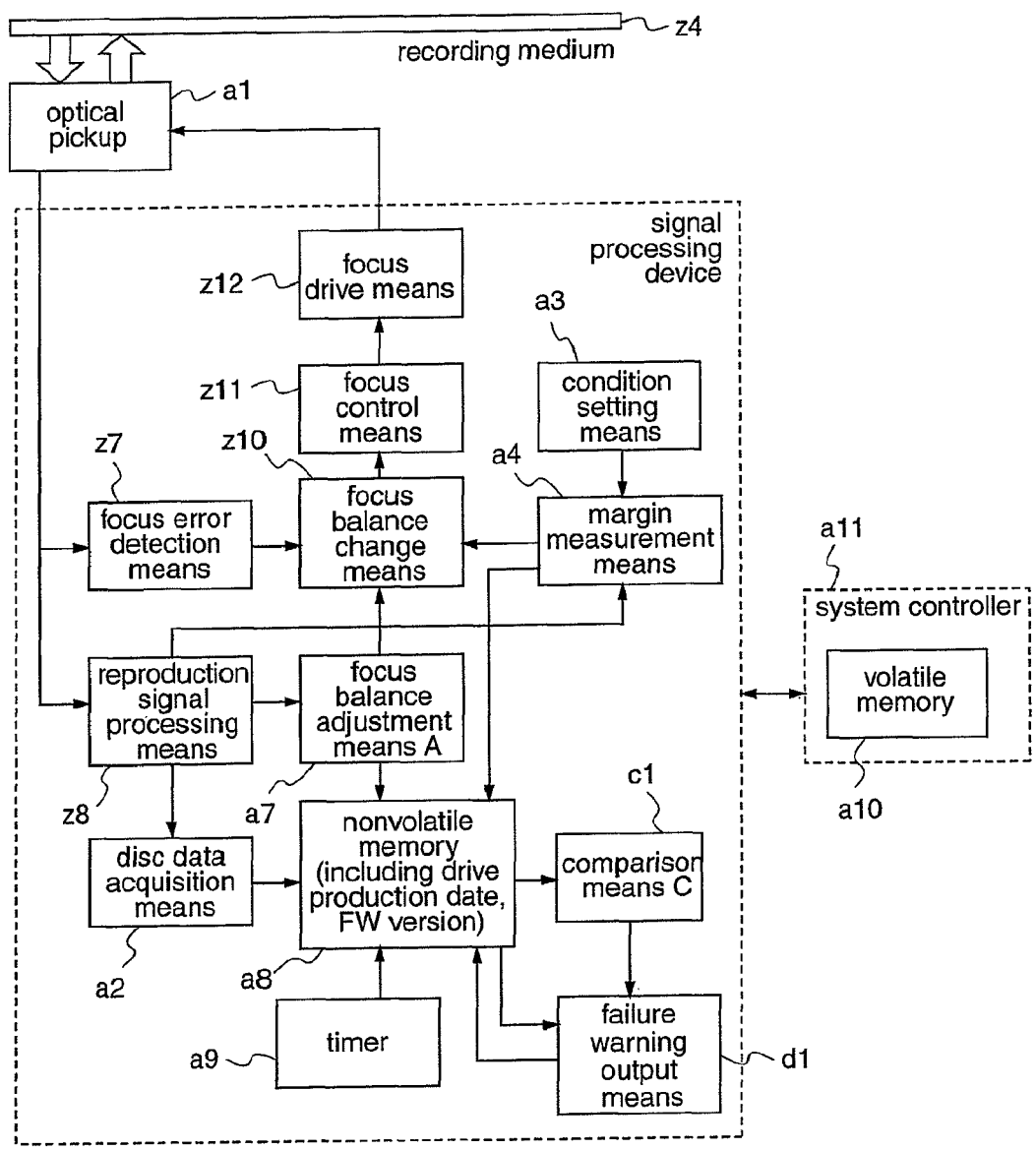
FIG. 39 is a system configuration diagram of an optical disc signal processing device according to a fourth embodiment of the present invention.

FIG. 39 is a system configuration diagram of an optical disc signal processing device according to a fourth embodiment of the present invention. The present invention includes a failure warning output means d1 in addition to the above-described focus error detection means z7, reproduction signal processing means z8, focus balance change means z10, focus control means z11, focus drive means z12, optical pickup a1, disc data acquisition means a2, condition setting means a3, margin measurement means a4, focus balance adjustment means Aa7, nonvolatile memory a8, timer a9, and comparison means C c1, and further, it includes a system controller a11 having a volatile memory a10, which manages the above-described respective means with programs.

Next, the respective constituents will be described along the signal transmission path.

Since the focus error detection means z7, the reproduction signal processing means z8, the focus balance change means z10, the focus control means z11, the focus drive means z12, the optical pickup a1, the disc data acquisition means a2, the condition setting means a3, the margin measurement means a4, the focus balance adjustment means Aa7, the nonvolatile memory a8, the timer a9, and the comparison means C c1 have already been described, repeated description is not necessary.

The failure warning output means d1 obtains an "estimation result A" which is a result obtained by estimating a utilization rate at which the range of the adjusted convergent lens position from its minimum value to its maximum value becomes not to be included in the range (z19,z20) of the convergent lens position, by utilizing the data indicating the utilization rate of the drive that has previously been stored in the nonvolatile memory a8, the range (z19,z20) of the convergent lens position, and the convergent lens position after adjusted that is outputted from the focus balance adjustment means Aa7, which are stored in the nonvolatile memory a8, and compares the "estimation result A" with an "estimation result B" which is a currently estimated result outputted from the comparison means Cc1. When the comparison result satisfies ("estimation result A"–"estimation result B")>positive fixed value, data which informs a failure of the drive to a device to which the drive is connected is outputted through a cable (e.g., a ATAPI cable) connecting the drive and the device. As a command format for performing data exchange via a cable, there is a ATAPI command or a DIAG command (an original command format used when data exchange is performed between the program which is operated on the system controller a11 and the program which is operated on the device to which the drive is connected). When ("estimation result A"–"estimation result B")≦positive fixed value, data which informs a failure of the drive to the device to which the drive is connected is not outputted. When the comparison between the "estimation result A" and the "estimation result B" is completed, the "estimation result B" is written over the area in the nonvolatile memory a8 where the "estimation result A" is stored.

Next, the operation of the program stored in the system controller will be described.

FIG. 40 is a flowchart showing the operation procedure of the program of the optical disc signal processing device according to the fourth embodiment, wherein (a) shows the procedure at start-up or before start of recording, and (b) shows the procedure during margin measurement. The specific steps in the flowchart will be described.

The following steps are carried out at start-up or before start of recording.

Since the disc data acquisition step sa1, the focus balance adjustment step Bsb1, the focus balance adjusted value storage step Asa4, and the estimation result output step sc1 have already been described, repeated description is not necessary. However, in the estimation result output step sc1, the estimation result is not outputted to the device to which the drive is connected.

Figure 40A:
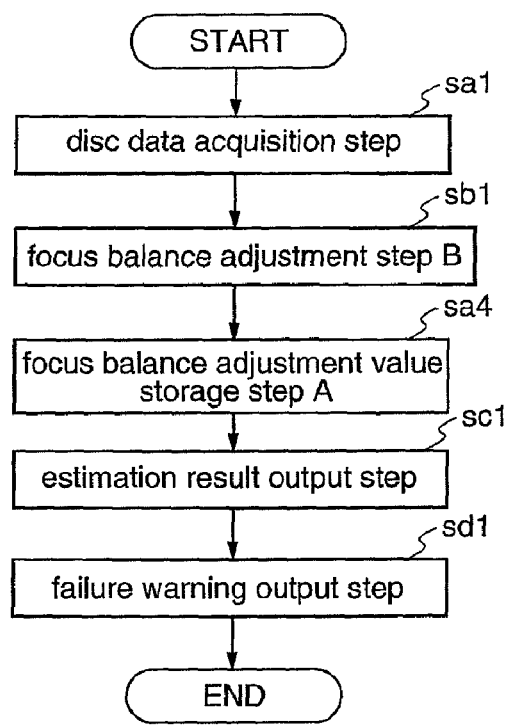
FIG. 40 is a flowchart showing the program operation of the optical disc signal processing device according to the fourth embodiment.

As shown in FIG. 40(a), after the disc data acquisition step sa1, the focus balance adjustment step Bsb1, the focus balance adjusted value storage step Asa4, and the estimation result output step sc1 are performed, if the estimation result is stored in the nonvolatile memory a8 in the failure warning output step sd1, the "estimation result A" stored in the nonvolatile memory a8 is obtained to be compared with the "estimation result B" outputted from the comparison means C c1. When the comparison result satisfies ("estimation result A"–"estimation result B")>positive fixed value, data which informs a failure of the drive is outputted to the device to which the drive is connected via the cable (e.g., the ATAPI cable) connecting the drive and the device. When the estimation result is not stored in the nonvolatile memory a8, the data which informs a failure of the drive is not outputted to the device to which the drive is connected. When the process of comparing the "estimation result A" and the "estimation result B" is completed, the "estimation result B" is written over the area in the nonvolatile memory a8 where the "estimation result A" is stored.

The system controller a11 continuously monitors the data outputted from the timer a9, and executes the following steps when the data is increased by a predetermined value.

Since the disc data acquisition step sa1, the focus balance value acquisition step sa5, the access step sa6, the margin measurement step Asa7, the focus balance value restoration step sa8, and the estimation result output step sc1 have already been described, repeated description is not necessary. However, in the estimation result output step sc1, the estimation result is not outputted to the device to which the drive is connected via the cable connecting the drive and the device.

Figure 40B:
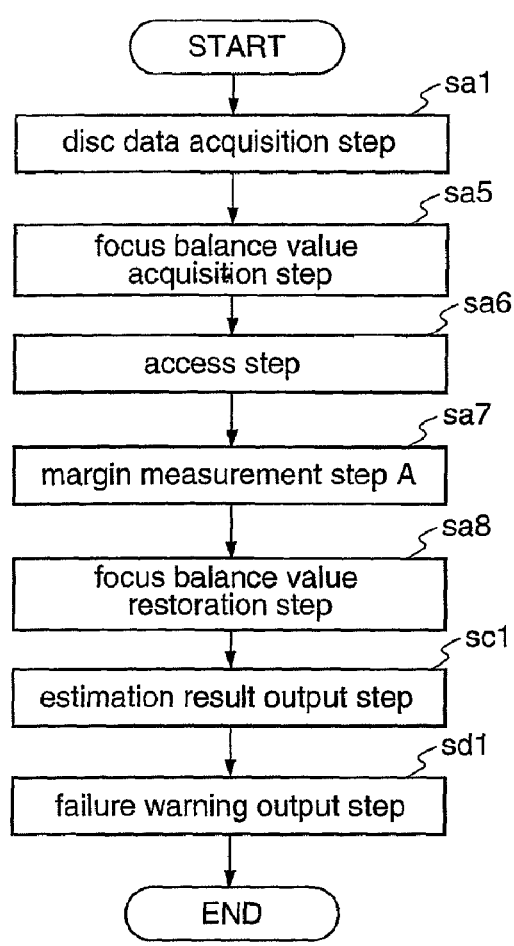

As shown in FIG. 40(b), after the disc data acquisition step sa1, the focus balance value acquisition step sa5, the access step sa6, the margin measurement step Asa7, the focus balance value restoration step sa8, and the estimation result output step sc1 are performed, the same processing as that at start-up or before start of recording is executed in the failure warning output step sd1.

Next, the data contents stored in the nonvolatile memory a8 when executing the present invention will be described with reference to FIG. 41.

Figure 41:
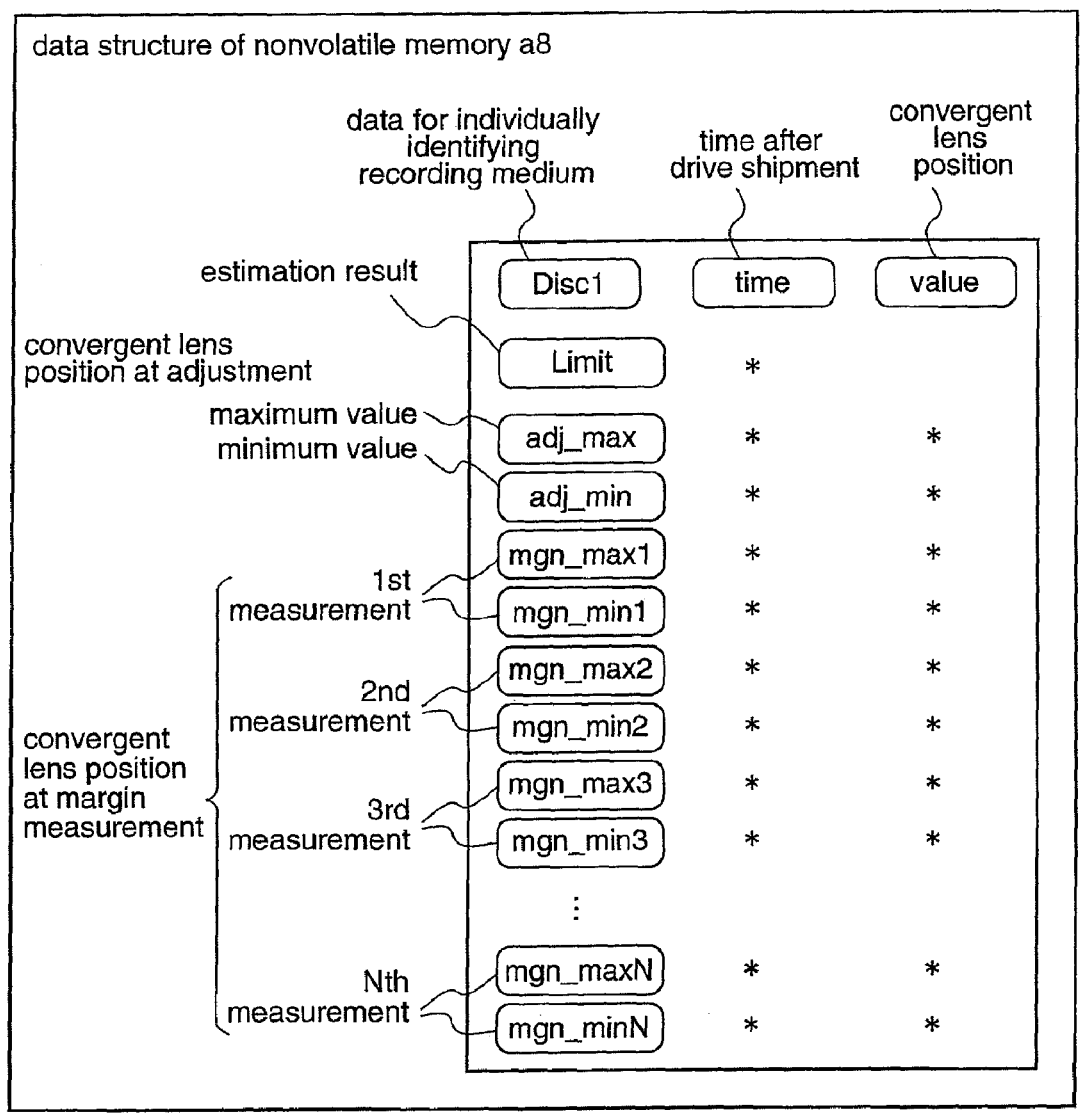
FIG. 41 shows the drive operation and the data structure (1) of the optical disc signal processing device according to the fourth embodiment.

FIG. 41 shows the data structure which is stored in the nonvolatile memory a8 of the optical disc signal processing device of the fourth embodiment. The estimation result outputted from the comparison means is stored in Limit. Since other part of the data structure is identical to that shown in FIG. 31, repeated description is not necessary.

Figure 42:
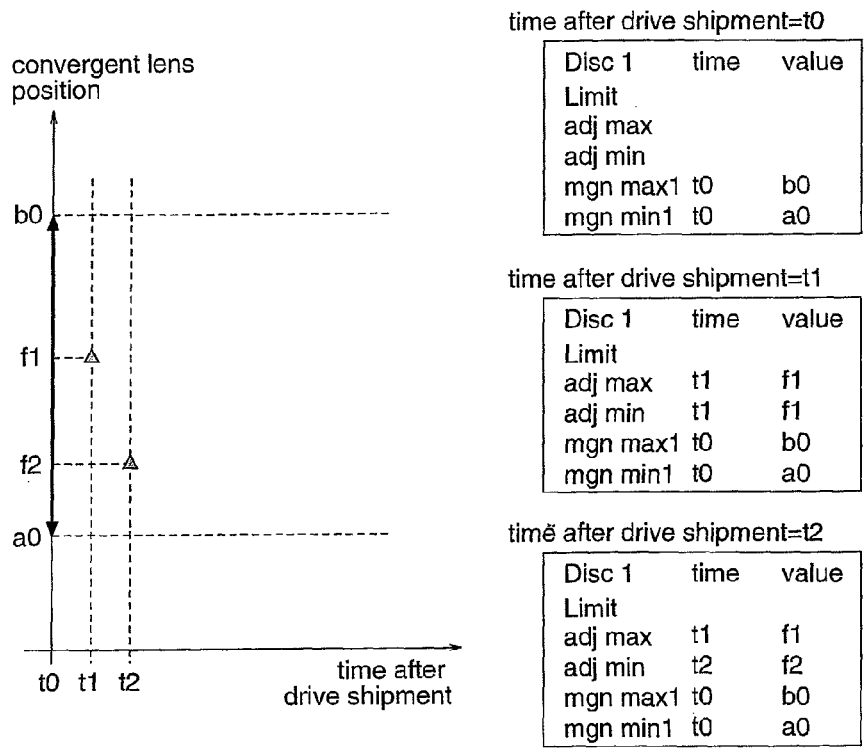
FIG. 42 shows the drive operation and the data structure (2) of the optical disc signal processing device according to the fourth embodiment.
Figure 43:
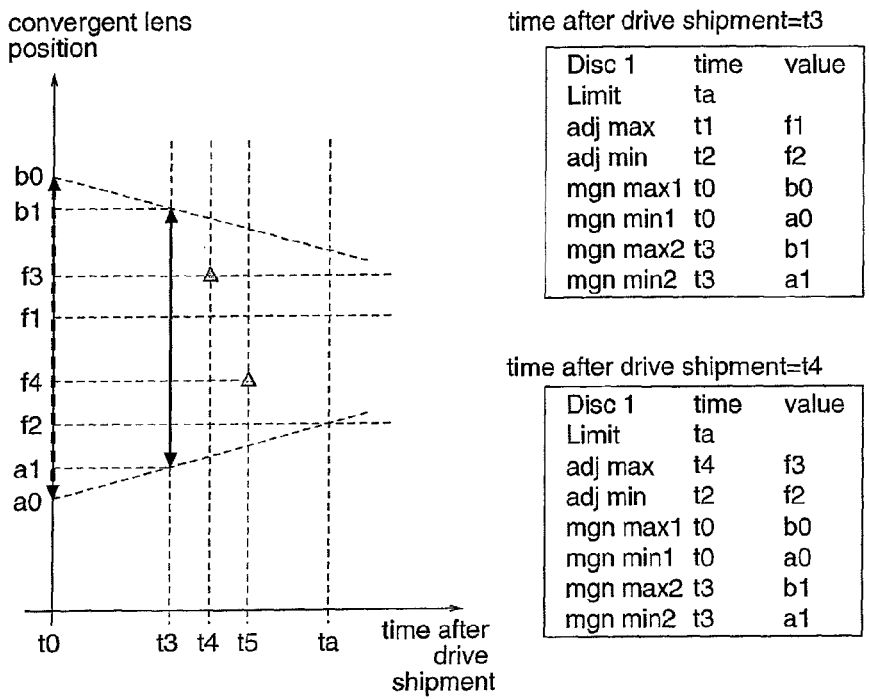
FIG. 43 shows the drive operation and the data structure (3) of the optical disc signal processing device according to the fourth embodiment.
Figure 44:
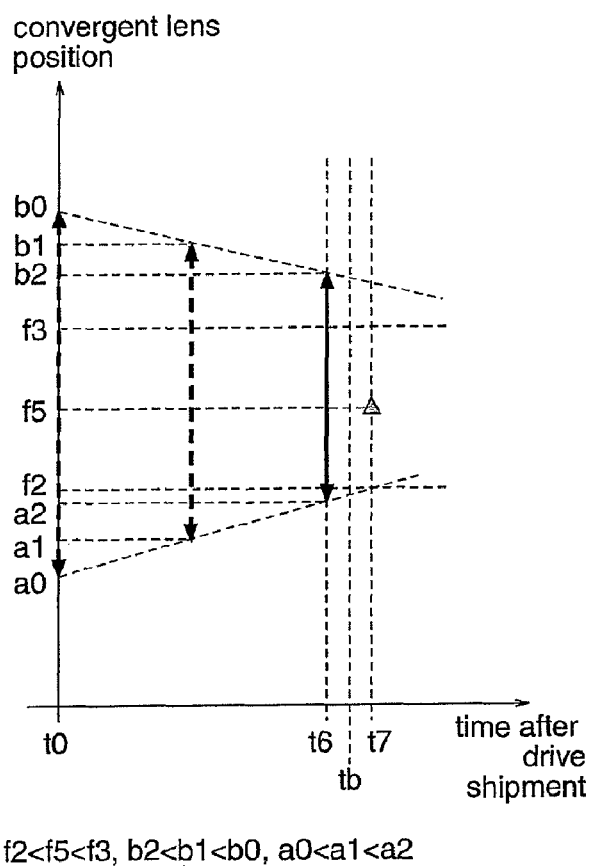
FIG. 44 shows the drive operation and the data structure (4) of the optical disc signal processing device according to the fourth embodiment.

FIGS. 42 to 44 are diagrams showing the drive operation when the present invention is executed, and the data contents stored in the nonvolatile memory a8. When using the data for individually identifying the recording medium z4, the processes of the conditional expressions D, E, and A3 are performed only when the data for individually identifying the recording medium z4 which is stored in the volatile memory a10 matches the data for individually identifying the recording medium z4 which is stored in the nonvolatile memory a8. When the data for individually identifying the recording medium z4 is not used, the processes of the conditional expressions D, E, and A3 are performed regardless of the data for individually identifying the recording medium z4 which is stored in the volatile memory a10 and the data for individually identifying the recording medium z4 which is stored in the nonvolatile memory a8.

Hereinafter, FIGS. 42 to 44 will be described.

In FIG. 42, when the time elapsed after drive shipment is t0, the margin is measured, and the measurement result is stored in the nonvolatile memory a8. Here, mgn_max has time t0 and value b0 and mgn_min has time t0 and value a0. Since values are not stored for all of mgn_max1, mgn_min1, mgn_max2, and mgn_min2, the conditional expression A3(ii) is satisfied, and the operation is ended with doing nothing. Since no estimation result is stored in Limit, no failure warning is outputted.

Next, when the time elapsed after drive shipment is t1, the adjustment method A is executed, and the result is stored in the nonvolatile memory a8 according to the conditional expressions D and E. That is, since no values are stored for adj_max and adj_min, f1 is stored for adj_max and f1 is stored for adj_min according to the conditional expressions D(i) and E(i). Accordingly, in the nonvolatile memory a8, adj_max has time t1 and value f1, adj_min has time t1 and value f1, mgn_max has time t0 and value b0, and mgn_min has time t0 and value a0. Since no values are stored for all of mgn_max1, mgn_min1, mgn_max2, and mgn_min1, the conditional expression A3(ii)) is satisfied, and the process is ended with doing nothing. Since no estimation result is stored in Limit, no failure warning is outputted.

When the time elapsed after drive shipment is t2, the adjustment method A is executed, and the result is stored in the nonvolatile memory a8 according to the conditional expressions D and E. That is, since f2<f1, adj_min is changed from f1 to f2 with adj_max remaining as it is, according to the conditional expressions D(ii) and E(i). Here, adj_max has time t1 and value f1, adj_min has time t2 and value f2, mgn_max has time t0 and value b0, and mgn_min has time t0 and value a0. Since no values are stored for all of mgn_max1, mgn_min1, mgn_max2, and mgn_min1, the conditional expression A3(ii)) is satisfied, and the processing is ended with doing nothing. Since no estimation result is stored in Limit, no failure warning is outputted.

In FIG. 43, when the time elapsed after drive shipment is t3, the margin is measured, and the measurement result is stored in the extended region in the nonvolatile memory a8. Here, Limit is ta, adj_max has time t1 and value f1, adj_min has time t2 and value f2, mgn_max1 has time t0 and value b0, mgn_min1 has time t0 and value a0, mgn_max2 has time t3 and value b1, and mgn_mint has time t3 and value a1. Since values are stored for all of mgn_max1, mgn_min1, mgn_max2, and mgn_min2, the conditional expression A3(i) is satisfied, and the utilization rate is estimated to output an estimation result (ta). Since no estimation result is stored in Limit, no failure warning is outputted. Then, the estimation result (ta) is stored in Limit in the nonvolatile memory a8.

Next, when the time elapsed after drive shipment is t4, the adjustment method A is executed, and the result is stored in the nonvolatile memory a8 according to the conditional expressions D and E. That is, since f3>f1, the adj_max is changed from f1 to f3 and adj_min remains at f2 according to the conditional expressions D(i) and E(ii). Accordingly, in the nonvolatile memory a8, Limit is ta, adj_max has time t4 and value f3, adj_min has time t2 and value f2, mgn_max1 has time t0 and value b0, mgn_min1 has time t0 and value a0, mgn_max2 has time t3 and value b1, and mgn_min2 has time t3 and value a1. Since values are stored for all of mgn_max1, mgn_min1, mgn_max 2, and mgn_min2, the conditional equation A3(i) is satisfied, and the utilization rate is measured to output an estimation result B (ta). The estimation result A (ta) stored in Limit is obtained to be compared with the estimation result B (ta). Since estimation result A−estimation result B=ta−ta=0, no failure warning is outputted. The estimation result B outputted from the comparison means Cc1 is written over the area where the estimation result A is stored.

Since the operation when the time elapsed after drive shipment is t5 is identical to that when the time elapsed after drive shipment is t4, repeated description is not necessary.

In FIG. 44, when the time elapsed after drive shipment is t6, the margin is measured, and the measurement result is stored in the extended region in the nonvolatile memory a8. Here, Limit is tb, adj_max has time t4 and value f3, adj_min has time t2 and value f2, mgn_max1 has time t0 and value b0, mgn_min1 has time t0 and value a0, mgn_max2 has time t3 and value b1, mgn_min2 has time t3 and value a1, mgn_max3 has time t6 and value b2, and mgn_min3 has time t6 and value a2. Since values are stored for all of mgn_max1, mgn_min1, mgn_max2, mgn_min2, mgn_max1, and mgn_min3, the conditional expression A3(i) is satisfied, and the utilization rate is estimated to output the estimation result (tb). The estimation result A (ta) stored in Limit is obtained to be compared with the estimation result B (tb). Since estimation result A−estimation result B=ta−tb>fixed value (=0), a failure warning is outputted. The estimation result B is written over the area where the estimation result A is stored.

Next, when the time elapsed after drive shipment is t7, the measurement method A is executed, and the result is stored in the nonvolatile memory a8 according to the conditional expressions D and E. That is, since f3>f5 and f5>f2, adj_max remains at f3 and adj_min remains at f2 according to the conditional expressions D(ii) and E(ii). Here, Limit is tb, adj_max has time t4 and value f3, adj_min has time t2 and value f2, mgn_max1 has time t0 and value b0, mgn_min1 has time t0 and value a0, mgn_max2 has time t3 and value b1, mgn_min1 has time t3 and value a1, mgn_max1 has time t6 and value b2, and mgn_min3 has time t6 and value a2. Since values are stored for all of mgn_max1, mgn_min1, mgn_max2, mgn_min2, mgn_max1, and mgn_min3, the conditional expression A3(i) is satisfied, and the utilization rate is estimated to output the estimation result (tb). The estimation result A (tb) stored in Limit is obtained to be compared with the estimation result B (tb). Since estimation result A−estimation result B=tb−tb=0, no failure warning is outputted. The estimation result B is written over the area where the estimation result A is stored.

While in this fourth embodiment the focus error detection means z7, the focus control means z11, and the focus driving means z12 are used, the tracking balance change means may be provided instead of the focus error detection means z7, the tracking control means may be provided instead of the focus control means z11, and the tracking driving means may be provided instead of the focus driving means z12.

Further, the tilt error detection means may be provided instead of the focus error detection means z7, the tilt change means may be provided instead of the focus balance change means z10, the tilt control means may be provided instead of the focus control means z11, and the tilt drive means may be provided instead of the focus drive means z12.

Further, the reproduction jitter processing means may be provided instead of the reproduction signal processing means z8.

Further, when the movement amount of the convergent lens z3 for reducing the tracking error is not outputted from the tracking control means to the tracking drive means, the tracking error detection means may be used instead of the reproduction signal processing means z8.

Further, when the movement amount of the convergent lens z3 for reducing the tracking error is outputted from the tracking control means to the tracking drive means, the wobble signal processing means may be used instead of the reproduction signal processing means z8.

Further, the wobble jitter processing means may be provided instead of the reproduction signal processing means z8.

As described above, according to the fourth embodiment, the optical disc signal processing device comprises the focus balance adjustment means Aa7 which adjusts the convergent lens position by using the focus balance change means z10 on the basis of the output from the reproduction signal processing means z8, the margin measurement means a4 which obtains a range of the control target value from its minimum value to its maximum value, within which the optical disc signal processing device can perform normal operation, the condition setting means a3 which sets a threshold value of the reproduction signal when measuring the margin, the timer a9 which measures the utilization rate of the optical disc signal processing device, the nonvolatile memory a8 which stores the range of the convergent lens position from its minimum value to its maximum value, which is obtained by the margin measurement means a4, together with the utilization rate outputted from the timer a9, the comparison means Cc1 which estimates the utilization rate at which the range of the convergent lens position becomes equal to or smaller than a certain threshold value on the basis of the utilization rate of the optical disc signal processing device which is stored in the nonvolatile memory, and the range of the convergent lens position which is obtained by the margin measurement means a4, and the failure warning output means d1 which outputs a warning message when the output result of the comparison means Cc1 varies exceeding a predetermined threshold value. Therefore, when the range of the margin is narrowed with the passage of time after drive shipment, the result which is obtained by previously estimating the utilization rate at which the range of the adjusted convergent lens position from its minimum value to its maximum value becomes not to be included in the range of the convergent lens position is compared with the currently estimated result, and data informing a failure of the drive is outputted to the device to which the drive is connected, whereby the user of the optical disc signal processing device can know the abnormal state of the optical disc processing device before the device breaks down.

Embodiment 5

Figure 45:
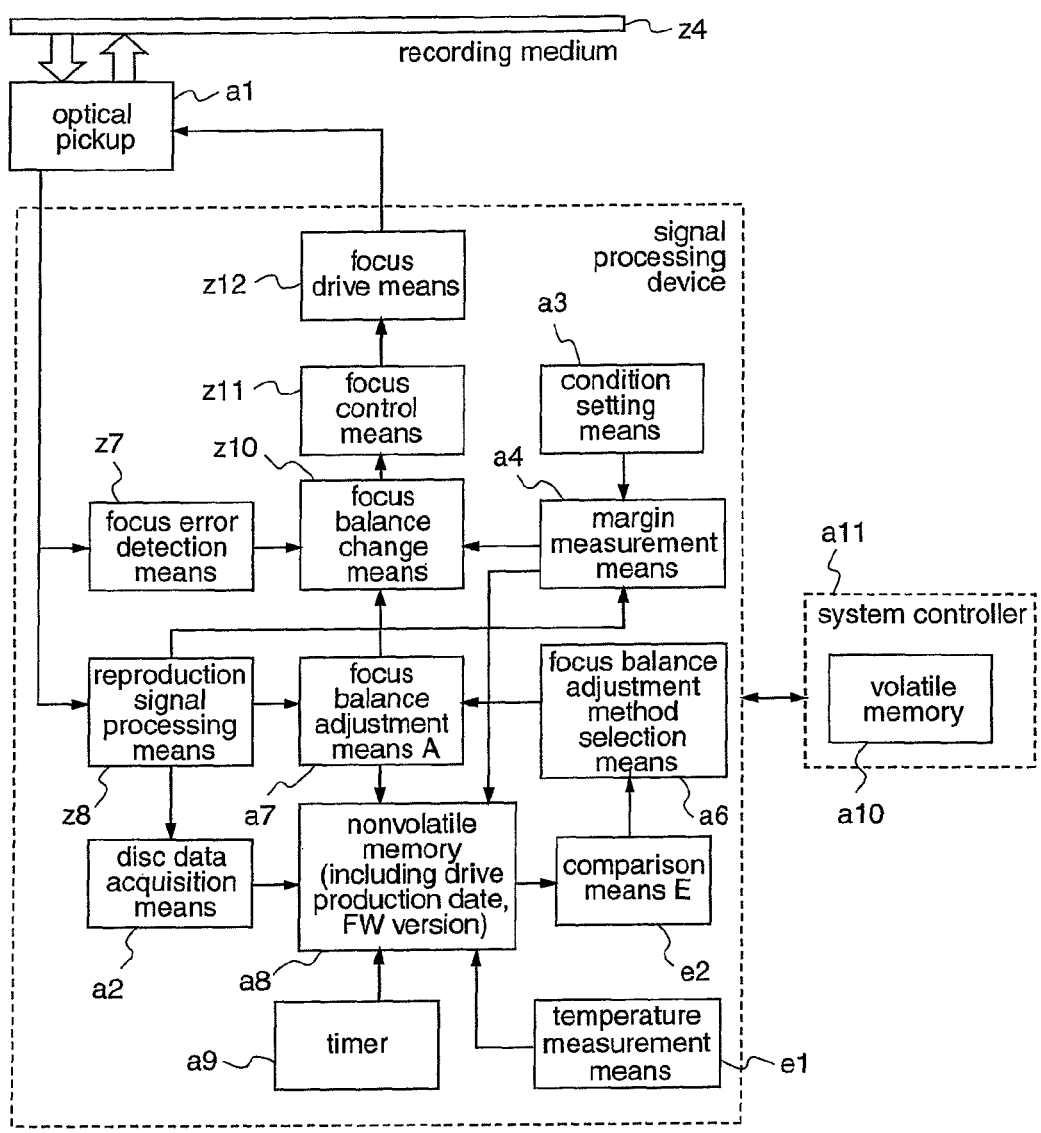
FIG. 45 is a system configuration diagram of an optical disc signal processing device according to a fifth embodiment of the present invention.

FIG. 45 is a system configuration diagram of an optical disc signal processing device according to a fifth embodiment of the present invention, which is obtained by adding a function of "correcting the margin measurement result by temperature" to the optical disc signal processing device of the first embodiment. The function of "correcting the margin measurement result by temperature" is a function that can be added to the already-described first to fourth embodiments. Since the function to be added is common for the first to fourth embodiments, only the case where the function of "correcting the margin measurement result by temperature" is added to the first embodiment will be described while the cases where the function is added to the second to fourth embodiments will be omitted. The margin varies with the temperature of the drive, and it becomes narrower when the temperature is higher and becomes wider when the temperature is lower. In this fifth embodiment, the margin measurement result is corrected according to the temperature.

The present invention includes a temperature measurement means e1 and a comparison means Ee2 in addition to the above-described focus error detection means z7, reproduction signal processing means z8, focus balance change means z10, focus control means z11, focus drive means z12, optical pickup a1, disc data acquisition means a2, condition setting means a3, margin measurement means a4, focus balance adjustment method selection means a6, focus balance adjustment means Aa7, nonvolatile memory a8, and timer a9, and further, it includes a system controller a11 having a volatile memory a10, which manages the above-described respective means with programs.

Next, the respective constituents will be described along the signal transmission path.

Since the focus error detection means z7, the reproduction signal processing means z8, the focus balance change means z10, the focus control means z11, the focus drive means z12, the optical pickup a1, the disc data acquisition means a2, the condition setting means a3, the margin measurement means a4, the focus balance adjustment method selection means a6, the focus balance adjustment means Aa7, the nonvolatile memory a8, and the timer a9 have already been described, repeated description is not necessary.

The temperature measurement means e1 has a sensor for measuring the temperature, and outputs a stationary temperature measurement result under the drive operating state to the nonvolatile memory a8. The temperature may be the temperature inside the drive, the outside air temperature, the temperature of the optical pickup a1, or the temperature of the signal processing device of the present invention, and the temperature to be measured is determined depending on the place where the temperature measurement means is installed. In the present invention, the same function can be achieved using any of the above-mentioned temperatures.

The comparison means Ee2 compares the range which is obtained by correcting the range (z19,z20) of the convergent lens position that is stored in the nonvolatile memory a8 by using the temperature measurement result stored in the nonvolatile memory a8, with the adjusted convergent lens position which is outputted from the focus balance adjustment means Aa7 and stored in the nonvolatile memory a8, and outputs the comparison result to the focus balance adjustment method selection means a6. The manner of obtaining the comparison result will be later described.

Next, the operation of the program stored in the system controller will be described.

Since the difference between the case of using the adjusted conversion lens position which is outputted from the focus balance adjustment means Aa7 and the case of not using the same is identical to that described above, only the case of using the adjusted conversion lens position outputted from the focus balance adjustment means Aa7 will be described.

FIG. 46 is a flowchart showing the operation procedure of the program of the optical disc signal processing device according to the fifth embodiment, wherein (a) shows the procedure at start-up or before start of recording, and (b) shows the procedure during margin measurement. The detailed steps in the flowchart will be described.

The following steps are carried out at start-up or before start of recording.

Since the disc data acquisition step sa1, the focus balance adjustment step Asa3, and the focus balance adjusted value storage step Asa4 have already been described, repeated description is not necessary.

Figure 46A:
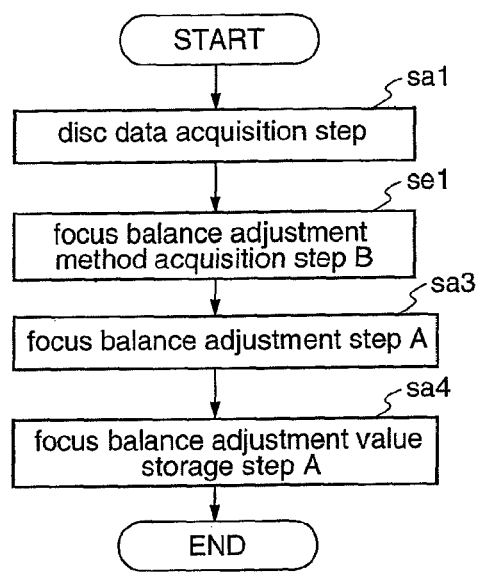
FIG. 46 is a flowchart illustrating the program operation of the optical disc signal processing device according to the fifth embodiment.

As shown in FIG. 46(a), after the disc data acquisition step sa1 is carried out, the comparison means Ee2 is operated in the focus balance adjustment method acquisition step Bse1 so as to compare the range which is obtained by correcting the range (z19,z20) of the convergent lens position that stored in the nonvolatile memory a8 by using the temperature measurement result stored in the nonvolatile memory a8, with the adjusted convergent lens position which is outputted from the focus balance adjustment means Aa7 and stored in the nonvolatile memory a8, and the comparison result is outputted to the focus balance adjustment method selection means a6. Thereafter, the focus balance adjustment step Asa3 and the focus balance adjusted value storage step Asa4 are performed to complete the procedure.

The system controller a11 continuously monitors the data outputted from the timer a9, and executes the following steps when the data is increased by a predetermined amount.

Since the disc data acquisition step sa1, the focus balance value acquisition step sa5, the access step sa6, and the focus balance value restoration step sa8 have already been described, repeated description is not necessary.

Figure 46B:
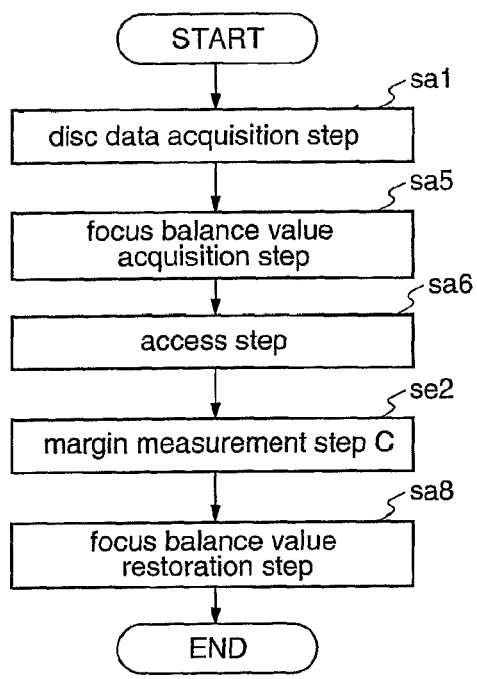

As shown in FIG. 46(b), after the disc data acquisition step sa1, the focus balance value acquisition step sa5, and the access step sa6 are performed, the margin measurement step Cse2 is performed, wherein the relation between the convergent lens position and the reproduction signal amplitude is obtained by the same procedure as performed by the margin measurement means a4, and the range (z19,z20) of the convergent lens position in which the reproduction signal amplitude required for accurately reproducing data from the recording medium z4 exceeds its minimum value z18, which signal amplitude is set by the condition setting means a3, and then the range (z19,z20) of the convergent lens position is stored in the nonvolatile memory a8. Further, the temperature measurement result outputted from the temperature measurement means e1 is stored in the nonvolatile memory. Thereafter, the focus balance value restoration step sa8 is performed to complete the processing.

Next, the drive operation and the data contents stored in the nonvolatile memory a8 will be described with reference to FIGS. 47 to 50.

Figure 47:
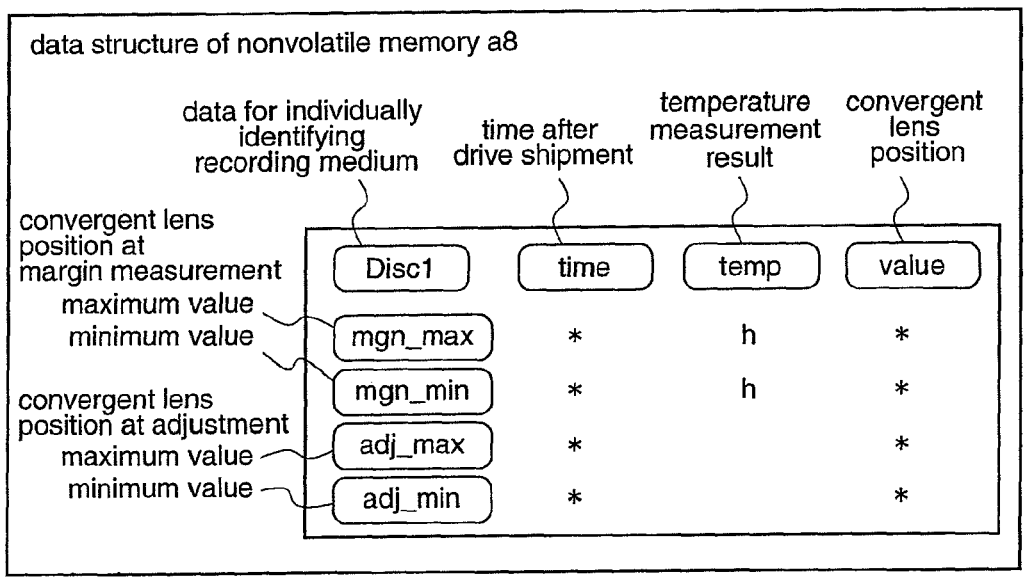
FIG. 47 shows the drive operation and the data structure (1) of the optical disc signal processing device according to the fifth embodiment.

FIG. 47 shows the data structure stored in the nonvolatile memory a8 of the optical disc signal processing device of the fifth embodiment. The temperature measurement result which is outputted from the temperature measurement means e1 at margin measurement is stored in "temp".

Figure 48:
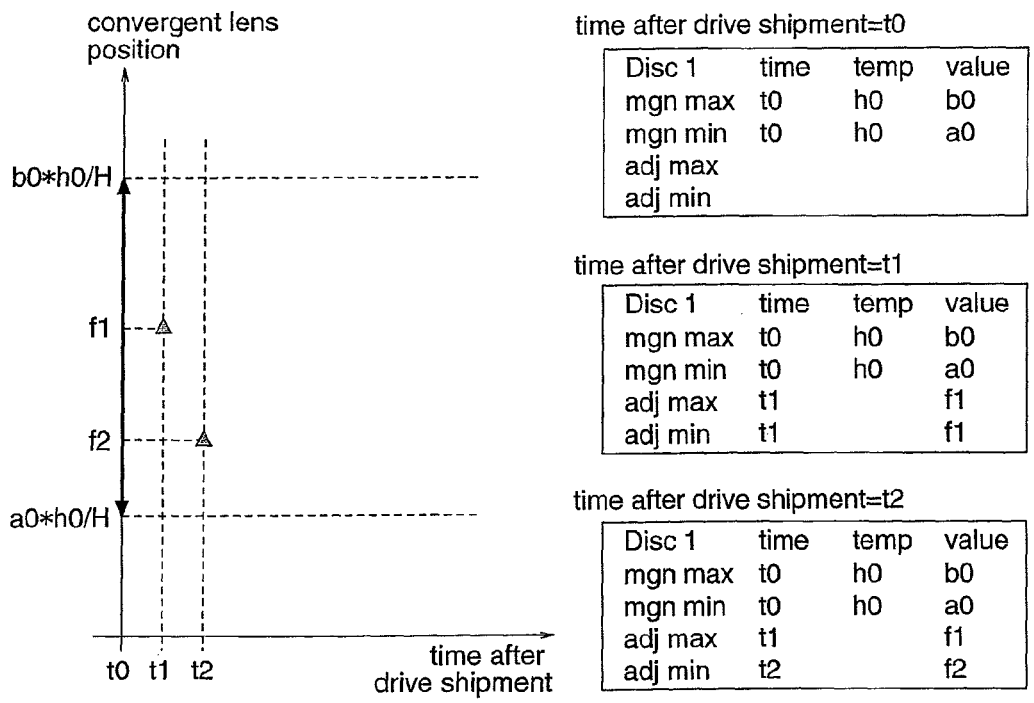
FIG. 48 shows the drive operation and the data structure (2) of the optical disc signal processing device according to the fifth embodiment.
Figure 49:
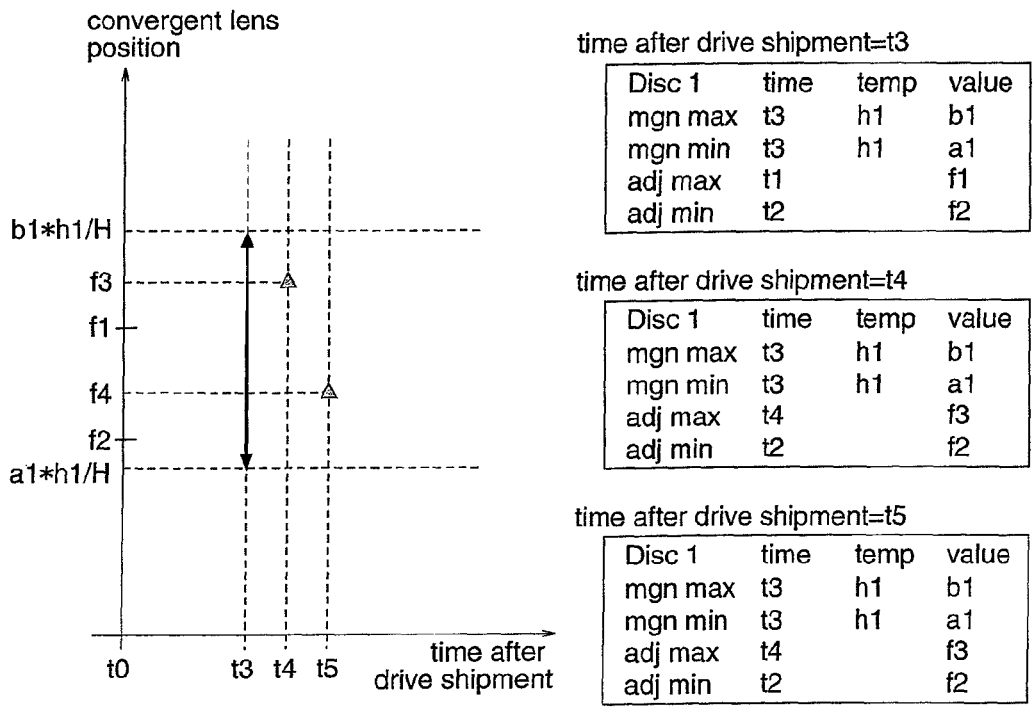
FIG. 49 shows the drive operation and the data structure (3) of the optical disc signal processing device according to the fifth embodiment.
Figure 50:
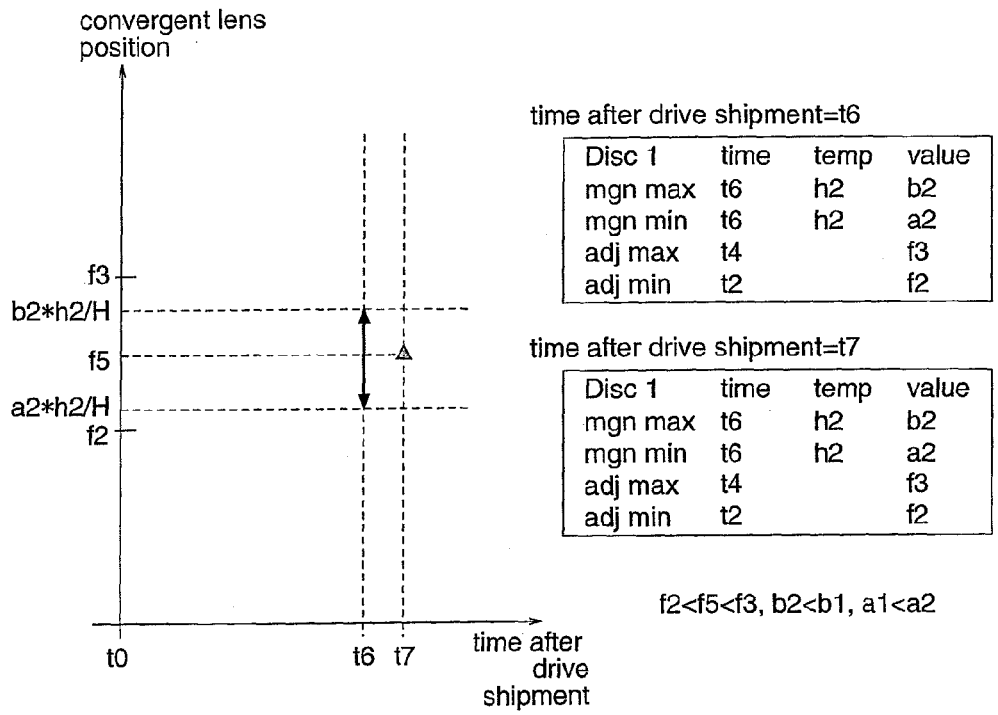
FIG. 50 shows the drive operation and the data structure (4) of the optical disc signal processing device according to the fifth embodiment.

FIGS. 48 to 50 show the drive operation and the data contents which are stored in the nonvolatile memory a8. The details of the conditional expressions used in FIGS. 48 to 50 will be described hereinafter. When using the data for individually identifying the recording medium z4, the processes of the conditional expressions A4, B3, C3, D, and E are performed only when the data for individually identifying the recording medium z4 which is stored in the volatile memory a10 matches the data for individually identifying the recording medium z4 which is stored in the nonvolatile memory a8. When the data for individually identifying the recording medium z4 is not used, the processes of the conditional expressions A4, B3, C3, D, and E are performed regardless of the data for individually identifying the recording medium z4 which is stored in the volatile memory a10 and the data for individually identifying the recording medium z4 which is stored in the nonvolatile memory a8.

[Conditional Expression A4]

(i) When mgn_max*h/H>adj_max and adj_min>mgn_min*h/H, or when no values are stored for all of mgn_max, mgn_min, adj_max, and adj_min, the adjustment method A is executed. That is, when the corrected value of the maximum value of the convergent lens position at margin measurement is larger than the maximum value of the convergent lens position at adjustment and the corrected value of the minimum value of the convergent lens position at margin measurement is smaller than the minimum value of the convergent lens position at adjustment, or when no values are stored for all of the maximum value and minimum value of the convergent lens position at margin measurement and the maximum value and minimum value of the convergent lens position at adjustment, the adjustment method A is executed. Note that H is a fixed value.

(ii) When mgn_max*h/H<adj_max or adj_min_mgn_min*h/H, the adjustment method B is executed.

[Conditional Expression B3]

(i) It is assumed that the maximum value of the convergent lens position after margin measurement is m_max, the temperature measurement result after margin measurement is ha, the maximum value of the convergent lens position stored in the nonvolatile memory is mgn_max, and the temperature measurement result stored in the nonvolatile memory is h.

When m_max*ha/H<mgn_max*h/H, or when no value is stored for mgn_max, the value of mgn_max is changed to m_max, and the value of h is changed to ha. That is, when the corrected value of the maximum value of the convergent lens position after margin measurement is smaller than the corrected value of the maximum value of the convergent lens position at margin measurement, or when no value is stored for the maximum value of the convergent lens position at margin measurement, the value of mgn_max is changed to m_max, and the value of h is changed to ha. Note that H is a fixed value.

(ii) When m_max*ha/H>mgn_max*h/H, nothing is executed.

[Conditional Expression C3]

(i) It is assumed that the minimum value of the convergent lens position after margin measurement is m_min, the temperature measurement result after margin measurement is ha, the minimum value of the convergent lens position stored in the nonvolatile memory is mgn_min, and the temperature measurement result stored in the nonvolatile memory is h.

When m_min*ha/H>mgn_min*h/H, or when no value is stored for mgn_min, the value of mgn_min is changed to m_min, and the value of h is changed to ha. That is, when the corrected value of the minimum value of the convergent lens position after margin measurement is smaller than the corrected value of the minimum value of the convergent lens position at margin measurement, or when no value is stored for the minimum value of the convergent lens position at margin measurement, the value of mgn_min is changed to m_min, and the value of h is changed to ha. Note that H is a fixed value.

(ii) When m_min*ha/H<mgn_min*h/H, nothing is executed.

Hereinafter, FIGS. 48 to 50 will be described.

In FIG. 48, when the time elapsed after drive shipment is t0, the margin is measured, and the measurement result is stored in the nonvolatile memory a8 according to the conditional expressions B3 and C3. That is, since no values are stored for mgn_max and mgn_min, b0 is stored for mgn_max and a0 is stored for mgn_min according to the conditional expressions B3(i) and C3(i). Further, the temperature (h0) at margin measurement is stored. Accordingly, in the nonvolatile memory a8, mgn_max has time t0, temperature h0, and value b0, and mgn_min has time t0, temperature h0, and value a0.

Next, when the time elapsed after drive shipment is t1, the contents of the nonvolatile memory a8 are obtained, and an adjustment method is selected according to the conditional expression A4. Since no values are stored for adj_max and adj_min, the conditional expression A4(i) is satisfied, and thereby the adjustment method A is executed. Since no values are stored for adj_max and adj_min, f1 is stored for adj_max and f1 is stored for adj_min according to the conditional expressions D(i) and E(i). Accordingly, in the nonvolatile memory a8, mgn_max has time t0, temperature h0, and value b0, mgn_min has time t0, temperature h0, and value a0, adj_max has time t1 and value f1, and adj_min has time t1 and value f1.

When the time elapsed after drive shipment is t2, the contents of the nonvolatile memory a8 are obtained, and an adjustment method is selected according to the conditional expression A. Since b0*H0/H>f1 and f2>a0*H0/H, the conditional expression A4(i) is satisfied, and thereby the adjustment method A is executed. Since f2<f1, adj_max remains at f1 and adj_min is changed from f1 to f2 according to the conditional expressions D(ii) and E(i). Accordingly, in the nonvolatile memory a8, mgn_max has time t0, temperature h0, value b0, mgn_min has time t0, temperature h0, and value a0, adj_max has time t1 and value f1, and adj_min has time t2 and value f2.

In FIG. 49, when the time elapsed after drive shipment is t3, the margin is measured, and the measurement result is stored in the nonvolatile memory a8 according to the conditional expressions B3 and C3. That is, since $b1*H1/H<b0*H0/H$ and $a1*H1/H<a0*H0/H$, b1 is stored for mgn_max and a1 is stored for mgn_min according to the conditional expressions B3(i) and C3(i). Further, the temperature (h1) at margin measurement is stored. Accordingly, in the nonvolatile memory a8, mgn_max has time t3, temperature h1, value b1, mgn_min has time t3, temperature h1, and value a1, adj_max has time t1 and value f1, and adj_min has time t2 and value f2.

Next, when the time elapsed after drive shipment is t4, the contents of the nonvolatile memory a8 are obtained, and an adjustment method is selected according to the conditional expression A4. Since $b1*H1/H>f1$ and $f2>a1*H1/H$, the conditional expression A4(i) is satisfied, and thereby the adjustment method A is executed. Further, since f3>f1 and f3>f2, adj_max is changed from f1 to f3 and adj_min remains at f1 according to the conditional expressions D(i) and E(ii). Accordingly, in the nonvolatile memory a8, mgn_max has time t3, temperature h1, value b1, mgn_min has time t3, temperature h1, and value a1, adj_max has time t4 and value f3, and adj_min has time t2 and value f2.

When the time elapsed after drive shipment is t5, the contents of the nonvolatile memory a8 are obtained, and an adjustment method is selected according to the conditional expression A4. Since $b1*H1/H>f3$ and $f2>a1*H1/H$, the conditional expression A4(i) is satisfied, and thereby the adjustment method A is executed. Further, since f3>f2, adj_max remains at f3 and adj_min remains at f2 according to the conditional expressions D(ii) and E(ii). Accordingly, in the nonvolatile memory a8, mgn_max has time t3, temperature h1, and value b1, mgn_min has time t3, temperature h1, and value a1, adj_max has time t4 and value f3, and adj_min has time t2 and value f2.

In FIG. 50, when the time elapsed after drive shipment is t6, the margin is measured, and the measurement result is stored in the nonvolatile memory a8 according to the conditional expressions B3 and C3. That is, since $b2*H2/H<b1*H1/H$ and $a2*H2/H<a1*H1/H$, mgn_max is changed from b1 to b2 and mgn_min is changed from a1 to b1 according to the conditional expressions B3(i) and C3(i). Further, the temperature (h2) at margin measurement is stored. Accordingly, in the nonvolatile memory a8, mgn_max has time t6, temperature h2, and value b2, mgn_min has time t6, temperature h2, and value a2, adj_max has time t4 and value f3, and adj_min has time t2 and value f2.

Next, when the time elapsed after drive shipment is t7, the contents of the nonvolatile memory a8 are obtained, and an adjustment method is selected according to the conditional expression A4. Since $b2*H2/H<f3$ and $f2<a2*H2/H$, the conditional expression A4(ii) is satisfied, and thereby the adjustment method B is executed. Further, since f5<f3 and f5>f2, adj_max remains at f3 and adj_min remains at f2 according to the conditional expressions D(ii) and E(ii). Accordingly, in the nonvolatile memory a8, mgn_max has time t6, temperature h2, and value b2, mgn_min has time t6, temperature h2, and value a1, adj_max has time t4 and value f3, and adj_min has time t2 and value f2.

Figure 51:
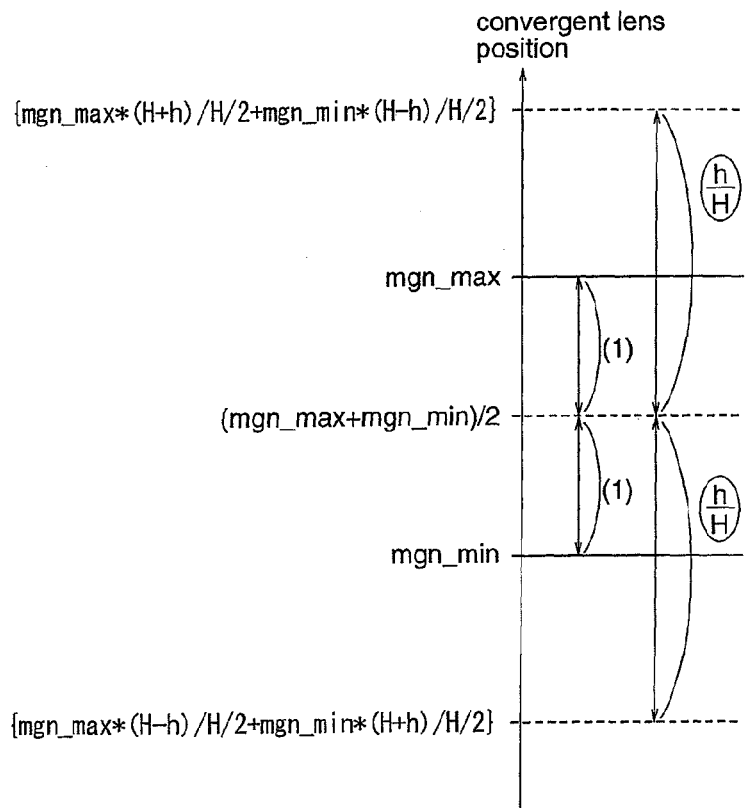
FIG. 51 shows the relation between the convergent lens position and the calculation formulae used for conditional expression A5/conditional expression B4/conditional expression C4.

The same function can be realized by performing the process of the conditional expression A5 instead of the conditional expression A4, the process of conditional expression B4 instead of the conditional expression B3, or the process of the conditional expression C4 instead of the conditional expression C3. FIG. 51 illustrates the relation between the convergent lens position and the calculating formulae used in the conditional expressions A5, B4, and C4. Using the conditional expressions A5, B4, and C4 enable more accurate margin correction. In the conditional expressions A4, B3, and C3, the maximum or minimum value of the margin is multiplied by h/H to perform margin correction. However, when using the conditional expressions A5, B4, and C4 as shown in FIG. 51, a difference between the maximum or minimum value of the margin and an intermediate value of the maximum value and the minimum value is multiplied by h/H to perform margin correction.

[Conditional Expression A5]
(i) When $\{mgn\_max*(H+h)/H/2+mgn\_min*(H-h)/H/2\}>adj\_max$ and $adj\_min>\{mgn\_max*(H-h)/H/2+mgn\_min*(H+h)/H/2\}$ or when no values are stored for all of mgn_max, mgn_min, adj_max, and adj_min, the adjustment method A is executed. Note that H is a fixed value.
(ii) When $\{mgn\_max*(H+h)/H/2+mgn\_min*(H-h)/H/2\}<adj\_max$ or $adj\_min<\{mgn\_max*(H-h)/H/2+mgn\_min*(H+h)/H/2\}$, the adjustment method B is executed.

[Conditional Expression B4]
(i) It is assumed that the maximum value of the convergent lens position after margin measurement is m_max, the minimum value of the convergent lens position after margin measurement is m_min, the temperature measurement result after margin measurement is ha, the maximum value of the convergent lens position stored in the nonvolatile memory is mgn_max, the minimum value of the convergent lens position stored in the nonvolatile memory is mgn_min, and the temperature measurement result stored in the nonvolatile memory is h.
When $\{m\_max*(H+ha)/H/2+m\_min*(H-ha)/H/2\}<\{mgn\_max*(H+h)/H/2+mgn\_min*(H-h)/H/2\}$ or when no value is stored for mgn_max, the value of mgn_max is changed to m_max, and the value of h is changed to ha. Note that H is a fixed value.
(ii) When $\{m\_max*(H+ha)/H/2+m\_min*(H-ha)/H/2\}>\{mgn\_max*(H+h)/H/2+mgn\_min*(H-h)/H/2\}$, nothing is executed.

[Conditional Expression C4]
(i) It is assumed that the maximum value of the convergent lens position after margin measurement is m_max, the minimum value of the convergent lens position after margin measurement is m_min, the temperature measurement result after margin measurement is ha, the maximum value of the convergent lens position stored in the nonvolatile memory is mgn_max, the minimum value of the convergent lens position stored in the nonvolatile memory is mgn_min, and the temperature measurement result stored in the nonvolatile memory is h.
When $\{m\_max*(H+ha)/H/2+m\_min*(H-ha)/H/2\}>\{mgn\_max*(H-h)/H/2+mgn\_min*(H+h)/H/2\}$ or when no value is stored for mgn_min, the value of mgn_min is changed to m_min, and the value of h is changed to ha. Note that H is a fixed value.
(ii) When $\{m\_max*(H-ha)/H/2+m\_min*(H+ha)/H/2\}<\{mgn\_max*(H-h)/H/2+mgn\_min*(H+h)/H/2\}$, nothing is done.

While in this fifth embodiment the focus error detection means z7, the focus control means z11, and the focus driving means z12 are used, the tracking balance change means may be provided instead of the focus error detection means z7, the tracking control means may be provided instead of the focus control means z11, and the tracking driving means may be provided instead of the focus driving means z12.

Further, the tilt error detection means may be provided instead of the focus error detection means z7, the tilt change means may be provided instead of the focus balance change means z10, the tilt control means may be provided instead of the focus control means z11, and the tilt drive means may be provided instead of the focus drive means z12.

Further, the reproduction jitter processing means may be provided instead of the reproduction signal processing means z8.

Further, when the movement amount of the convergent lens z3 for reducing the tracking error is not outputted from the tracking control means to the tracking drive means, the tracking error detection means may be used instead of the reproduction signal processing means z8.

Further, when the movement amount of the convergent lens z3 for reducing the tracking error is outputted from the tracking control means to the tracking drive means, the wobble signal processing means may be used instead of the reproduction signal processing means z8.

Further, the wobble jitter processing means may be provided instead of the reproduction signal processing means z8.

As described above, according to the fifth embodiment, the temperature measurement means e1 for measuring the temperature of the optical disc signal processing device is provided, and the nonvolatile memory a8 stores the range of the convergent lens position from its minimum value to its maximum value, which is obtained by the margin measurement means a4, together with the utilization rate outputted from the timer a9 and the temperature measured by the temperature measurement means e1, and the comparison means e2 corrects the range of the convergent lens position from its minimum value to its maximum value, which is obtained by the margin measurement means a4 and stored in the nonvolatile memory a8, according to the temperature stored in the nonvolatile memory a8, and compares the corrected range of the convergent lens position with the convergent lens position adjusted by the focus balance adjustment means Aa7. Therefore, even when the temperature at margin measurement varies, the margin measurement result is corrected by the temperature measurement result, and an optimum adjustment method for the physical position or angle of the optical pickup is automatically selected for each optical disc signal processing device such that an adjustment method having a large variation in the lens position after adjusted and a short adjustment time is used when the margin is large, whereby the start-up time and the recording start time can be reduced, and thus the user's convenience can be enhanced. Further, even in the case where inexpensive elements having large variations in aging deterioration are used, the margin measurement result is corrected according to the temperature, and an adjustment method having a less variation in the convergent lens position after adjusted and a long adjustment time is used when the elements of the drive are deteriorated and the margin is narrowed, whereby the reproduction and recording qualities of the optical disc device after shipment can be maintained.

Embodiment 6

Figure 52:
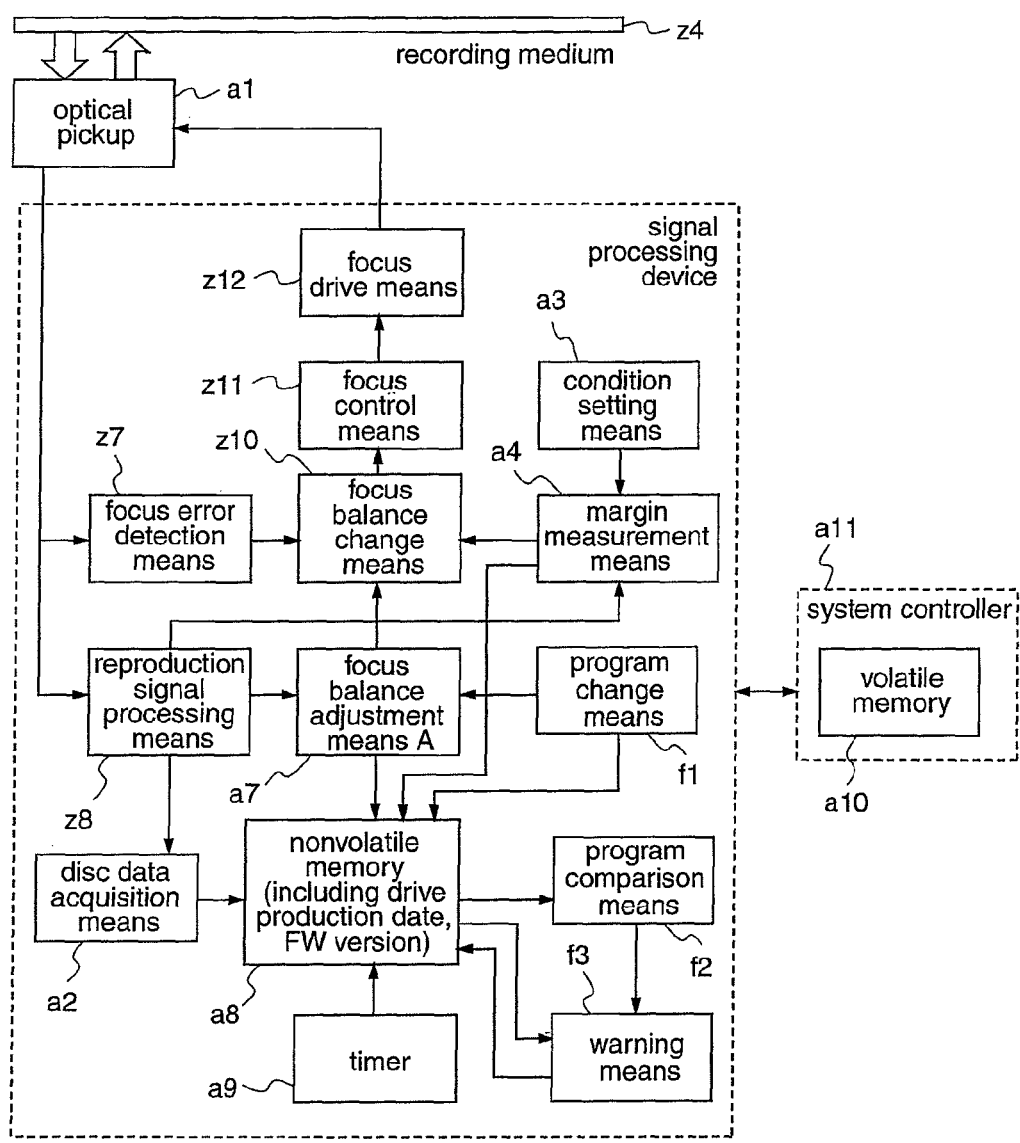
FIG. 52 is a system configuration diagram of an optical disc signal processing device according to a sixth embodiment of the present invention.

FIG. 52 is a system configuration diagram of an optical disc signal processing device according to a sixth embodiment of the present invention. The present invention includes a program change means f1, a program comparison means f2, and a warning means f3 in addition to the above-described focus error detection means z7, reproduction signal processing means z8, focus balance change means z10, focus control means z11, focus drive means z12, optical pickup a1, disc data acquisition means a2, condition setting means a3, margin measurement means a4, focus balance adjustment means Aa7, nonvolatile memory a8, and timer a9, and further, it includes a system controller a11 having a volatile memory a10, which manages the above-described respective means with programs.

Next, the respective constituents will be described along the signal transmission path.

Since the focus error detection means z7, the reproduction signal processing means z8, the focus balance change means z10, the focus control means z11, the focus drive means z12, the optical pickup a1, the disc data acquisition means a2, the condition setting means a3, the margin measurement means a4, the focus balance adjustment means Aa7, the nonvolatile memory a8, and the timer a9 have already been described, repeated description is not necessary.

The program change means f1 changes the program for managing the respective means described above, and stores the identification information of the program after changed in the nonvolatile memory a8.

The program comparison means f2 compares the identification information of the program used for the previous margin measurement which is stored in the nonvolatile memory a8 with the identification information of the program after changed which is stored in the nonvolatile memory a8 by the program change means f1, and outputs the comparison result to the warning means f3.

The warning means f3 compares the previous margin measurement result which is stored in the nonvolatile memory a8 with the margin measurement result which is stored in the volatile memory a10 only when the two program information are different from each other according to the output from the program comparison means f2, and when the margin measurement result stored in the volatile memory a10 is more degraded than the margin measurement result stored in the nonvolatile memory a8, the warning means f3 outputs a warning message to the device to which the drive is connected through the cable (e.g., ATAPI cable) connecting the drive and the device. The comparison method will be described later.

Next, the operation of the program stored in the system controller will be described.

FIG. 53 is a flowchart showing the operation procedure of the program of the optical disc signal processing device according to the sixth embodiment, wherein (a) shows the procedure during margin measurement, and (b) shows the procedure during program change. The detailed steps in the flowchart will be described.

The system controller a11 continuously monitors the data outputted from the timer a9, and executes the following steps when the data is increased by a predetermined value.

Since the disc data acquisition step sa1, the focus balance value acquisition step sa5, the access step sa6, the margin measurement step Asa7, and the focus balance value restoration step sa8 have already been described, repeated description is not necessary.

Figure 53A:
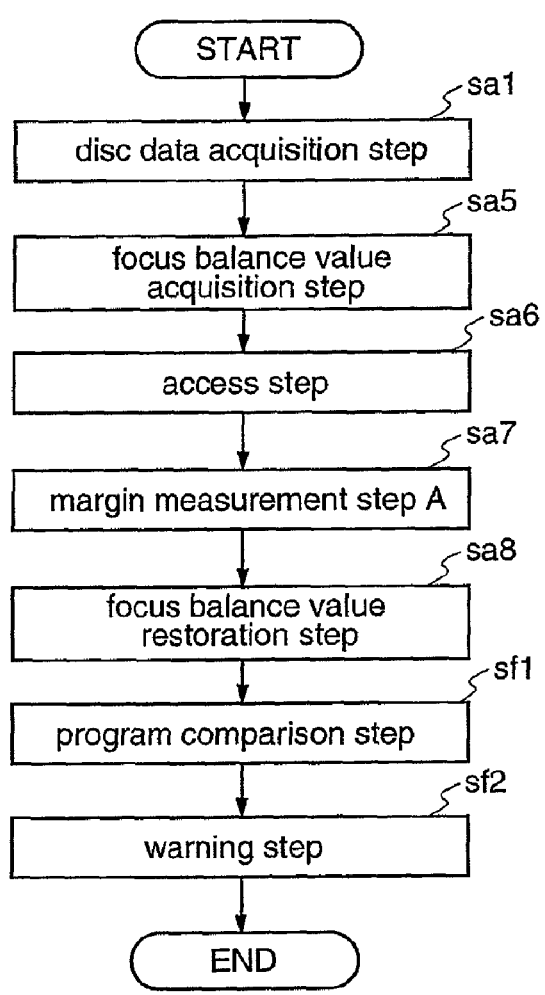
FIG. 53 is a flowchart illustrating the program operation of the optical disc signal processing device according to the sixth embodiment.

As shown in FIG. 53(a), after the disc data acquisition step sa1, the focus balance value acquisition step sa5, the access step sa6, the margin measurement step Asa7, and the focus balance value restoration step sa8 are performed, the program comparison step sf1 is performed to compare the identification information of the program used for the previous margin measurement which is stored in the nonvolatile memory a8, with the identification information of the program which is stored by the program change means f1.

In the warning step sf2, only when the two program information compared in the program comparison step sf1 are different from each other, the previous margin measurement result which is stored in the nonvolatile memory a8 is compared with the margin measurement result which is stored in the volatile memory a10, and when the margin measurement result stored in the volatile memory a10 is more degraded than the margin measurement result stored in the nonvolatile memory a8, a warning message is outputted to the device to which the drive is connected through the cable (e.g., ATAPI cable) connecting the drive and the device.

When changing the program using the program change means, the following steps are executed.

Figure 53B:
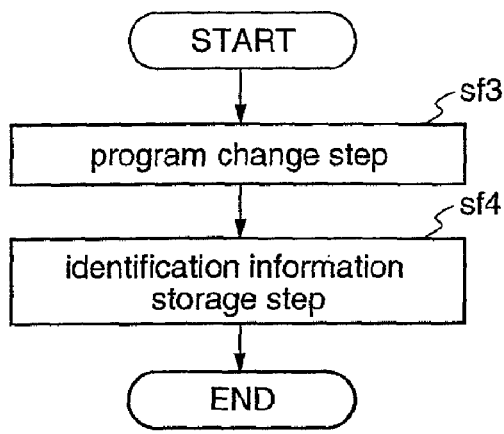

As shown in FIG. 53(b), the program is changed in the program change step sf3.

In the identification information storage step sf4, the identification information of the program after changed is stored in the nonvolatile memory a8.

Next, the data contents which are stored in the nonvolatile memory a8 when the present invention is executed will be described with reference to FIG. 54.

Figure 54:
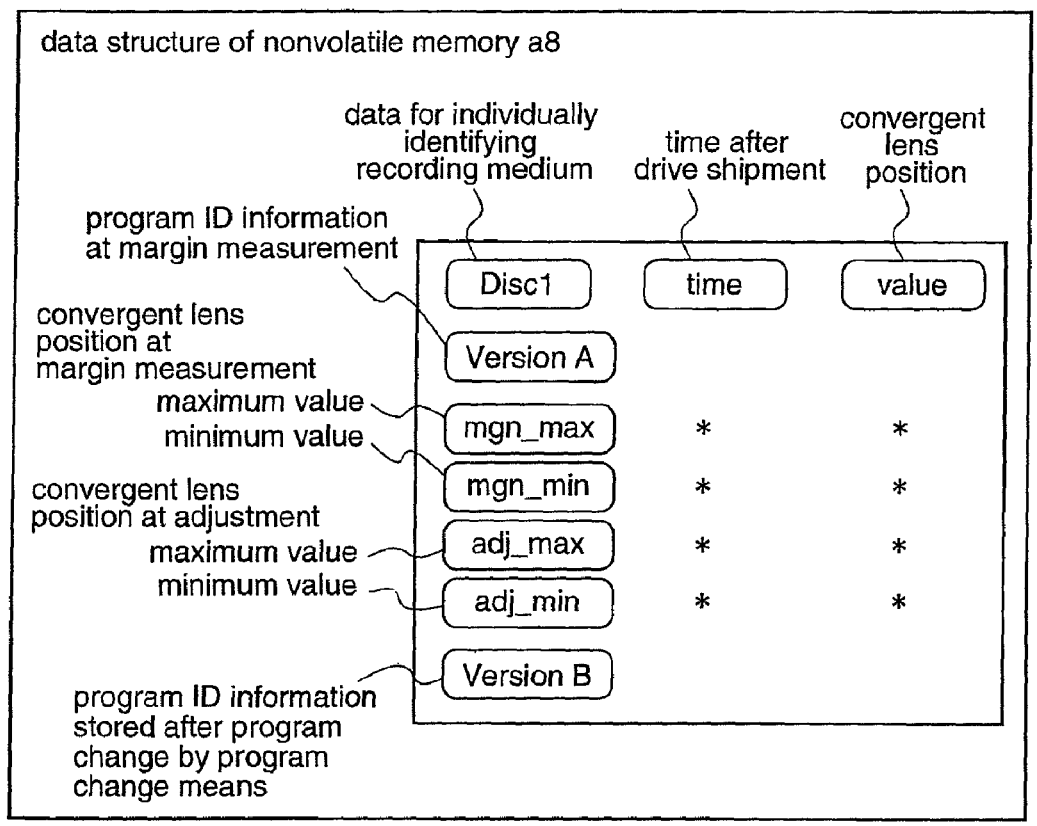
FIG. 54 shows the data structure of the optical disc signal processing device according to the sixth embodiment.

FIG. 54 shows the data structure stored in the nonvolatile memory a8 of the optical disc signal processing device of the sixth embodiment. The program identification information at margin measurement is written over "Version A" every time the margin is measured. The program identification information is written over "Version B" after the program change means changes the program. Since other data structures have the same contents as those described with respect to FIG. 14, repeated description is not necessary.

Next, a description will be given of the conditional expressions which are used when the previous margin measurement result stored in the nonvolatile memory a8 is compared with the margin measurement result stored in the volatile memory a10 in the warning step sf2.

[Conditional Expression I]
(i) Assuming that the convergent lens position maximum value and convergent lens position minimum value at margin measurement which are stored in the volatile memory a10 are m_max and m_min, respectively, and the convergent lens position maximum value and convergent lens position minimum value at previous margin measurement which are stored in the nonvolatile memory a8 are mgn_max and mgn_min, respectively, if (m_max−m_min) <{mgn_max−mgn_min)+H (H: fixed value)}, a warning message is outputted to the device to which the drive is connected. That is, when the measurement result of the margin which is measured by the current program is smaller than the previous margin measurement result, the margin is narrowed after the program change, and therefore, a warning message is outputted to the device to which the drive is connected.
(ii) When (m_max−m_min)>{mgn_max−mgn_min)+H (H: fixed value)}, nothing is executed.

While in this sixth embodiment the focus error detection means z7, the focus control means z11, and the focus driving means z12 are used, the tracking balance change means may be provided instead of the focus error detection means z7, the tracking control means may be provided instead of the focus control means z11, and the tracking driving means may be provided instead of the focus driving means z12.

Further, the tilt error detection means may be provided instead of the focus error detection means z7, the tilt change means may be provided instead of the focus balance change means z10, the tilt control means may be provided instead of the focus control means z11, and the tilt drive means may be provided instead of the focus drive means z12.

Further, the reproduction jitter processing means may be provided instead of the reproduction signal processing means z8.

Further, when the movement amount of the convergent lens z3 for reducing the tracking error is not outputted from the tracking control means to the tracking drive means, the tracking error detection means may be used instead of the reproduction signal processing means z8.

Further, when the movement amount of the convergent lens z3 for reducing the tracking error is outputted from the tracking control means to the tracking drive means, the wobble signal processing means may be used instead of the reproduction signal processing means z8.

Further, the wobble jitter processing means may be provided instead of the reproduction signal processing means z8.

Furthermore, in the first to sixth embodiments, there may be provided a drive software identification information acquisition means for acquiring the identification information of the drive software which controls the optical disc signal processing device when the version of the drive software is upgraded, and the range of the convergent lens position from its minimum value to its maximum value, which is obtained by the margin measurement means a4, is stored in the nonvolatile memory a8 together with the utilization rate outputted from the timer a9 and the program identification information outputted from the drive software identification information acquisition means so as to perform the processing for each drive software identification information stored in the nonvolatile memory a8.

Further, in the first to sixth embodiment, there may be provided a power supply identification information acquisition means for acquiring the information for identifying the type of the power supply used by the optical disc signal processing device, and the range of the convergent lens position from its minimum value to its maximum value, which is obtained by the margin measurement means a4, is stored in the nonvolatile memory a8 together with the utilization rate outputted from the timer a9 and the power supply identification information outputted from the power supply identification information acquisition means so as to perform the processing for each power supply identification information stored in the nonvolatile memory a8.

Furthermore, an optical disc reproduction/recording device of the present invention is obtained by providing the optical disc signal processing device described in any of the first to sixth embodiments with an optical pickup and a rotation means for rotating the recording medium.

As described above, according to the sixth embodiment, the optical disc signal processing device comprises the focus balance adjustment means Aa7 which adjusts the convergent lens position by the focus balance change means z10 on the basis of the output from the reproduction signal processing means z8, the margin measurement means a4 which obtains a range of the control target value from its minimum value to its maximum value, within which the optical disc signal processing device can perform normal operation, the condition setting means a3 which sets a threshold value of the reproduction signal when measuring the margin, the timer a9 which measures the utilization rate of the optical disc signal processing device, the nonvolatile memory a8 which stores the range of the convergent lens position from its minimum value to its maximum value, which is obtained by the margin measurement means a4, together with the utilization rate outputted from the timer a9, the program change means f1 which changes the program for managing the respective means, the program comparison means f2 which compares the identification information of the program at previous margin measurement which is stored in the nonvolatile memory a8 with the identification information of the changed program, and the warning means f3 which compares the range of the control target value within which the optical disc signal processing device can perform normal operation, which range is obtained after the program has been changed by the program change means f1, with the range of the control target value which is stored in the nonvolatile memory a8 on the basis of the output of the program comparison means f2, and outputs a warning message when the range of the control target value which is obtained after the program becomes smaller than the threshold value as compared with the range of the control target value which is stored in the nonvolatile memory a8. Therefore, when the margin measurement result of the current program is smaller than the previous margin measurement result, the margin is narrowed after the program change, and thereby the user of the optical disc signal processing device is informed by the warning message that the program after changed might deteriorate the reproduction and recording qualities of the recording medium as compared with the program before changed, and thus the user who emphasizes the reproduction and recording qualities can avoid using of the program which might deteriorate the reproduction and recording qualities.

APPLICABILITY IN INDUSTRY

The present invention is useful for such as a device which records/reproduces data on an optical disc.

The invention claimed is:

1. An optical disc signal processing device comprising:
a drive means which changes the physical position or angle of an optical pickup;
an error detection means which detects the physical positional relation between the optical pickup and a recording medium from an electric signal generated by the optical pickup;
a control target value change means which changes a control target value in the optical disc signal processing device;
a control means which controls the drive means according to the outputs from the error detection means and the control target value change means;
an adjustment reference signal generation means which generates an adjustment reference signal for adjusting the control target value;
a control target value adjustment means which adjusts the control target value changed by the control target value change means, on the basis of the output from the adjustment reference signal generation means;
a margin measurement means which obtains a range of the control target value from its minimum value to its maximum value, said control target value being changed by the control target value change means, within which range the optical disc signal processing device can perform normal operation;
a condition setting means which sets a threshold value of the adjustment reference signal when measuring the range using the margin measurement means;
a utilization rate measurement means which measures the utilization rate of the optical disc signal processing device;
a nonvolatile memory which stores the range of the control target value from its minimum value to its maximum value, which is obtained by the margin measurement means, together with the utilization rate outputted from the utilization rate measurement means;
a comparison means which compares the range of the control target value from its minimum value to its maximum value, which is stored in the nonvolatile memory, with the control target value which is adjusted by the control target value adjustment means; and
an adjustment method switching means which changes the change amount of the control target value to be changed by the control target value change means, on the basis of the number of measurements for the adjustment reference signal that is used for adjusting the control target value by the control target value adjustment means or the output from the control target value adjustment means, and switches the control target value adjustment method according to the output from the comparison means;
wherein the adjustment method of the control target value adjustment means, or the number of measurements for the adjustment reference signal, or the change amount of the control target value is optimized so that the control target value to be adjusted by the control target value adjustment means is included in the range of the control target value from its minimum value to its maximum value, which range is obtained by the margin measurement means and stored in the nonvolatile memory.

2. An optical disc signal processing device comprising:
a drive means which changes the physical position or angle of an optical pickup;
an error detection means which detects the physical positional relation between the optical pickup and a recording medium from an electric signal generated by the optical pickup;
a control target value change means which changes a control target value in the optical disc signal processing device;
a control means which controls the drive means according to the outputs from the error detection means and the control target value change means;
an adjustment reference signal generation means which generates an adjustment reference signal for adjusting the control target value;
a control target value adjustment means which adjusts the control target value changed by the control target value change means, on the basis of the output from the adjustment reference signal generation means;
a margin measurement means which obtains a range of the control target value from its minimum value to its maximum value, said control target value being changed by the control target value change means, within which range the optical disc signal processing device can perform normal operation;
a condition setting means which sets a threshold value of the adjustment reference signal when measuring the range using the margin measurement means;
a utilization rate measurement means which measures the utilization rate of the optical disc signal processing device;
a nonvolatile memory which stores the range of the control target value from its minimum value to its maximum value, which is obtained by the margin measurement means, together with the utilization rate outputted from the utilization rate measurement means;
a comparison means which compares the range of the control target value from its minimum value to its maximum value, which is stored in the nonvolatile memory, with the control target value which is adjusted by the control target value adjustment means;

a number-of-rotations selection means which selects the number of rotations of the recording medium on the basis of the output from the comparison means;

a number-of-rotations acquisition means which obtains the number of rotations of the recording medium; and a rotation control means which outputs a drive signal for rotating the recording medium with the target number of rotations according to the outputs from the number-of-rotations selection means and the number-of-rotations acquisition means;

wherein the range of the control target value from its minimum value to its maximum value, which is obtained by the margin measurement means, is stored in the nonvolatile memory together with the utilization rate which is outputted from the utilization rate measurement means and the number of rotations of the recording medium which is outputted from the number-of-rotations acquisition means, and the number-of-rotations of the recording medium is optimized by the number-of-rotations selection means so that the control target value adjusted by the control target value adjustment means is included in the range of the control target value from its minimum value to its maximum value, which range is obtained by the margin measurement means and stored in the nonvolatile memory.

3. An optical disc signal processing device comprising:

a drive means which changes the physical position or angle of an optical pickup;

an error detection means which detects the physical positional relation between the optical pickup and a recording medium from an electric signal generated by the optical pickup;

a control target value change means which changes a control target value in the optical disc signal processing device;

a control means which controls the drive means according to the outputs from the error detection means and the control target value change means;

an adjustment reference signal generation means which generates an adjustment reference signal for adjusting the control target value;

a control target value adjustment means which adjusts the control target value changed by the control target value change means, on the basis of the output from the adjustment reference signal generation means;

a margin measurement means which obtains a range of the control target value from its minimum value to its maximum value, said control target value being changed by the control target value change means, within which range the optical disc signal processing device can perform normal operation;

a condition setting means which sets a threshold value of the adjustment reference signal when measuring the range using the margin measurement means;

a utilization rate measurement means which measures the utilization rate of the optical disc signal processing device;

a nonvolatile memory which stores the range of the control target value from its minimum value to its maximum value, which is obtained by the margin measurement means, together with the utilization rate outputted from the utilization rate measurement means; and a maximum utilization rate estimation means which estimates a utilization rate with which the range of the control target value from its minimum value to its maximum value becomes equal to or lower than a threshold value, from the utilization rate of the optical disc signal processing device which is stored in the nonvolatile memory and the range of the control target value from its minimum value to its maximum value which is obtained by the margin measurement means.

4. An optical disc signal processing device comprising:

a drive means which changes the physical position or angle of an optical pickup;

an error detection means which detects the physical positional relation between the optical pickup and a recording medium from an electric signal generated by the optical pickup;

a control target value change means which changes a control target value in the optical disc signal processing device;

a control means which controls the drive means according to the outputs from the error detection means and the control target value change means;

an adjustment reference signal generation means which generates an adjustment reference signal for adjusting the control target value;

a control target value adjustment means which adjusts the control target value changed by the control target value change means, on the basis of the output from the adjustment reference signal generation means;

a margin measurement means which obtains a range of the control target value from its minimum value to its maximum value, said control target value being changed by the control target value change means, within which range the optical disc signal processing device can perform normal operation;

a condition setting means which sets a threshold value of the adjustment reference signal when measuring the range using the margin measurement means;

a utilization rate measurement means which measures the utilization rate of the optical disc signal processing device;

a nonvolatile memory which stores the range of the control target value from its minimum value to its maximum value, which is obtained by the margin measurement means, together with the utilization rate outputted from the utilization rate measurement means;

a maximum utilization rate estimation means which estimates the utilization rate with which the range of the control target value from its minimum value to its maximum value becomes equal to or lower than a threshold value, from the utilization rate of the optical disc signal processing device which is stored in the nonvolatile memory and the range of the control target value from its minimum value to its maximum value which is obtained by the margin measurement means; and a warning output means which outputs a warning message when the output result of the maximum utilization rate estimation means varies exceeding the predetermined threshold value.

5. An optical disc signal processing device comprising:

a drive means which changes the physical position or angle of an optical pickup;

an error detection means which detects the physical positional relation between the optical pickup and a recording medium from an electric signal generated by the optical pickup;

a control target value change means which changes a control target value in the optical disc signal processing device;

a control means which controls the drive means according to the outputs from the error detection means and the control target value change means;

an adjustment reference signal generation means which generates an adjustment reference signal for adjusting the control target value;

a control target value adjustment means which adjusts the control target value changed by the control target value change means, on the basis of the output from the adjustment reference signal generation means;

a margin measurement means which obtains a range of the control target value from its minimum value to its maximum value, said control target value being changed by the control target value change means, within which range the optical disc signal processing device can perform normal operation;

a condition setting means which sets a threshold value of the adjustment reference signal when measuring the range using the margin measurement means;

a utilization rate measurement means which measures the utilization rate of the optical disc signal processing device;

a nonvolatile memory which stores the range of the control target value from its minimum value to its maximum value, which is obtained by the margin measurement means, together with the utilization rate outputted from the utilization rate measurement means;

a program change means which changes a program for managing the respective means;

a program comparison means which compares the identification information of the program for the previous margin measurement which is stored in the nonvolatile memory with the identification information of the changed program; and a warning output means which compares, based on the output from the program comparison means, the range of the control target value from its minimum value to its maximum value, with which the optical disc signal processing device can perform normal operation, which range is obtained after the program has been changed by the program change means, with the range of the control target value from its minimum value to its maximum value, which is stored in the nonvolatile memory, and outputs a warning message when the range of the control target value which is obtained after the program change is reduced exceeding a threshold value as compared with the range of the control target value which is stored in the nonvolatile memory.

6. An optical disc signal processing device as defined in claim 1 including:
as said drive means, a focus drive means which shifts the position of the optical pickup in the direction perpendicular to the recording medium; and
as said error detection means, a focus error detection means which detects a physical distance between the optical pickup and the recording medium from an electric signal generated by the optical pickup.

7. An optical disc signal processing device as defined in claim 1 including:
as said drive means, a tracking drive means which shifts the position of the pickup in the radial direction of the recording medium; and
as said error detection means, a tracking error detection means which detects a physical distance between the optical pickup and the center of a groove existing on the recording medium or the center of a data sequence stored in the recording medium, from an electric signal generated by the optical pickup.

8. An optical disc signal processing device as defined in claim 1 including:
as said drive means, a tilt drive means which changes the physical angle of the optical pickup; and
as said error detection means, a tilt error detection means which detects a physical angle difference between the optical pickup and the recording medium from an electric signal generated by the optical pickup.

9. An optical disc signal processing device as defined in claim 1 wherein:
said nonvolatile memory stores the range of the control target value from its minimum value to its maximum value, which is obtained by the margin measurement means, together with the utilization rate which is outputted by the utilization rate measurement means, and stores the control target value which is adjusted by the control target value adjustment means together with the utilization rate which is outputted by the utilization rate measurement means; and
when the control target value stored in the nonvolatile memory is not included in the range of the control target value from its minimum value to its maximum value, which is stored in the nonvolatile memory, the adjustment method of the control target value adjustment means, or the number of measurements for the adjustment reference signal, or the change amount of the control target value is optimized so that the control target value stored in the nonvolatile memory is included in the range of the control target value from its minimum value to its maximum value, which is stored in the nonvolatile memory.

10. An optical disc signal processing device as defined in claim 1 further including a temperature measurement means which measures the temperature of the optical disc signal processing device; wherein
said nonvolatile memory stores the range of the control target value from its minimum value to its maximum value, which is obtained by the margin measurement means, together with the utilization rate outputted from the utilization rate measurement means and the temperature measured by the temperature measurement means; and
said comparison means corrects the range of the control target value from its minimum value to its maximum value, which is obtained by the margin measurement means and stored in the nonvolatile memory, according to the temperature stored in the nonvolatile memory, and compares the corrected range of the control target value with the control target value adjusted by the control target value adjustment means.

11. An optical disc signal processing device as defined in claim 1 further including a drive software identification information acquisition means which acquires identification information of a drive software that controls the optical disc signal processing device; wherein
the range of the control target value from its minimum value to its maximum value, which is obtained by the margin measurement means, is stored in the nonvolatile memory together with the utilization rate outputted from the utilization rate measurement means and the program identification information outputted from the drive software identification information acquisition means, and processing is carried out for each drive software identification information stored in the nonvolatile memory.

12. An optical disc signal processing device as defined in claim 1 further including a recording medium identification information acquisition means which acquires information for identifying the recording medium from the output of the adjustment reference signal generation means; wherein the range of the control target value from its minimum value to its maximum value, which is obtained by the margin measurement means, is stored in the nonvolatile memory together with the utilization rate outputted from the utilization rate measurement means and the recording medium identification information outputted from the recording medium identification information acquisition means, and processing is carried out for each recording medium identification information stored in the nonvolatile memory.

13. An optical disc signal processing device as defined in claim 1 further including a power supply identification information acquisition means which acquires information for identifying the type of a power supply used by the optical disc signal processing device; wherein the range of the control target value from its minimum value to its maximum value, which is obtained by the margin measurement means, is stored in the nonvolatile memory together with the utilization rate outputted from the utilization rate measurement means and the power supply identification information outputted from the power supply identification information acquisition means, and processing is carried out for each power supply identification information stored in the nonvolatile memory.

14. An optical disc signal processing device as defined claim 1 wherein the utilization rate measured by the utilization rate measurement means is the time utilizing a timer.

15. An optical disc signal processing device as defined in claim 1 wherein the utilization rate measured by the utilization rate measurement means is obtained from a device having a time measurement function, which is connected to the optical disc signal processing device.

16. An optical disc signal processing device as defined in claim 1 wherein the utilization rate measured by the utilization rate measurement means is the number of times the optical disc signal processing device reproduces or records the recording medium.

17. An optical disc signal processing device as defined in claim 1 wherein a nonvolatile memory of a device which is connected to the optical disc signal processing device is used instead of said nonvolatile memory.

18. An optical disc reproduction and recording apparatus comprising:
an optical pickup;
a rotation means for rotating the recording medium; and
an optical disc signal processing device as defined in claim 1.

19. An optical disc signal processing method comprising:
a driving step of changing the physical position or angle of an optical pickup;
an error detection step of detecting the physical positional relation between the optical pickup and a recording medium from an electric signal generated by the optical pickup;
a control target value change step of changing a control target value in an optical disc signal processing device;
a control step of controlling the drive step according to the outputs from the error detection step and the control target value change step;
an adjustment reference signal generation step of generating an adjustment reference signal for adjusting the control target value;
a control target value adjustment step of adjusting the control target value changed in the control target value change step, on the basis of the output from the adjustment reference signal generation step;
a margin measurement step of obtaining a range of the control target value from its minimum value to its maximum value, said control target value being changed in the control target value change step, within which range the optical disc signal processing device can perform normal operation;
a condition setting step of setting a threshold value of the adjustment reference signal when measuring the range in the margin measurement step;
a utilization rate measurement step of measuring the utilization rate of the optical disc signal processing device;
a storage step of storing the range of the control target value from its minimum value to its maximum value, which is obtained in the margin measurement step, into a nonvolatile memory together with the utilization rate outputted from the utilization rate measurement step;
a comparison step of comparing the range of the control target value from its minimum value to its maximum value, which is stored in the nonvolatile memory, with the control target value which is adjusted in the control target value adjustment step; and
an adjustment method switching step of changing the change amount of the control target value to be changed in the control target value change step, on the basis of the number of measurements for the adjustment reference signal that is used for adjusting the control target value in the control target value adjustment step or the output from the control target value adjustment step, and switching the control target value adjustment method on the basis of the output from the comparison step;
wherein the adjustment method used in the control target value adjustment step, or the number of measurements for the adjustment reference signal, or the change amount of the control target value is optimized so that the control target value adjusted in the control target value adjustment step is included in the range of the control target value from its minimum value to its maximum value, which is obtained in the margin measurement step and stored in the nonvolatile memory.

20. An optical disc signal processing method comprising:
a driving step of changing the physical position or angle of an optical pickup;
an error detection step of detecting the physical positional relation between the optical pickup and a recording medium from an electric signal generated by the optical pickup;
a control target value change step of changing a control target value in an optical disc signal processing device;
a control step of controlling the drive step according to the outputs from the error detection step and the control target value change step;
an adjustment reference signal generation step of generating an adjustment reference signal for adjusting the control target value;
a control target value adjustment step of adjusting the control target value changed in the control target value change step, on the basis of the output from the adjustment reference signal generation step;
a margin measurement step of obtaining a range of the control target value from its minimum value to its maximum value, said control target value being changed in the control target value change step, within which range the optical disc signal processing device can perform normal operation;

a condition setting step of setting a threshold value of the adjustment reference signal when measuring the range in the margin measurement step;

a utilization rate measurement step of measuring the utilization rate of the optical disc signal processing device;

a storage step of storing the range of the control target value from its minimum value to its maximum value, which is obtained in the margin measurement step, into a nonvolatile memory together with the utilization rate outputted from the utilization rate measurement step;

a comparison step of comparing the range of the control target value from its minimum value to its maximum value, which is stored in the nonvolatile memory, with the control target value which is adjusted in the control target value adjustment step;

a number-of-rotations selection step of selecting the number of rotations of the recording medium on the basis of the output from the comparison step;

a number-of-rotations acquisition step of obtaining the number of rotations of the recording medium; and a rotation control step of outputting a drive signal for rotating the recording medium with the target number of rotations according to the outputs from the number-of-rotations selection step and the number-of-rotations acquisition step;

wherein the range of the control target value from its minimum value to its maximum value, which is obtained in the margin measurement step, is stored in the nonvolatile memory together with the utilization rate which is outputted from the utilization rate measurement step and the number of rotations of the recording medium which is outputted from the number-of-rotations acquisition step, and the number-of-rotations of the recording medium is optimized in the number-of-rotations selection step so that the control target value adjusted in the control target value adjustment step is included in the range of the control target value from its minimum value to its maximum value, which is obtained in the margin measurement step and stored in the nonvolatile memory.

21. An optical disc signal processing device comprising:

a driving step of changing the physical position or angle of an optical pickup;

an error detection step of detecting the physical positional relation between the optical pickup and a recording medium from an electric signal generated by the optical pickup;

a control target value change step of changing a control target value in an optical disc signal processing device;

a control step of controlling the drive step according to the outputs from the error detection step and the control target value change step;

an adjustment reference signal generation step of generating an adjustment reference signal for adjusting the control target value;

a control target value adjustment step of adjusting the control target value changed in the control target value change step, on the basis of the output from the adjustment reference signal generation step;

a margin measurement step of obtaining a range of the control target value from its minimum value to its maximum value, said control target value being changed in the control target value change step, within which range the optical disc signal processing device can perform normal operation;

a condition setting step of setting a threshold value of the adjustment reference signal when measuring the range in the margin measurement step;

a utilization rate measurement step of measuring the utilization rate of the optical disc signal processing device;

a storage step of storing the range of the control target value from its minimum value to its maximum value, which is obtained in the margin measurement step, into a nonvolatile memory together with the utilization rate outputted from the utilization rate measurement step; and a maximum utilization rate estimation step of estimating a utilization rate with which the range of the control target value from its minimum value to its maximum value becomes equal to or lower than a threshold value, from the utilization rate of the optical disc signal processing device which is stored in the nonvolatile memory and the range of the control target value from its minimum value to its maximum value, which is obtained in the margin measurement step.

22. An optical disc signal processing method comprising:

a driving step of changing the physical position or angle of an optical pickup;

an error detection step of detecting the physical positional relation between the optical pickup and a recording medium from an electric signal generated by the optical pickup;

a control target value change step of changing a control target value in an optical disc signal processing device;

a control step of controlling the drive step according to the outputs from the error detection step and the control target value change step;

an adjustment reference signal generation step of generating an adjustment reference signal for adjusting the control target value;

a control target value adjustment step of adjusting the control target value changed in the control target value change step, on the basis of the output from the adjustment reference signal generation step;

a margin measurement step of obtaining a range of the control target value from its minimum value to its maximum value, said control target value being changed in the control target value change step, within which range the optical disc signal processing device can perform normal operation;

a condition setting step of setting a threshold value of the adjustment reference signal when measuring the range in the margin measurement step;

a utilization rate measurement step of measuring the utilization rate of the optical disc signal processing device;

a storage step of storing the range of the control target value from its minimum value to its maximum value, which is obtained in the margin measurement step, into a nonvolatile memory together with the utilization rate outputted from the utilization rate measurement step;

a maximum utilization rate estimation step of estimating a utilization rate with which the range of the control target value from its minimum value to its maximum value becomes equal to or lower than a threshold value, from the utilization rate of the optical disc signal processing device which is stored in the nonvolatile memory and the range of the control target value from its minimum value to its maximum value, which is obtained in the margin measurement step; and a warning output step of outputting a warning message when the output result of the maximum utilization rate estimation step varies exceeding a predetermined threshold value.

23. An optical disc signal processing method comprising:

a driving step of changing the physical position or angle of an optical pickup;

an error detection step of detecting the physical positional relation between the optical pickup and a recording medium from an electric signal generated by the optical pickup;

a control target value change step of changing a control target value in an optical disc signal processing device;

a control step of controlling the drive step according to the outputs from the error detection step and the control target value change step;

an adjustment reference signal generation step of generating an adjustment reference signal for adjusting the control target value;

a control target value adjustment step of adjusting the control target value changed in the control target value change step, on the basis of the output from the adjustment reference signal generation step;

a margin measurement step of obtaining a range of the control target value from its minimum value to its maximum value, said control target value being changed in the control target value change step, within which range the optical disc signal processing device can perform normal operation;

a condition setting step of setting a threshold value of the adjustment reference signal when measuring the range in the margin measurement step;

a utilization rate measurement step of measuring the utilization rate of the optical disc signal processing device;

a storage step of storing the range of the control target value from its minimum value to its maximum value, which is obtained in the margin measurement step, into a nonvolatile memory together with the utilization rate outputted from the utilization rate measurement step;

a program change step of changing a program for managing the respective steps;

a program comparison step of comparing the identification information of the program for the previous margin measurement which is stored in the nonvolatile memory with the identification information of the changed program; and a warning output step of comparing, based on the output from the program comparison step, the range of the control target value from its minimum value to its maximum value, with which the optical disc signal processing device can perform normal operation, which range is obtained after the program has been changed in the program change step, with the range of the control target value from its minimum value to its maximum value, which is stored in the nonvolatile memory, and outputting a warning message when the range of the control target value which is obtained after the program change is reduced exceeding a threshold value as compared with the range of the control target value which is stored in the nonvolatile memory.

24. An optical disc signal processing method as defined in claim 19 including:

as said driving step, a focus driving step of shifting the position of the optical pickup in the direction perpendicular to the recording medium; and as said error detection step, a focus error detection step of detecting a physical distance between the optical pickup and the recording medium from an electric signal generated by the optical pickup.

25. An optical disc signal processing method as defined in claim 19 including:

as said drive step, a tracking drive step of shifting the position of the pickup in the radial direction of the recording medium; and as said error detection step, a tracking error detection step which detects a physical distance between the optical pickup and the center of a groove existing on the recording medium or the center of a data sequence stored in the recording medium, from an electric signal generated by the optical pickup.

26. An optical disc signal processing method as defined in claim 19 including:

as said driving step, a tilt driving step of changing the physical angle of the optical pickup; and as said error detection step, a tilt error detection step of detecting a physical angle difference between the optical pickup and the recording medium from an electric signal generated by the optical pickup.

27. An optical disc signal processing method as defined in claim 19 wherein:

said nonvolatile memory stores the range of the control target value from its minimum value to its maximum value, which is obtained in the margin measurement step, together with the utilization rate which is outputted in the utilization rate measurement step, and stores the control target value which is adjusted in the control target value adjustment step, together with the utilization rate which is outputted in the utilization rate measurement step; and when the control target value stored in the nonvolatile memory is not included in the range of the control target value from its minimum value to its maximum value, which is stored in the nonvolatile memory, the adjustment method used in the control target value adjustment step, or the number of measurements for the adjustment reference signal, or the change amount of the control target value is optimized so that the control target value stored in the nonvolatile memory is included in the range of the control target value from its minimum value to its maximum value, which is stored in the nonvolatile memory.

28. An optical disc signal processing method as defined in claim 19 further including a temperature measurement step of measuring the temperature of the optical disc signal processing device; wherein said nonvolatile memory stores the range of the control target value from its minimum value to its maximum value, which is obtained in the margin measurement step, together with the utilization rate outputted from the utilization rate measurement step and the temperature measured in the temperature measurement step; and said comparison step corrects the range of the control target value from its minimum value to its maximum value, which is obtained in the margin measurement step and stored in the nonvolatile memory, according to the temperature stored in the nonvolatile memory, and compares the corrected range of the control target value with the control target value adjusted in the control target value adjustment step.

29. An optical disc signal processing method as defined in claim 19 further including a drive software identification information acquisition step of acquiring identification information of a drive software that controls the optical disc signal processing device; wherein the range of the control target value from its minimum value to its maximum value, which is obtained in the margin measurement step, is stored in the nonvolatile memory together with the utilization rate outputted from the utilization rate measurement step and the program identification information outputted from the drive software identification information acquisition step, and processing is carried out for each drive software identification information stored in the nonvolatile memory.

30. An optical disc signal processing method as defined in claim 19 further including a recording medium identification information acquisition step of acquiring information for identifying the recording medium from the output of the adjustment reference signal generation step; wherein the range of the control target value from its minimum value to its maximum value, which is obtained in the margin measurement step, is stored in the nonvolatile memory together with the utilization rate outputted from the utilization rate measurement step and the recording medium identification information outputted from the recording medium identification information acquisition step, and processing is carried out for each recording medium identification information stored in the nonvolatile memory.

31. An optical disc signal processing method as defined in claim 19 further including a power supply identification information acquisition step of acquiring information for identifying the type of a power supply used by the optical disc signal processing device; wherein the range of the control target value from its minimum value to its maximum value, which is obtained in the margin measurement step, is stored in the nonvolatile memory together with the utilization rate outputted from the utilization rate measurement step and the power supply identification information outputted from the power supply identification information acquisition step, and processing is carried out for each power supply identification information stored in the nonvolatile memory.

32. An optical disc signal processing method as defined in claim 19 wherein the utilization rate measured in the utilization rate measurement step is the time utilizing a timer.

33. An optical disc signal processing method as defined in claim 19 wherein the utilization rate measured in the utilization rate measurement step is obtained from a device having a time measurement function, which is connected to the optical disc signal processing device.

34. An optical disc signal processing method as defined in claim 19 wherein the utilization rate measured in the utilization rate measurement step is the number of times the optical disc signal processing device reproduces or records the recording medium.

35. An optical disc signal processing method as defined in claim 19 wherein a nonvolatile memory in a device connected to the optical disc signal processing device is used instead of said nonvolatile memory.

36. An optical disc reproduction and recording method for rotating a recording medium, and performing an optical disc signal processing method which is defined in claim 19.

* * * * *